US011332920B2

(12) United States Patent
Houghton et al.

(10) Patent No.: US 11,332,920 B2
(45) Date of Patent: May 17, 2022

(54) MOMENT RESISTING BI-AXIAL BEAM-TO-COLUMN JOINT CONNECTION

(71) Applicant: MiTek Holdings, Inc., Wilmington, DE (US)

(72) Inventors: David L. Houghton, Mission Viejo, CA (US); Quang Minh Huynh, San Diego, CA (US); Behzad Rafezy, Mission Viejo, CA (US); Jared J Adams, Mission Viejo, CA (US)

(73) Assignee: MITEK HOLDINGS, INC., Wilmington, DE (US)

( * ) Notice: Subject to any disclaimer, the term of this patent is extended or adjusted under 35 U.S.C. 154(b) by 0 days.

(21) Appl. No.: 16/264,191

(22) Filed: Jan. 31, 2019

(65) Prior Publication Data
US 2019/0161956 A1 May 30, 2019

Related U.S. Application Data

(63) Continuation of application No. 15/144,414, filed on May 2, 2016, now abandoned.

(51) Int. Cl.
*E04B 1/19* (2006.01)
*E04B 1/24* (2006.01)
(Continued)

(52) U.S. Cl.
CPC .......... *E04B 1/1912* (2013.01); *E04B 1/2403* (2013.01); *E04B 1/30* (2013.01);
(Continued)

(58) Field of Classification Search
CPC ........ E04B 1/1912; E04B 1/2403; E04B 1/30; E04B 2001/1993; E04B 2001/2418;
(Continued)

(56) References Cited

U.S. PATENT DOCUMENTS

| 674,752 | A | * | 5/1901 | Baker ....................... F16C 9/04 |
| | | | | 403/52 |
| 2,868,568 | A | * | 1/1959 | Frye ....................... A63H 33/06 |
| | | | | 403/171 |

(Continued)

FOREIGN PATENT DOCUMENTS

| CN | 105888059 | 8/2016 |
| FR | 2179494 A | 11/1973 |

(Continued)

OTHER PUBLICATIONS

American Institute of Steel Construction, Prequalified Connections for Special and Intermediate Steel Moment Frames for Seismic Applications, ANSI/AISC 358-10, ANSI/AISC 358s1-11, Including Supplement No. 1, 2011, 178 pages, Chicago, Illinois.

(Continued)

*Primary Examiner* — Joshua K Ihezie
(74) *Attorney, Agent, or Firm* — Stinson LLP

(57) ABSTRACT

A prefabricated column assembly includes a hollow tubular column having a longitudinal axis. A gusset plate assembly includes a plurality of gusset plates connected to the column and extending laterally outward from the column in planes generally parallel to the longitudinal axis of the column. A first pair of the gusset plates extends laterally outward from the column along a first axis and defines a space for receiving an end portion of a first beam for mounting the first beam on the first pair of gusset plates. A second pair of the gusset plates extends laterally outward from the column along a second axis that is nonparallel and non-coincident with the first axis. The second pair of gusset plates defines a space for receiving an end portion of a second beam for mounting the second beam on the second pair of gusset plates to provide a bi-axial joint connection.

22 Claims, 59 Drawing Sheets

(51) Int. Cl.
*E04B 1/30* (2006.01)
*B23K 101/28* (2006.01)

(52) U.S. Cl.
CPC ... *B23K 2101/28* (2018.08); *E04B 2001/1957* (2013.01); *E04B 2001/1993* (2013.01); *E04B 2001/2406* (2013.01); *E04B 2001/2415* (2013.01); *E04B 2001/2418* (2013.01); *E04B 2001/2454* (2013.01); *E04B 2001/2478* (2013.01)

(58) Field of Classification Search
CPC ..... E04B 2001/2415; E04B 2001/1957; E04B 2001/2406; B23K 2201/28
USPC ........... 52/838, 835, 272, 702, 649.3, 655.1, 52/656.6, 252
See application file for complete search history.

(56) References Cited

U.S. PATENT DOCUMENTS

| | | | |
|---|---|---|---|
| 3,203,150 A | 8/1965 | Serneblad | |
| 3,382,634 A * | 5/1968 | Shaw | E04B 1/185 52/251 |
| 3,691,712 A | 9/1972 | Bowling et al. | |
| 3,716,957 A | 2/1973 | Bernardi | |
| 3,844,124 A * | 10/1974 | Tupper | E02B 3/14 405/16 |
| 3,855,748 A * | 12/1974 | Thomas | A63B 9/00 52/578 |
| 3,914,063 A * | 10/1975 | Papayoti | E04B 1/1903 403/217 |
| 3,952,472 A * | 4/1976 | Boehmig | E04B 1/3511 52/655.1 |
| 4,012,882 A * | 3/1977 | Juriss | C22C 27/04 52/793.11 |
| 4,014,089 A * | 3/1977 | Sato | E04B 1/2403 29/525.11 |
| 4,409,765 A | 10/1983 | Pall | |
| 4,441,289 A | 4/1984 | Ikuo et al. | |
| 4,445,801 A * | 5/1984 | Trudeau | A63H 33/10 403/219 |
| 4,551,960 A * | 11/1985 | Fleishman | E04B 1/1903 403/172 |
| 4,863,305 A * | 9/1989 | Schold | E04B 1/2604 403/171 |
| 5,148,642 A | 9/1992 | Plumier et al. | |
| 5,244,300 A | 9/1993 | Perreira et al. | |
| 5,660,017 A | 8/1997 | Houghton | |
| 5,680,737 A * | 10/1997 | Sheipline | E04B 1/24 403/169 |
| 5,680,738 A | 10/1997 | Allen et al. | |
| 6,022,165 A | 2/2000 | Lin | |
| 6,073,405 A | 6/2000 | Kasai et al. | |
| 6,138,427 A * | 10/2000 | Houghton | E04B 1/2403 52/236.3 |
| 6,219,989 B1 * | 4/2001 | Tumura | E04B 1/2403 52/274 |
| 6,237,303 B1 | 5/2001 | Allen et al. | |
| 6,516,583 B1 | 2/2003 | Houghton | |
| 6,591,573 B2 * | 7/2003 | Houghton | E04B 1/2403 52/236.3 |
| 6,837,010 B2 | 1/2005 | Powell et al. | |
| 6,993,880 B2 | 2/2006 | Cameron et al. | |
| 7,021,020 B2 | 4/2006 | Simmons et al. | |
| 7,047,695 B2 * | 5/2006 | Allen | E04B 1/2403 52/120 |
| 7,076,926 B2 | 7/2006 | Kasai et al. | |
| 7,114,300 B1 | 10/2006 | Culp | |
| 7,178,296 B2 * | 2/2007 | Houghton | E04B 1/24 52/167.3 |
| 7,225,588 B2 | 6/2007 | Nakamura et al. | |
| 7,310,920 B2 * | 12/2007 | Hovey, Jr. | E04B 1/24 52/282.1 |
| 7,637,076 B2 * | 12/2009 | Vaughn | E02D 27/34 403/169 |
| 7,703,244 B2 | 4/2010 | Suzuki et al. | |
| 7,762,038 B2 * | 7/2010 | Ceba | E04B 1/2403 52/653.1 |
| 7,784,226 B2 | 8/2010 | Ichikawa et al. | |
| 7,941,985 B2 | 5/2011 | Simmons | |
| 8,122,671 B2 | 2/2012 | Karns | |
| 8,146,322 B2 | 4/2012 | Karns | |
| 8,205,408 B2 * | 6/2012 | Houghton | E04B 1/24 52/653.1 |
| 8,375,652 B2 | 2/2013 | Hiriyur et al. | |
| 8,458,980 B2 * | 6/2013 | Ivanov | A63H 33/084 446/105 |
| 8,468,775 B2 | 6/2013 | Vaughn | |
| 8,505,260 B1 | 8/2013 | Chang et al. | |
| 8,635,834 B2 * | 1/2014 | Houghton | E04B 1/24 52/653.1 |
| 8,640,419 B2 * | 2/2014 | Lee | E04C 3/44 52/649.2 |
| 8,915,042 B2 * | 12/2014 | Ahn | E04B 1/24 52/236.6 |
| 9,091,065 B2 | 7/2015 | Tran et al. | |
| 2002/0124520 A1 * | 9/2002 | Bock | E04B 1/2403 52/655.1 |
| 2003/0009977 A1 * | 1/2003 | Houghton | E04B 1/2403 52/656.9 |
| 2003/0041549 A1 * | 3/2003 | Simmons | E04B 1/2403 52/655.1 |
| 2003/0172516 A1 | 9/2003 | Glenn | |
| 2003/0208985 A1 | 11/2003 | Allen et al. | |
| 2004/0088944 A1 * | 5/2004 | Simmons | E04B 1/2403 52/656.9 |
| 2004/0244330 A1 | 12/2004 | Takeuchi et al. | |
| 2006/0144006 A1 | 7/2006 | Suzuki et al. | |
| 2006/0185258 A1 | 8/2006 | Ouellet et al. | |
| 2006/0265992 A1 * | 11/2006 | Hiragaki | E04B 1/2403 52/633 |
| 2007/0209314 A1 | 9/2007 | Vaughn | |
| 2007/0261356 A1 * | 11/2007 | Vaughn | E02D 27/34 52/655.1 |
| 2008/0178551 A1 * | 7/2008 | Porter | E04B 1/24 52/653.1 |
| 2008/0236071 A1 * | 10/2008 | Surowiecki | E04B 2/7457 52/272 |
| 2008/0289267 A1 | 11/2008 | Sarkisian | |
| 2008/0295443 A1 * | 12/2008 | Simmons | E04B 1/24 52/655.1 |
| 2009/0025308 A1 | 1/2009 | Deans et al. | |
| 2009/0120919 A1 | 5/2009 | O'Donnell et al. | |
| 2009/0165419 A1 | 7/2009 | Richard et al. | |
| 2009/0223166 A1 | 9/2009 | Ohata et al. | |
| 2010/0043316 A1 * | 2/2010 | Karns | E04B 1/2403 52/167.1 |
| 2010/0043338 A1 * | 2/2010 | Houghton | E04B 1/24 52/653.1 |
| 2011/0030305 A1 * | 2/2011 | Karns | E04B 1/2403 52/650.1 |
| 2011/0047925 A1 | 3/2011 | Gan | |
| 2011/0252743 A1 | 10/2011 | Yang | |
| 2011/0280649 A1 * | 11/2011 | Dewson | F16B 7/187 403/171 |
| 2012/0017523 A1 | 1/2012 | Ozaki et al. | |
| 2012/0131878 A1 * | 5/2012 | Ivanov | A63H 33/084 52/655.1 |
| 2013/0326993 A1 * | 12/2013 | Schold | E04B 1/185 52/655.1 |
| 2014/0124489 A1 | 5/2014 | Zhang et al. | |
| 2015/0275501 A1 | 10/2015 | Houghton | |

FOREIGN PATENT DOCUMENTS

| | | |
|---|---|---|
| FR | 2821395 | 8/2002 |
| GB | 717744 | 11/1954 |
| GB | 1421040 | 1/1976 |
| GB | 2036235 | 6/1980 |
| JP | S4959307 | 5/1974 |

(56) References Cited

FOREIGN PATENT DOCUMENTS

| | | |
|---|---|---|
| JP | H06-117049 A | 4/1994 |
| JP | H0860748 | 3/1996 |
| JP | H10292491 | 11/1998 |
| JP | H10317491 | 12/1998 |
| JP | H09189075 A | 1/1999 |
| JP | H10227063 | 2/2000 |
| JP | 2000336772 | 12/2000 |
| JP | H11200489 | 1/2001 |
| JP | 2002013203 | 1/2002 |
| JP | 2002371627 | 12/2002 |
| JP | 2003-74126 | 3/2003 |
| JP | 2006-328676 A | 12/2006 |
| JP | 2010229660 | 4/2012 |
| JP | S47-59307 U1 | 6/2012 |
| JP | 2013253368 | 6/2015 |
| JP | H09189075 | 1/2019 |
| WO | WO2004067869 | 8/2004 |
| WO | WO2012112608 | 8/2012 |
| WO | WO2014085680 | 6/2014 |

OTHER PUBLICATIONS

American Institute of Steel Construction, Steel Design Guide 4, Extended End-Plate Moment Connections, Seismic and Wind Applications, Second Edition, 166 pages, 2003, United States.

American Institute of Steel Construction, Steel Design Guide Series 16, Flush and Extended Multiple Row, Moment End-Plate Connections, 74 pages, 2002, United States.

Atsushi Sato, et al., Cyclic Behavior and Seismic Design of Bolted Flange Plate Steel Moment Connections, Engineering Journal, Fourth Quarter, 2008, pp. 221-232, United States.

Simpson, Strong Tie, Introduction to the Strong Frame® Special Moment Frame, http://www.strongtie.com/products/strongframe/special_mf/intro.asp, 2014, 3 pages, United States.

European Search Report for Application No. 17167418.7, dated Aug. 23, 2017, 7 pages.

Canadian Examiner's Report for Application No. 2,965,456 dated May 29, 2020, 6 pages, Canada.

Canadian Examiner's Report for Application No. 2,965,456 dated Dec. 15, 2020, 6 pages, Canada.

Japanese Notification of Reason(s) for Refusal received for Japanese Patent Application Serial No. 2017-091316 dated Mar. 26, 2021, 9 pages (Including English Translation).

Mexican Examination Report received for Mexican Patent Application Serial No. MX/a/2017/005717 dated Mar. 19, 2021, 9 pages (Including English Translation).

Notification of Reasons for Refusal, and translation thereof, from counterpart Japanese Application No. 2017-091316, dated Aug. 10, 2021, 6 pages.

Examination Report, and translation thereof, received from counterpart Mexican Application No. MX/A/2017/005717, dated Jul. 19, 2021, 10 pages.

Examination Report from AU2017202780, dated Dec. 7, 2021, 3 pages.

* cited by examiner

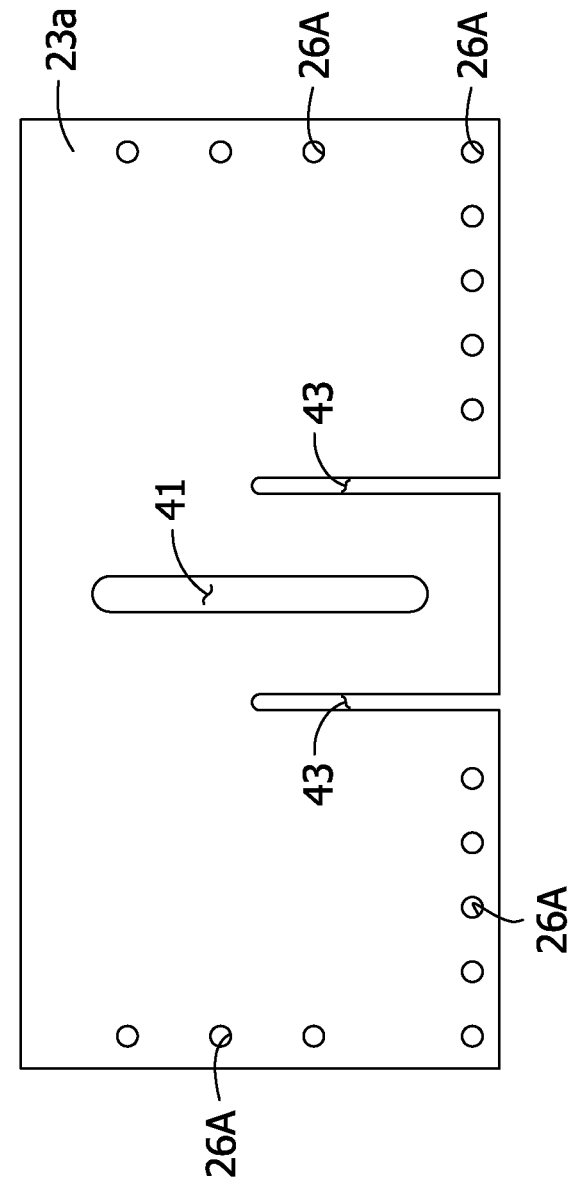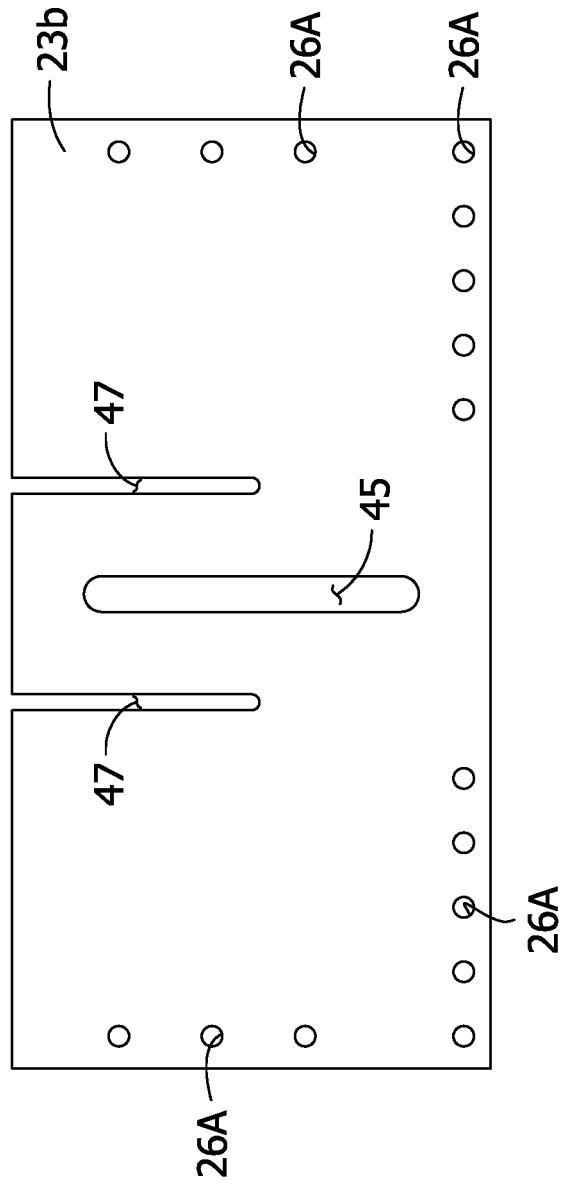
FIG. 12
FIG. 13

MOMENT RESISTING BI-AXIAL BEAM-TO-COLUMN JOINT CONNECTION

FIELD OF THE INVENTION

The present invention generally relates to a moment resisting, bi-axial beam-to-column joint connection, and more particular to a column assembly and gusset plate assembly for a bi-axial beam-to-column joint connection.

BACKGROUND OF THE INVENTION

It has been found in a moment-resisting building having a structural steel framework, that most of the energy of an earthquake, or other extreme loading condition, is absorbed and dissipated, in or near the beam-to-column joints of the building.

It is desirable to achieve greater strength, ductility and joint rotational capacity in beam-to-column connections in order to make buildings less vulnerable to disastrous events. Greater connection strength, ductility and joint rotational capacity are particularly desirable in resisting sizeable moments in both the lateral and the vertical plane. That is, the beam-to-column moment-resisting connections in a steel frame building can be subjected to large rotational demands in the vertical plane due to interstory lateral building drift. Engineering analysis, design and full-scale specimen testing have determined that prior steel frame connection techniques can be substantially improved by strengthening the beam-to-column connection in a way which better resists and withstands the sizeable beam-to-column, joint rotations which are placed upon the beam and the column. That is, the beam-to-column connection must be a strong and ductile, moment-resisting connection.

Hollow Structural Section (HSS) columns are structurally efficient members to use in a variety of building design applications (both structural and architectural), including moment frames. However traditional moment connections types that connect a wide flange ('H' section) beam to an HSS column involve significantly different design considerations than does connecting a wide flange beam to a wide flange column. During loading conditions, the moments in the wide flange beams are resolved into concentrated forces at the beam flanges that must be transferred into the column. The main difference between an HSS and wide flange column is how the forces from the beam flanges are transferred into the column webs to be resisted as shear. In a wide flange column, the web (and thus the stiffness) is located at the center of the column flange. In an HSS column, the forces applied to the column face must be transferred to the sidewalls, which act as the webs of the column. Due to the fact that HSS walls are generally thinner than flanges on a wide flange column, the thickness of the HSS column wall becomes a critical consideration for the strength and stiffness of a moment connection between an HSS column and a wide flange beam. Conventional methods of connecting an HHS column to a wide flange beam must rely on technically uncertain and costly means to transfer significant moment forces to the webs of HSS columns. These current methods are typically used in uniaxial moment frame applications. One such method is directly welding flanges of the wide flange beams to the thin wall flange faces of the HSS column. This method is self-limiting when the applied moment approaches the full flexural strength of the beam because of the inherent flexibility of the thin wall thickness of the HSS flange. Therefore, the direct welding technique has limited capacity to transfer applied moment forces through out-of-plane bending and shear to the connecting webs of the HSS column.

Another conventional method is through-plate connections wherein the HSS column is cut in two places at each floor level to allow through plates attached to the top and bottom flanges of the wide flange beam to pass through the column. These through plates are welded along the full perimeter of the cut sections of the HSS column on both top and bottom faces of each through plate. These type of connections have proven to be both costly to fabricate and uncertain in their performance when subjected to violent earthquakes. For example, the connection may be inherently susceptible to out-of-plane punching shear failures in the through-plate due to cyclic tensile forces in the column.

Exterior diaphragm plate connections (also known as cut-out plates) are similar to the through-plate connections in that they use flange plates attached to the top and bottom flanges of the beam to transfer the moments. However, in the exterior diaphragm plate connection the HSS column remains continuous and the top and bottom flange plates are made wider than the width of the HSS column to allow for cut openings having a perimeter that surrounds and is attached to the full perimeter of the HSS column. This connection is inherently difficult to fabricate and erect.

Interior diaphragm plate connections consist of shop welded plates that are cut to fit along the inside perimeter of the HSS column, therein stiffening the HSS thin wall flanges and providing a means to transfer beam flange forces to the sidewall webs of the HSS column. Top and bottom flanges of wide flange beam are directly welded to the thin wall flange faces of the column. The fabrication of this connection type is difficult because of precise fit up issues and access for welding of interior diaphragm plates to inside faces of the HSS column. Performance of this connection type is correspondingly uncertain.

SUMMARY

In one aspect, a prefabricated column assembly generally comprises a hollow tubular column having a longitudinal axis. A gusset plate assembly comprises a plurality of gusset plates connected to the column and extending laterally outward from the column in planes generally parallel to the longitudinal axis of the column. A first pair of the gusset plates extends laterally outward from the column along a first axis and defines a space for receiving an end portion of a first beam for mounting the first beam on the first pair of gusset plates. A second pair of the gusset plates extends laterally outward from the column along a second axis that is nonparallel and non-coincident with the first axis. The first and second pairs of gusset plates each intersect a single plane perpendicular to the longitudinal axis of the column. The second pair of gusset plates defines a space for receiving an end portion of a second beam for mounting the second beam on the second pair of gusset plates to provide a bi-axial joint connection.

In another aspect, a gusset plate assembly for connection to a hollow tubular column to attach a beam of a building to the column generally comprises at least two metal gusset plates sized for transferring the weight of the beam of the building to the column. The gusset plates are connected together in a fixed configuration with respect to each other. Each gusset plate includes at least one slot mated with a slot of another of the gusset plates thereby interconnecting the gusset plates and forming the gusset plate assembly.

In still another aspect, a method of assembling a prefabricated column assembly generally comprises providing a hollow tubular column. A gusset plate assembly including a plurality of gusset plates is assembled by attaching at least two of the gusset plates together. The gusset plate assembly is secured to the hollow tubular column to form the column assembly. A first pair of the gusset plates extends laterally outward from the column along a first axis and defines a space for receiving an end portion of a first beam for mounting the first beam on the first pair of gusset plates. A second pair of the gusset plates extends laterally outward from the column along a second axis. The second pair of gusset plates defines a space for receiving an end portion of a second beam for mounting the second beam on the second pair of gusset plates thereby providing for bi-axial joint connection.

BRIEF DESCRIPTION OF THE DRAWINGS

FIG. 12 is a front view of a first gusset plate of the gusset plate assembly of FIG. 9;

FIG. 13 is a front view of a second gusset plate of the gusset plate assembly of FIG. 9;

Corresponding reference characters indicate corresponding parts throughout the drawings.

DESCRIPTION OF THE PREFERRED EMBODIMENTS

Figure 1:
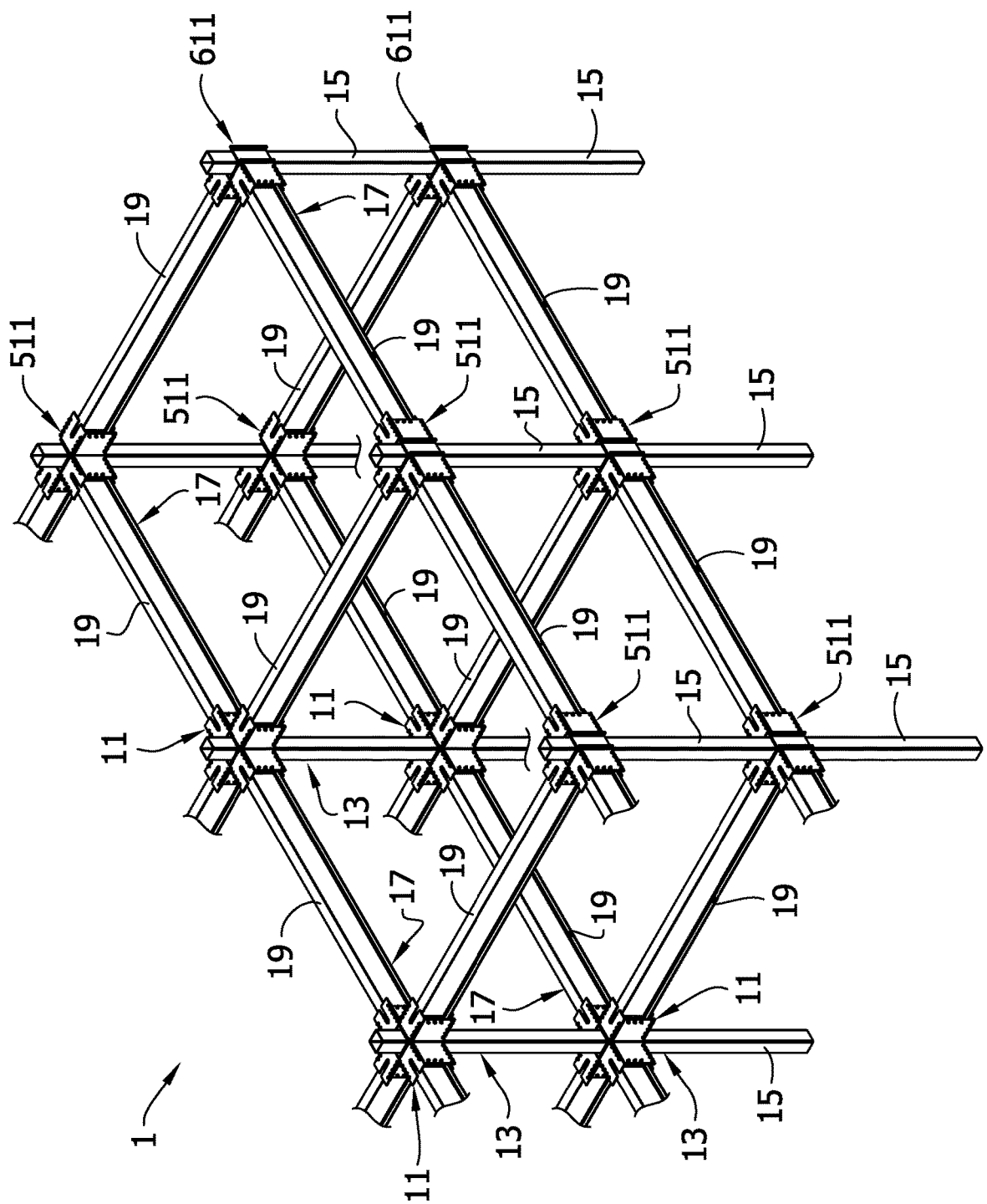
FIG. 1 is a diagrammatic perspective of a building framework.
Figure 1A:
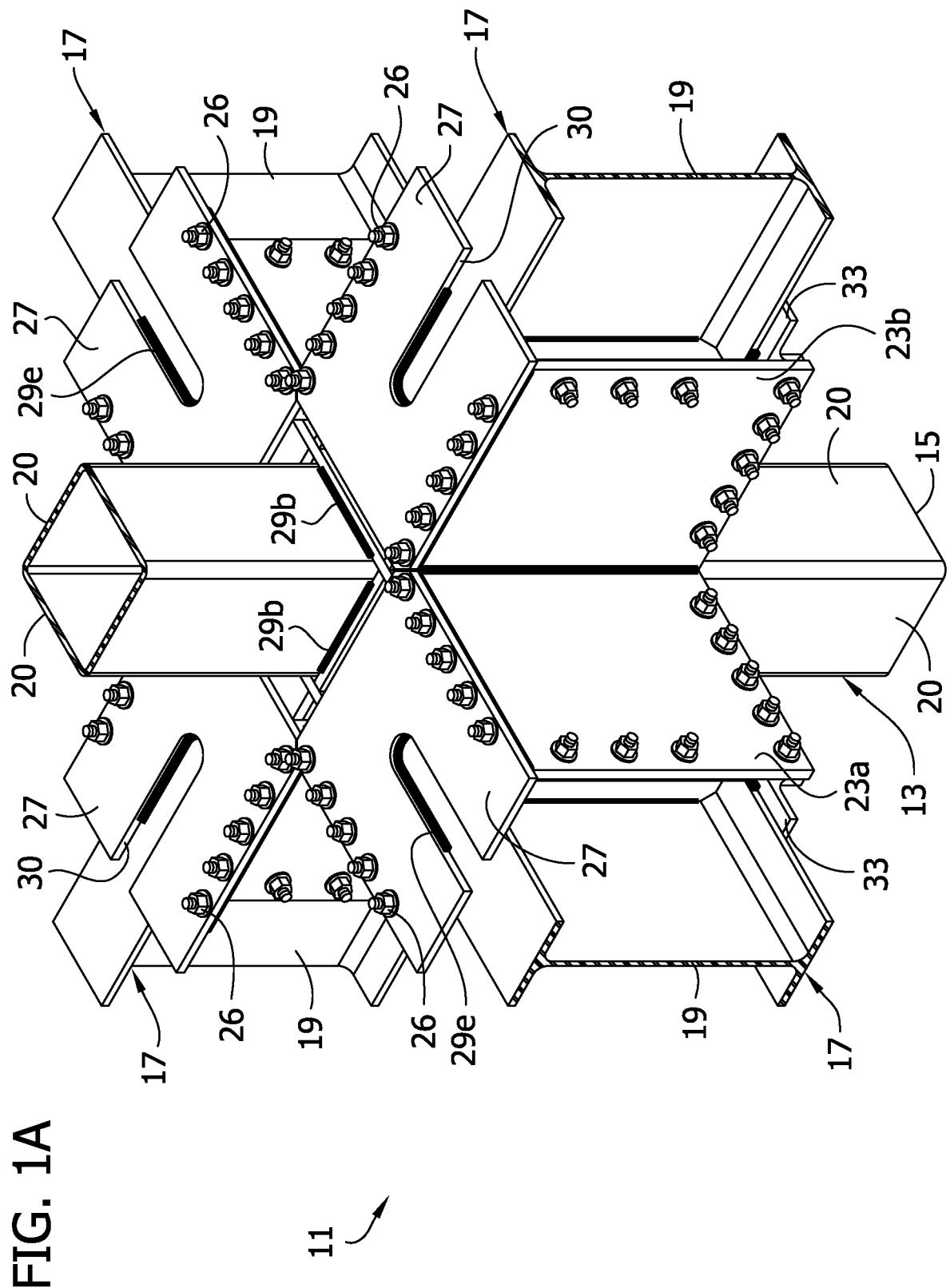
FIG. 1A is a fragmentary perspective of a four-sided bi-axial beam-to-column joint connection structure including a column assembly of a first embodiment.
Figure 5:
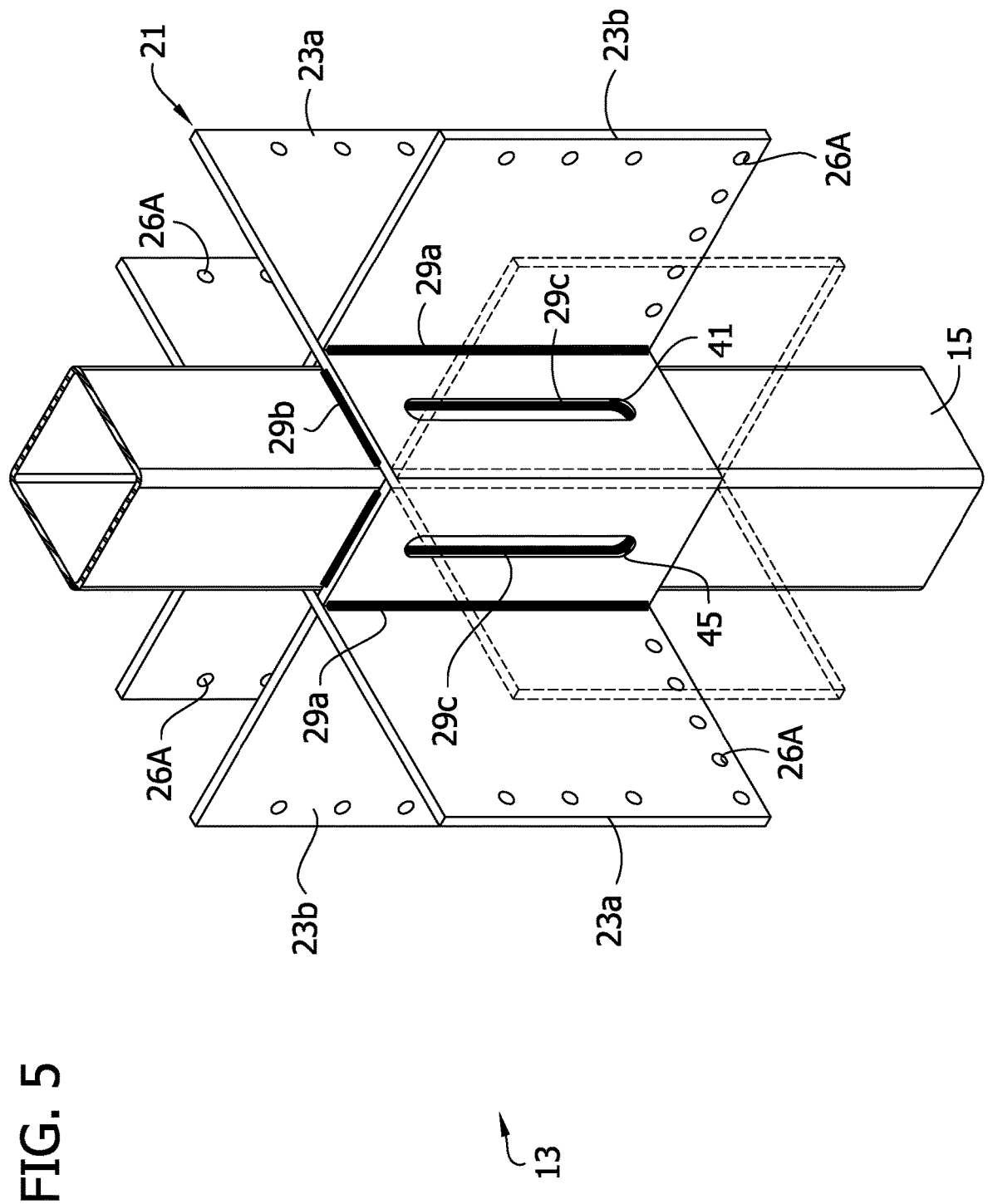
FIG. 5 is the column assembly of FIG. 4 with angle irons removed and portions of a gusset plate assembly shown in phantom to reveal details of connection to the gusset plates to the column.
Figure 6:
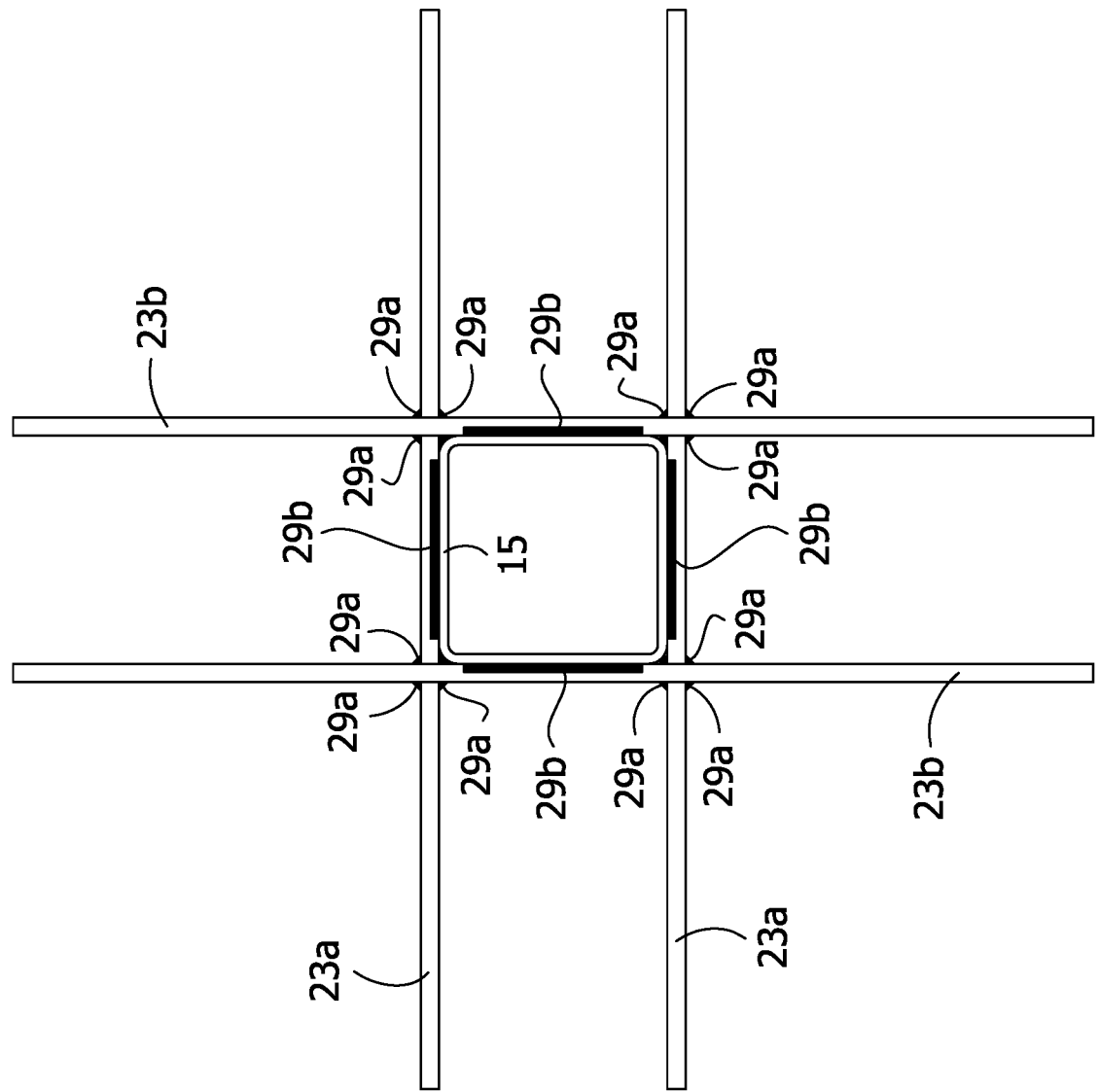
FIG. 6 is a top view of the column assembly of FIG. 5.

Referring to FIGS. 1-15, a bi-axial beam-to-column moment-resisting joint connection structure including a column assembly of a first embodiment is generally indicated at 11. The joint connection structure may be used in the construction of a building framework 1 (see, FIG. 1). In the illustrated embodiment, the joint connection structure joins a column assembly 13 including a column 15 to a plurality of full-length beam assemblies 17 each including a full-length beam 19. A full-length beam is a beam that has a length sufficient to extend substantially the full-length between adjacent columns in a structure (see, FIG. 2). Thus, a stub and link beam assembly as shown in FIGS. 5 and 16 of U.S. Pat. No. 6,138,427, herein incorporated by reference, is not a full-length beam. It will be understood that the beams 19 in FIG. 1A have been broken away, but are full-length beams. In the illustrated embodiment, the joint connection structure has a 4-sided/4-beam configuration whereby four full-length beam assemblies 17 are configured to be attached to the column assembly 13. In the illustrated embodiment, column 15 is an HSS tube section structure having a rectangular (broadly, "polygonal") cross section defined by four column faces 20. The beams 19 may have any suitable configuration, such as an I-beam, H-beam configuration, or hollow rectangular shape (built-up box member or HSS tube section). In the illustrated embodiments, the column 15 comprises an enclosed rectangular wall including opposing planar wall members.

The global moment-resisting frame design configuration of the building framework 1, can, as needed, provide a distributed moment-resisting space frame wherein all or most beam-to-column connections are moment-resisting in each principal direction of the building. This is in contrast to conventional building frameworks which may use fewer discretely located uniaxial moment frames throughout a building foot print. Therefore, the framework 1 maximizes structural redundancy in the lateral load resisting system of a multi-story building to increase resistance to progressive collapse scenarios when subjected to, for example, terrorist bomb blast and other catastrophic load environments, while minimizing the number of required moment-resisting joints to be constructed which in turn reduces construction costs.

Referring to FIGS. 5-9, 12 and 13, the column assembly 13 includes a collar like gusset plate assembly 21 for attaching the column assembly to the beam assemblies 17. The gusset plate assembly 21 comprises a plurality of gusset plates 23 connected to the column 15 and extending laterally outward from the column. The gusset plates 23 extend within planes generally parallel to a longitudinal axis of the column 15. A first pair of spaced apart parallel, vertically and horizontally extending gusset plates 23a sandwich the column 15 and co-axially extending beams 19. The first pair of gusset plates 23a extends laterally outward from the column 15 in opposite directions along a first axis and defines spaces for receiving end portions of beams 19 for mounting respective beam assemblies 17 to the column assembly 13 via the gusset plate assembly 21. A second pair of spaced apart parallel, vertically and horizontally extending gusset plates 23b sandwich the column 15 and co-axially extending beams 19. The second pair of gusset plates 23b extends laterally outward from the column 15 in opposite directions along a second axis extending orthogonally to the first axis. The second pair of gusset plates 23b defines spaces for receiving end portions of beams 19 for mounting respective beam assemblies 17 to the column assembly 13 via the gusset plate assembly 21. The first and second pairs of gusset plates each intersect a single plane perpendicular to the longitudinal axis of the column 15. In the illustrated embodiment, the gusset plate assembly 21 is constructed and arranged so that four, co-planar beams 19 are connected to the column 15.

Figure 14:
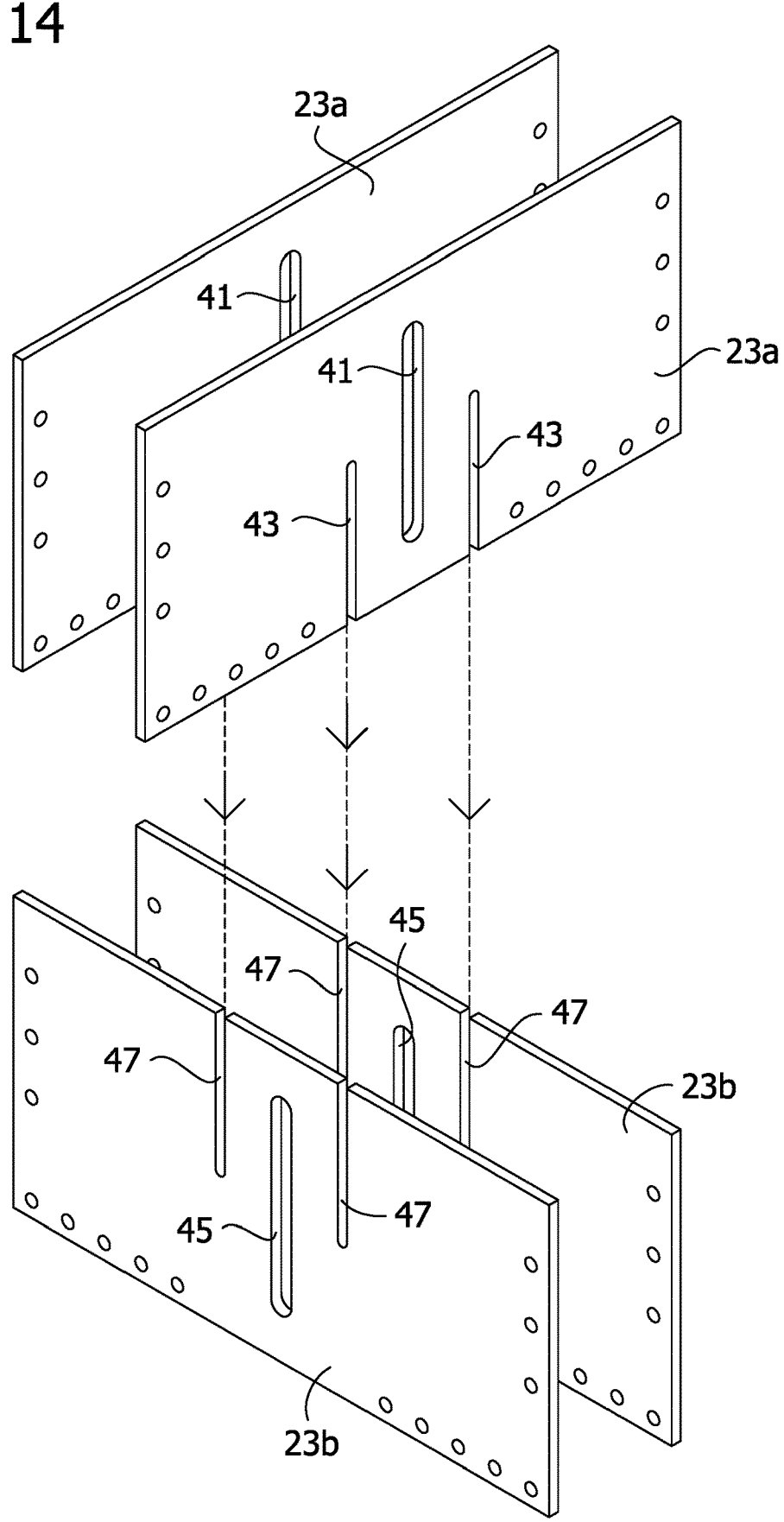
FIG. 14 is a perspective illustrating interconnection of the first gusset plate to the second gusset plate.

Each of the first pair of gusset plates 23a includes a closed interior slot 41 (broadly, "elongate opening") having an edge defining a closed loop encompassing the slot. The gusset plates 23a each also include a pair of open slots 43 flanking the interior slot 41 (FIG. 12). The open slots 43 extend from a bottom of the gusset plates 23 to an interior of the gusset plates. Each of the second pair of gusset plates 23b includes a closed interior slot 45 (broadly, "elongate opening") of substantially the same construction as the slot 41, and a pair of open slots 47 flanking the interior slot (FIG. 13). The open slots 47 extend from a top of the gusset plates 23 to an interior of the gusset plates. The slots 43, 47 of the first and second pairs of gusset plates 23a, 23b allow the plates to be assembled as schematically illustrated in FIG. 14. The open slots 43 of the first pair of gusset plates 23a are configured to mate with the open slots 47 of the second pair of gusset plates 23b such that portions of the first pair of gusset plates 23a are received in the open slots of the second pair of gusset plates, and portions of the second pair of gusset plates are received in the open slots of the first pair of gusset plates. In this way, the gusset plates 23a, 23b intersect and extend through each other. In the illustrated embodiment, the first pair of gusset plates 23a are attached to the second pair of gusset plates 23b such that top and bottom edges of the first pair of gusset plates are generally flush with respective top and bottom edges of the second pair of gusset plates 23b.

Figure 7:
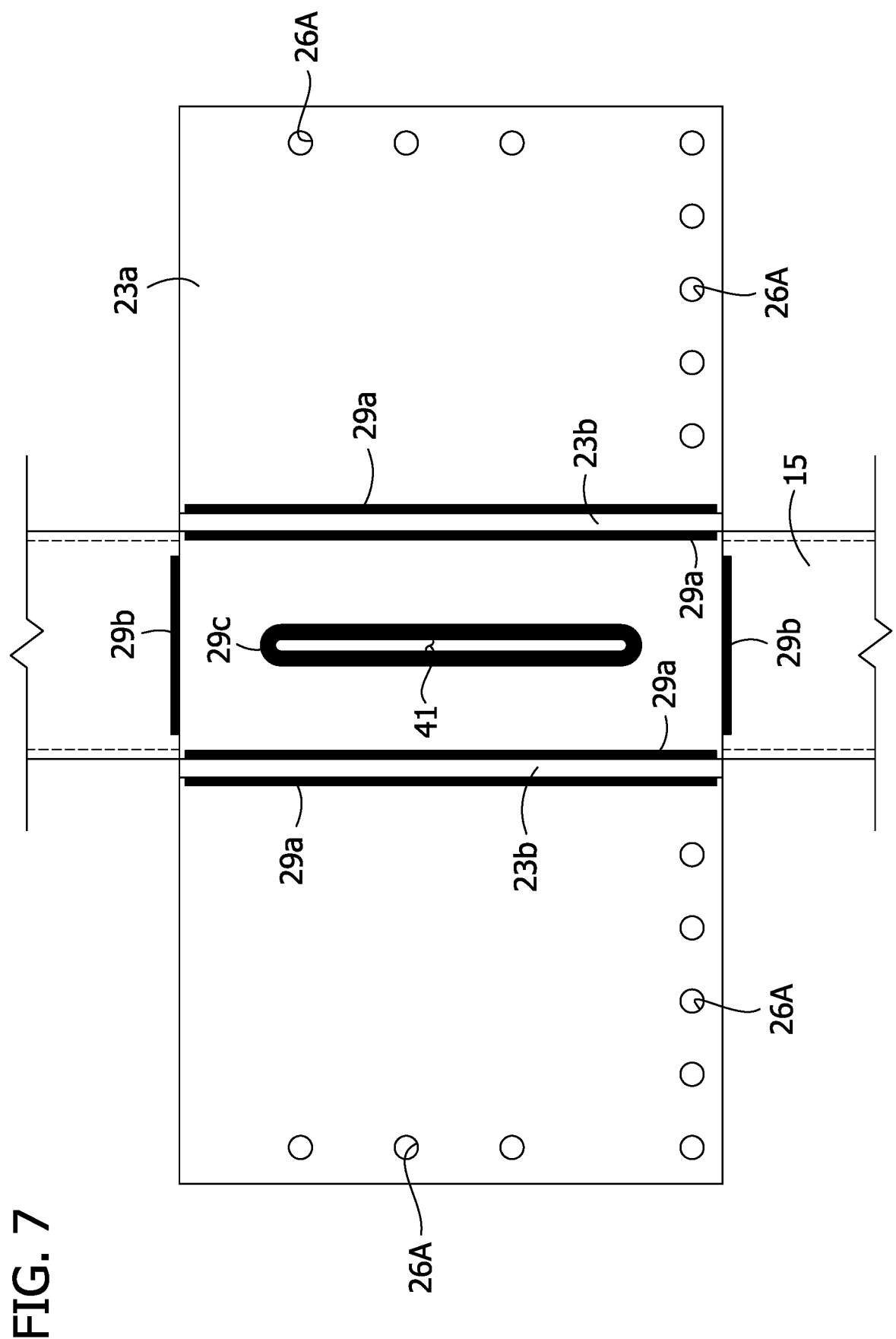
FIG. 7 is a front view of the column assembly of FIG. 5.
Figure 8:
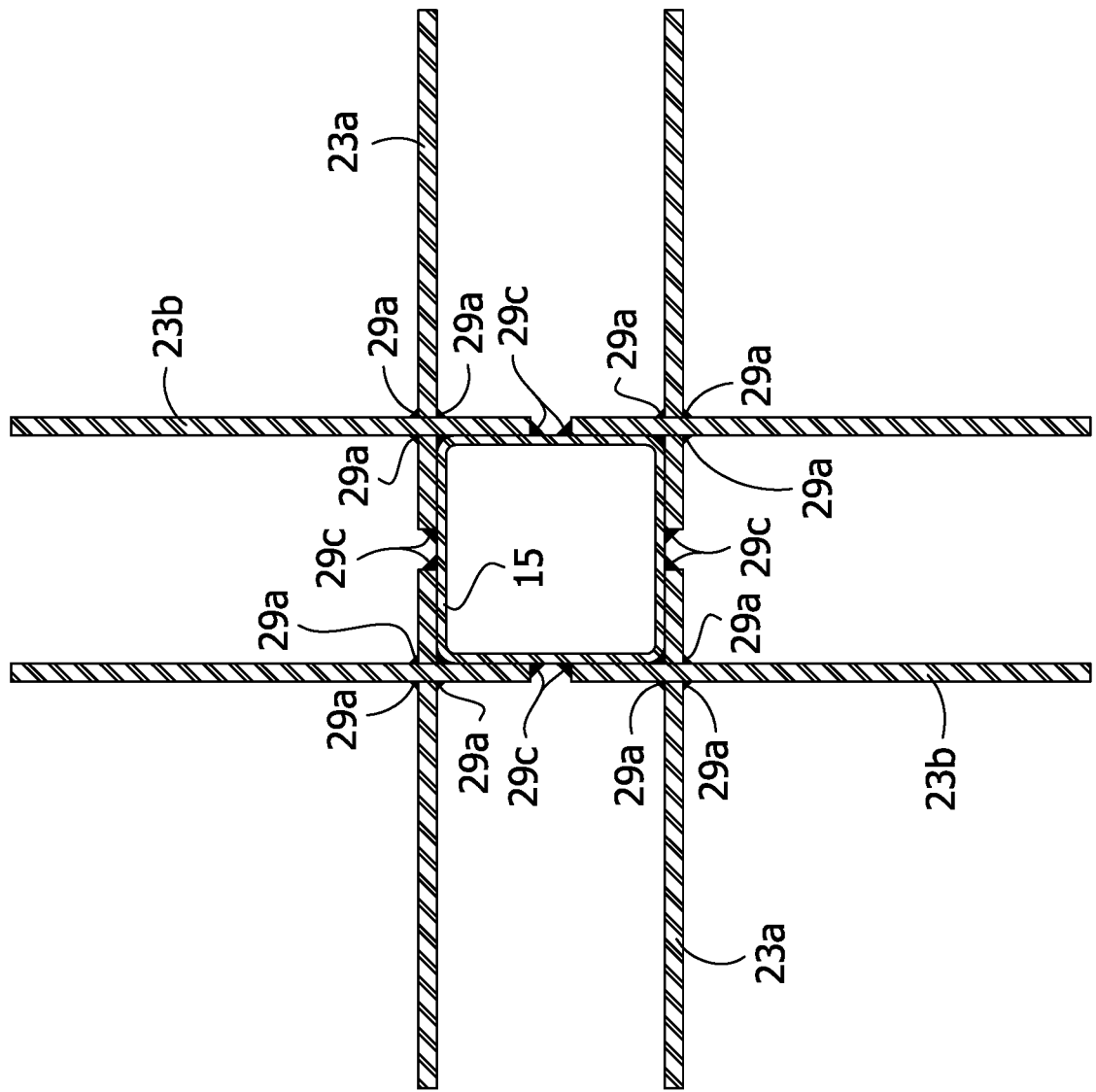
FIG. 8 is a horizontal section of the column assembly of FIG. 5.
Figure 9:
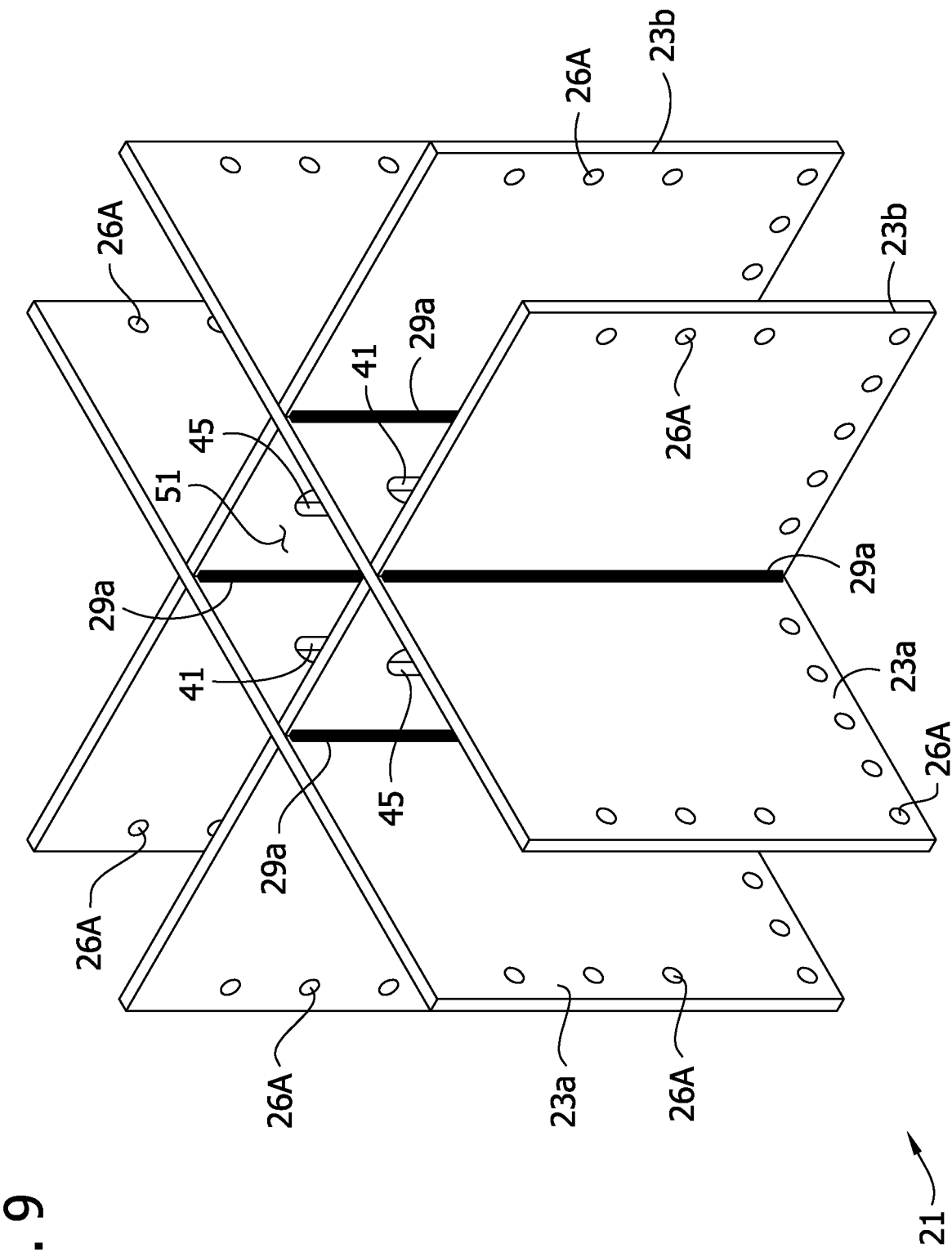
FIG. 9 is a perspective of a gusset plate assembly of the column assembly of FIG. 5.
Figure 15:
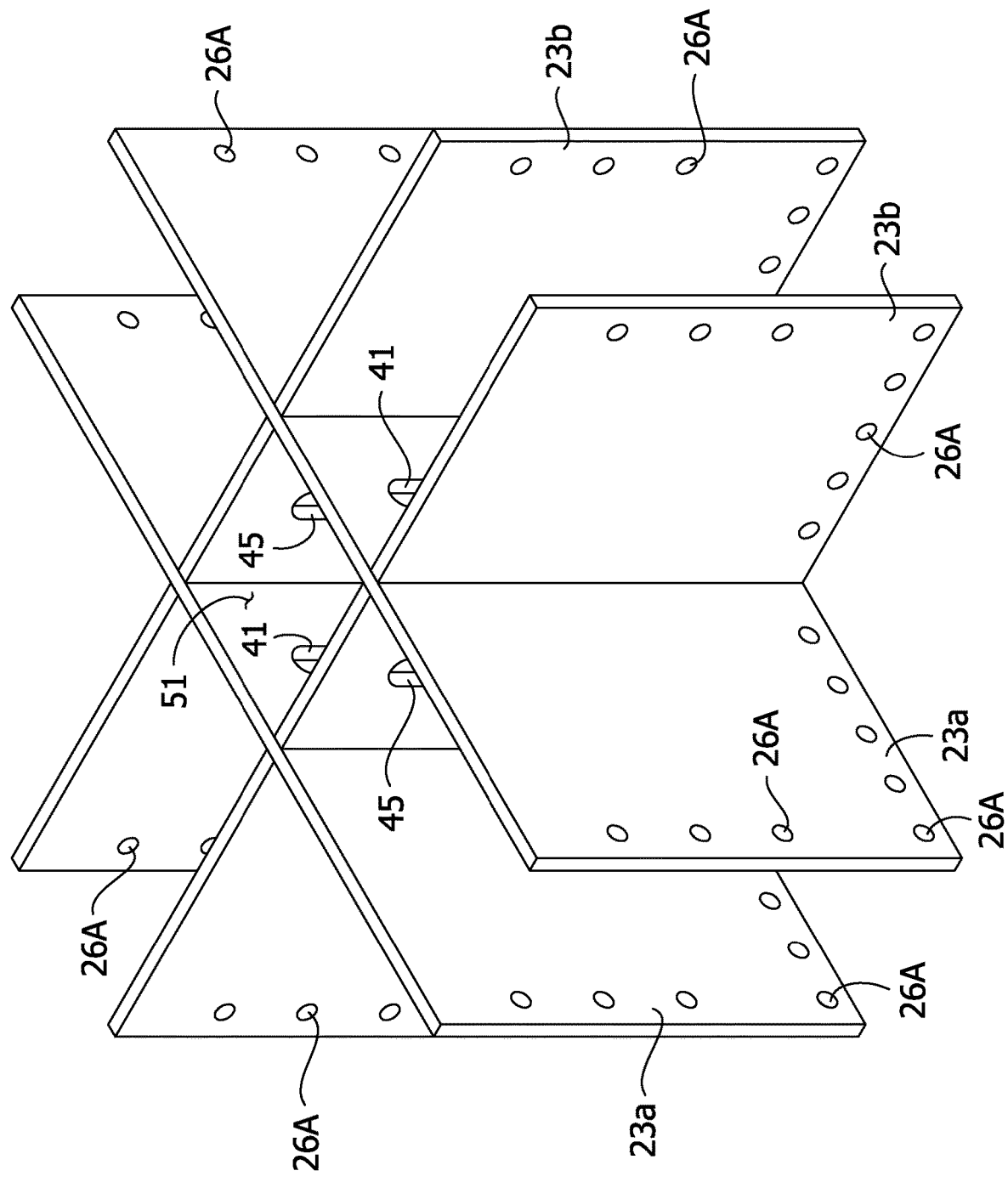
FIG. 15 is a perspective of the gusset plate assembly of FIG. 9 prior to welding.
Figure 16:
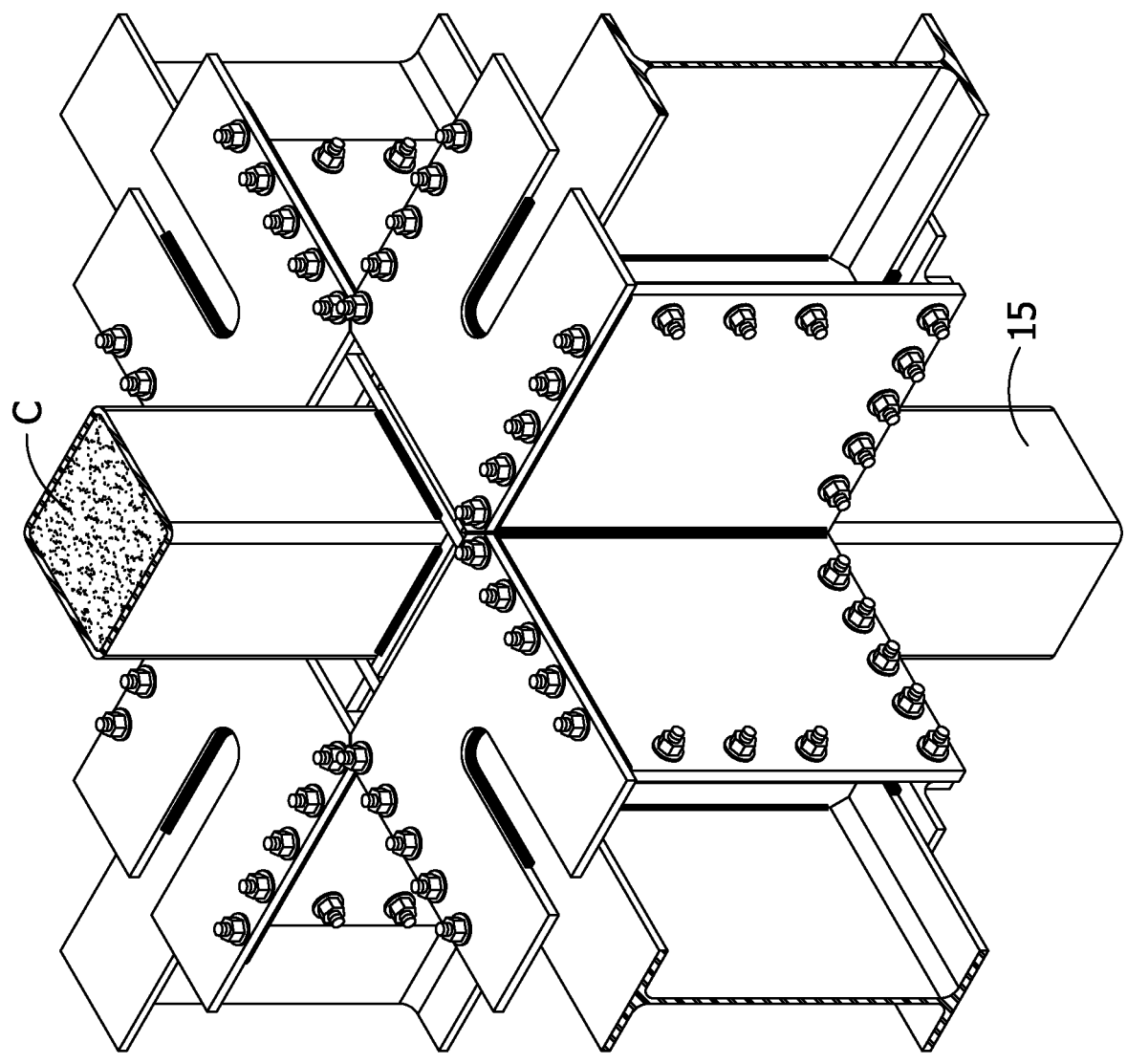
FIG. 16 is the bi-axial beam-to-column joint connection structure of FIG. 1A with cement placed in an interior of a column of the structure.

The interconnected pairs of gusset plates 23a, 23b form a collar like gusset plate assembly 21 having the appearance of a 3-dimensional pound sign defining a column passage 51, as shown in FIG. 15. In this fashion, intersecting gusset plates 23a, 23b extend orthogonally with respect to each other. Referring to FIG. 9, the gusset plates 23a, 23b are welded together along vertical fillet welds 29a extending along the intersection corners between the gusset plates, which completes the gusset plate assembly 21. Horizontal fillet welds 29b (broadly, "first gusset plate-to-column welds") at top and bottom edges of the gusset plates 23a, 23b extend transverse to the longitudinal axis of the column 15 and attach the gusset plate assembly 21 to the column. Additionally, fillet welds 29c (broadly, "second gusset plate-to-column welds") in the closed slots 41, 45 in the gusset plates 23a, 23b attach the gusset plate assembly 21 to the column 15 (FIG. 7). In one embodiment, double parallel vertical welds extend within and along a length of each slot 41, 45 and connect at rounded ends of the slot, forming a continuous weld around the perimeter of the slots. The majority of the length of each of the parallel welds 29c extending along the longitudinal axis of the column. The slots 41, 45 are positioned generally at a center of the column faces 20 and thus the welds 29c within the slots 41, 45 provide additional structure for enhancing the moment resisting capabilities of the structure.

Referring to FIGS. 1A-3, horizontal cover plates 27 are disposed on top of and attached to an end of the beams 19. The cover plates 27 have a width that is greater than a width of the respective beam 19 and a horizontal spacing of the associated gusset plates 23. The configuration of the cover plates 27 allows the beams 19 to be lowered between the gusset plates 23 so that each end of the full-length beam assembly 17 is initially supported in bearing between the cover plate 27 and the top edge of the horizontal extension of the gusset plates 23 of the column assembly 13. In other words, the beams 19 are self-shoring. In the illustrated embodiment, the cover plates 27 may rest on a top face of a projecting horizontal leg of upper angle irons 31 attached to the gusset plates 23. The cover plates 27 extend along the length of their respective beams 19 and terminate just beyond the ends of the gusset plates 23. The cover plates 27 have an oblong radiused slot opening 30 extending along the length of the cover plate. It will be understood that the cover plates 27 may have other widths, configurations and slot-type oblong openings. For example, a cover plate (not shown) may have no slot opening 30. Vertical shear plates 32 are welded at 29d to the web of the beam 17 and have holes 26a for connection to the gusset plates 23a, 23b.

The column assembly 13 is bolted to the beam assemblies 17 by bolts 26 extending through aligned bolt holes 26A in the assemblies. In particular, bolts 26 are used to attach the upper angle irons 31 to the cover plates 27, the lower angle irons 33 to the gusset plates 23, and the vertical shear plates 32 to the gusset plates, all through aligned bolt holes 26a in the respective components.

The joint connection structure 11 outlined above is a bi-axial beam-to-column type structure. The structure 11 provides for beam assembly connection along four sides of hollow tubular column 15. Most preferably, each of the components of the joint connection structure 11, as well as the beam 19 and column 15, are made of structural steel. Some of the components of the joint connection structure 11 are united by welding and some by bolting. The welding may be initially performed at a fabrication shop. The bolting may be performed at the construction site, which is the preferred option in many regions of the world. However, it will be understood that the beam assembly 17 can be connected to the column assembly 13 in other suitable ways such as by welding, or in an all-bearing connection.

Referring to FIGS. 4, 5, and 12-16, the column assembly 13 may be fabricated at a fabrication shop and later transported to the construction site. To fabricate the column assembly 13, the gusset plates 23 are mated with each other via the slots 43, 47 (FIGS. 14 and 15). The mated gusset plates 23 are welded to each other to form the rigid gusset plate assembly 21 (FIG. 9). The gusset plate assembly is received on the column 15 by inserting the column in the column passage 51 of the gusset plate assembly 21. During construction of the column assembly 13, the column 15 can be turned on its side to facilitate the insertion of the column through the column passage 51 of the gusset plate assembly 21, and to facilitate welding of the gusset plate assembly to the faces 20 of the column. The gusset plate assembly 21 is then located on the column at a selected position, such as at a predetermined floor location, and welded at 29b or otherwise attached to the faces 20 of the walls of the column 15. In the illustrated embodiment, the gusset plate assembly is welded to the column 15 along horizontal welds 29b located at the top and bottom of the gusset plates 23, and along welds 29c within slots 41, 45. The upper angle irons 31 are welded at 29f or otherwise attached to the gusset plates 23. Thus, at the shop, the column assembly 13 can be constructed exclusively by welds. In a preferred embodiment, the welds 29 are fillet welds. Fillet welds do not require ultra-sonic inspection which results in reduced shop fabrication costs. However, the welds could be groove welds or stitch welds. Other welds and other forms of connection are also within the scope of the present disclosure.

Figure 2:
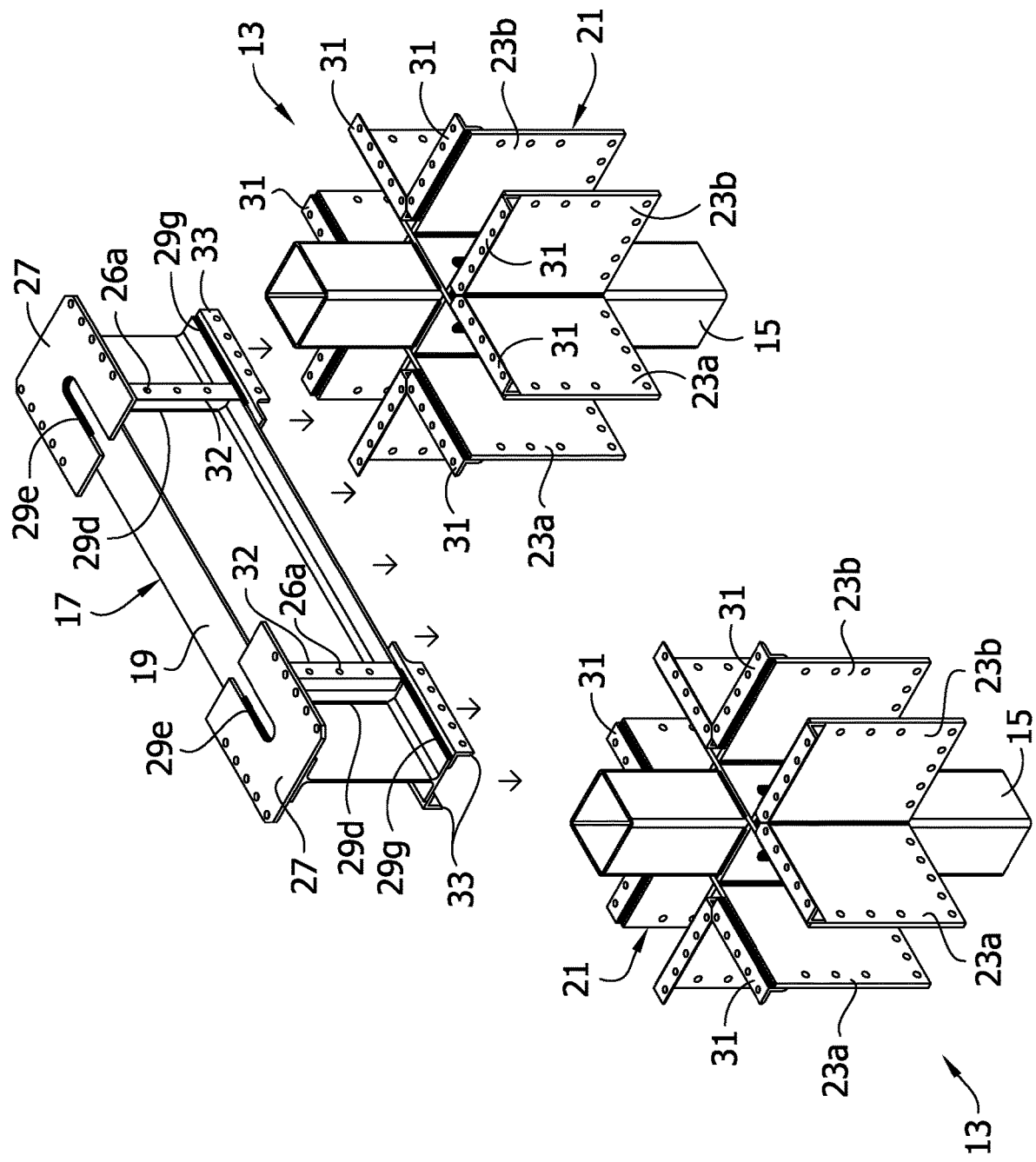
FIG. 2 is a perspective illustrating location of a beam assembly on a pair of column assemblies to construct the bi-axial beam-to-column joint connection structure of FIG. 1A.
Figure 3:
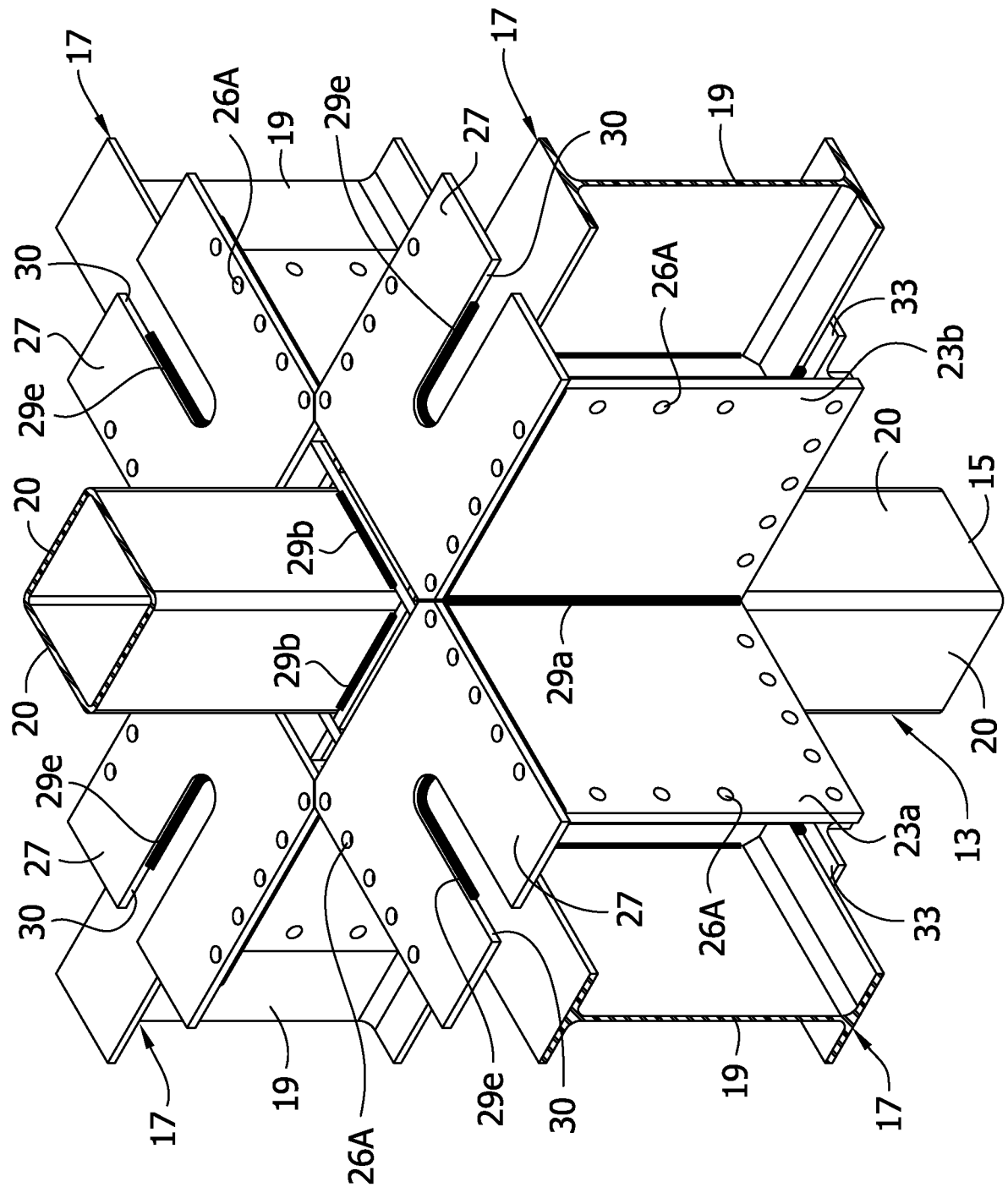
FIG. 3 is the bi-axial beam-to-column joint connection structure of FIG. 1A with bolts removed.
Figure 4:
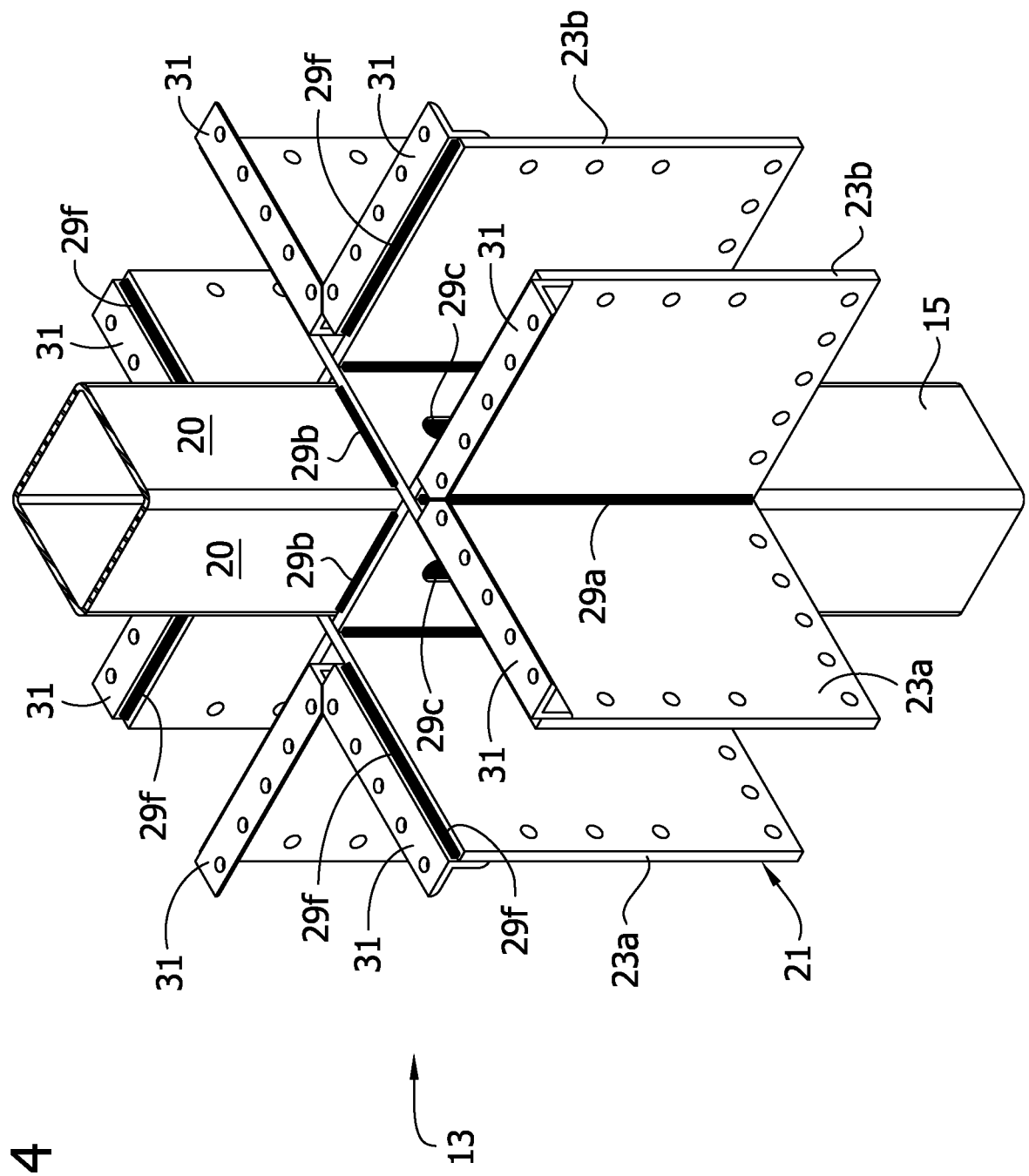
FIG. 4 is a fragmentary perspective of a column assembly of the bi-axial beam-to-column joint connection structure of FIG. 1A.

Referring to FIG. 2, the full-length beam assembly 17 may also be fabricated at a fabrication shop prior to being transported to the construction site. To fabricate the full-length beam assembly 17, the cover plates 27 are welded at 29e or otherwise attached to the upper flange of the beam. Welding (such as by weld 29e) is carried out between the periphery of the slot opening 30 and the top flange of the beam 19, and along the top flange tips of the beam on the underside of the cover plate (not shown). The lower angle irons 33 are welded at 29g or otherwise attached to the bottom flange of the beam 19 and project laterally outwardly from the beam. Any welds needed to form the full-length beam assembly 17 can be carried out at the shop. The shop permits use of fixtures and precision manufacturing techniques to form the collar like gusset plate assembly 21, the column assemblies 13 and the beam assemblies 17 in a highly accurate manner. In a preferred embodiment, the welds 29 are fillet welds. Other welds and other forms of connection are also within the scope of the present disclosure. The cover plate 27 and lower angle irons 33 may have other configurations than those illustrated in the current embodiment.

At the construction site, the column assembly 13 is joined to the full-length beam assemblies 17. The column assembly 13 is first erected in a vertical orientation and the ends of the full-length beam assemblies 17 are positioned horizontally and adjacent to the column assembly, so that each end of the beams is over a respective pair of gusset plates 23. The full-length beam assemblies 17 are then lowered between the gusset plates 23 until the bottom surfaces of the cover plates 27 engage the top surfaces of the upper angle irons 31. This engagement initially locates and supports the full-length beam assemblies 17 on the column assembly 13 to facilitate shoring during erection. To fixedly secure the assemblies 13, 17 bolts 26 are used to attach the upper angle irons 31 to the cover plates 27 and the lower angle irons 33 to the gusset plates 23 through aligned bolt holes 26A in the respective components. Thus, at the construction site, the bi-axial beam-to-column moment-resisting joint connection structure 11, which includes full-length beam assemblies 17, is completed exclusively through bolted connections. In the field, the joint connection structure 11 is constructed without the use of welds. The cover plates 27 are designed to transfer most, if not all, of the vertical shear load from the full-length beams 19, which may eliminate the need for vertical shear plates or vertical shear elements, while also reducing material and construction costs. This beam-to-column all field-bolted joint connection structure 11 employing a hollow tubular column 15 and gusset plates 23 was not appreciated in conventional joint connection structures using hollow tubular columns. It is envisioned, however, that the column assembly 13 can be welded to the beam assemblies 17 without departing from the scope of the disclosure.

The column assembly 13 beneficially distributes the resistance to moments applied by the beams 19 to the column 15 to all four faces 20 of the column, making it well-suited to resist bi-axial loads applied by the beams to the column, particularly in severe load events. This is made possible by the use of welded interlocked orthogonal gusset plates forming the rigid gusset plate assembly 21 that hug the sidewalls and enclose the corners of the column 15. It will be understood that a moment applied by any one or any combination of the four beams will be transmitted by the rigid gusset plate assembly 21 to locations all around the column 15. For example, when a moment is applied on one axis (e.g., as from one beam 19 connected to gusset plates 23b), it is resisted through connections of the gusset plates 23b to the faces 20 of the column 15 parallel to the axis of the beam in a manner similar to gusset plate connections described in U.S. Pat. Nos. 6,138,427, 7,178,296, 8,146,322, and 9,091,065. The connection to the parallel faces 20 of the column 15 provides a force couple (principally acting in shear along the length of the welds 29b) formed by the top and bottom horizontal welds 29b (comprising a horizontal weld group) connecting the gusset plates 23b to their respective adjacent faces 20 of column 15 to resist applied moment. In addition, top and bottom horizontal welds 29b of the near gusset plate 23a facing the end of the beam comprise another horizontal weld group forming a resisting tension/compression force couple acting perpendicular to the near face 20 of the column 15 to resist applied moment. The rigid gusset plate assembly 21 also transmits the moment to the opposite face 20 of the column 15 through its connection to the far gusset plate 23a, by providing a redundant resisting tension/compression force couple (acting perpendicular to the opposite face 20) formed by the top and bottom horizontal welds 29b (comprising yet another horizontal weld group) connecting the far gusset plate 23a to the opposite face 20 to resist the applied moment.

In addition to the foregoing moment resisting features of the column assembly 13, the column assembly is configured to provide further moment resistance unique to bi-axial moments. It can be understood that if moments are being applied to the joint column assembly from beams 19 which are orthogonally arranged with respect to each other, the resolved moment vector would not lie in a vertical plane including the longitudinal axis of either beam. Instead, the moment vector would lie in a vertical plane somewhere in between orthogonal beams 19, and would therefore urge the gusset plate assembly 21 to tilt on the column along a diagonal between the longitudinal axes of said orthogonal beams 19. In this case, adjacent, near orthogonal faces 20 of the column 15 provide cooperative moment resistance. More specifically, the welds 29c in the vertical slots 41, 45 in the gusset plates 23a, 23b, which are located at the mid-depth of the column 15 on the adjacent faces 20 orthogonal to each other, provide additional moment-resisting capacity by coupling the same vertical slot welds 29c located in their respective slots 41, 45, which act together orthogonally as a vertical weld group to provide a force couple to resist the applied bi-axial moment. The rigid gusset plate assembly 21 also transfers the bi-axial moments to the far orthogonal faces 20 of the column 15, which comprises another vertical weld group to provide additional cooperative moment resistance. Both the near orthogonal faces 20 and far orthogonal faces act in concert with the moment resistance force couples described in the preceding paragraph to make the column assemblies 13 and joint connection structures 11 formed using the column assemblies remarkably robust.

Concurrently, load transfer redundancy can also be provided under severe load conditions by a 'push/pull' effect of opposite gusset plates 23a (facing perpendicular to the longitudinal axis of the beam) bearing against the same opposite faces 20 of the column 15 under the applied moment. Thus, opposing faces 20 of the column 15 cooperate to resist moment (under extreme load conditions) from one beam 19, in addition to resistance provided by the welded connection of the gusset plates 23b to the orthogonal side faces 20 of the column 15, thereby providing redundancy in resisting applied moment. It will be understood that the column assembly 13 is configured to resist applied moment in the way just described for moment applied for only one beam 19, for as many as all the four beams 19 in the joint connection structure 11 made possible by bi-axial interaction of all aforementioned load transfer mechanisms.

Beam-to-column moment-resisting joint connection structures 11 including a column assembly 13 having a hollow tubular column 15 and the gusset plate assembly 21 described above have been shown to perform extraordinarily well during full-scale simulated earthquake testing. The testing included two uniaxial moment frame test specimens configured with axially-loaded thin-walled HSS columns that were moment connected to wide flange beams using all field-bolted side plate moment connection technology such as disclosed in U.S. Pat. No. 9,091,065, incorporated herein by reference. The HSS columns were pre-loaded axially in compression to 40% of their nominal yield strength, since axial load can have a dominant role on local buckling of HSS shapes. The applied axial load of 40% was selected based on a suite of parametric studies which concluded that this level of axial compression in steel moment frame columns envelopes approximately 95% of typical multi-story buildings. An 18" square HSS column flange widthto-wall thickness ratio ($b_f/t_f$) for one of two test specimens was set at 21, as compared to the maximum $b_f/t_f$ limit of 13.2 allowed by AISC 358 Seismic Provisions, to ascertain if local buckling will occur using the beam-to-column side plate moment connection technology described herein.

The side plate test specimen consisting of a square 18" HSS column (HSS 18×18×¾) having a $b_f/t_f$ ratio of 21, pre-loaded with an axial compression load of 40% of its nominal yield strength, and connected to a 24" deep wide flange beam (W24×84), was cyclically loaded to ultimate beam failure with no indications of column distress. Thus, contrary to the industry perception that HSS type columns could not withstand seismic loading, the thin-walled HSS column assembly demonstrated extraordinary and robust cyclic performance when subjected to severe simulated earthquake loading. The HSS column assembly achieved two full cycles of joint rotation at 6% radians of steel moment frame drift, compared to the industry prequalification requirement (AISC 358 Seismic Provisions) of only one full cycle at 4% radians of steel moment frame drift. Therefore, the HSS column assembly proved not only to be adequate for withstanding seismic loading, the assembly exceeded current industry standards.

Further, the unique geometry and stiffness of this all shop fillet-welded and all field-bolted, bi-axial, beam-to-column moment-resisting joint connection structure 11 maximizes its performance and the broadness of its design applications, including both extreme wind and moderate-to-severe seismic conditions. In particular, the all field-bolted joint connection structure 11 preserves the physical separation (or gap) between the end of a full-length beam 19 and the face of the column 15 made possible by the use of vertically and horizontally extended parallel gusset plates 23 that sandwich the column and the beam similar to prior designs which feature an all field fillet-welded joint connection structure; thus reducing the uncertainty of bending moment load transfer between a rigidly attached steel moment frame beam and column used in the past.

Further, by including the vertically and horizontally extending parallel gusset plates 23 that sandwich both the columns 15 and the beams 19, this current bi-axial application of an all field-bolted joint connection structure 11 preserves the advantage of increased beam-to-column joint stiffness, with a corresponding increase in overall steel moment frame stiffness, which results in smaller beam sizes when the building design is controlled by lateral story drift (not member strength), and hence reduced material costs. When the building design is controlled by member strength (not lateral story drift), this bi-axial all field-bolted joint connection structure 11 also reduces the beam size and the column size, and hence material quantities and cost, because its connection geometry has no net section reduction in either the beam or the column (i.e., no bolt holes through either the beam or column), thereby maintaining the full strength of the beam and column.

In one aspect of the present disclosure, full-length beams are connected to gusset plates by bolts so that the full-length beam and gusset plates are substantially free of welded connection. It will be understood that welding the full-length beam assemblies 17 to the column assembly 13 is within the scope of that aspect of the disclosure.

Referring to FIG. 16, the bi-axial beam-to-column moment-resisting joint connection structure 11 is shown with column 15 filled with concrete C. Even greater load capacity and ductility can be provided, when the column 15 is filled with concrete. For example, additional ductile load carrying capacity is achieved through confining the concrete by the surrounding column section. This provides a closed jacket of steel to preclude bursting of hardened concrete when subjected to heavy axial compression. Further, the concrete provides an inherent resistance to the possibility of out-of-plane buckling of the thin side walls of the column 15.

Figure 17:
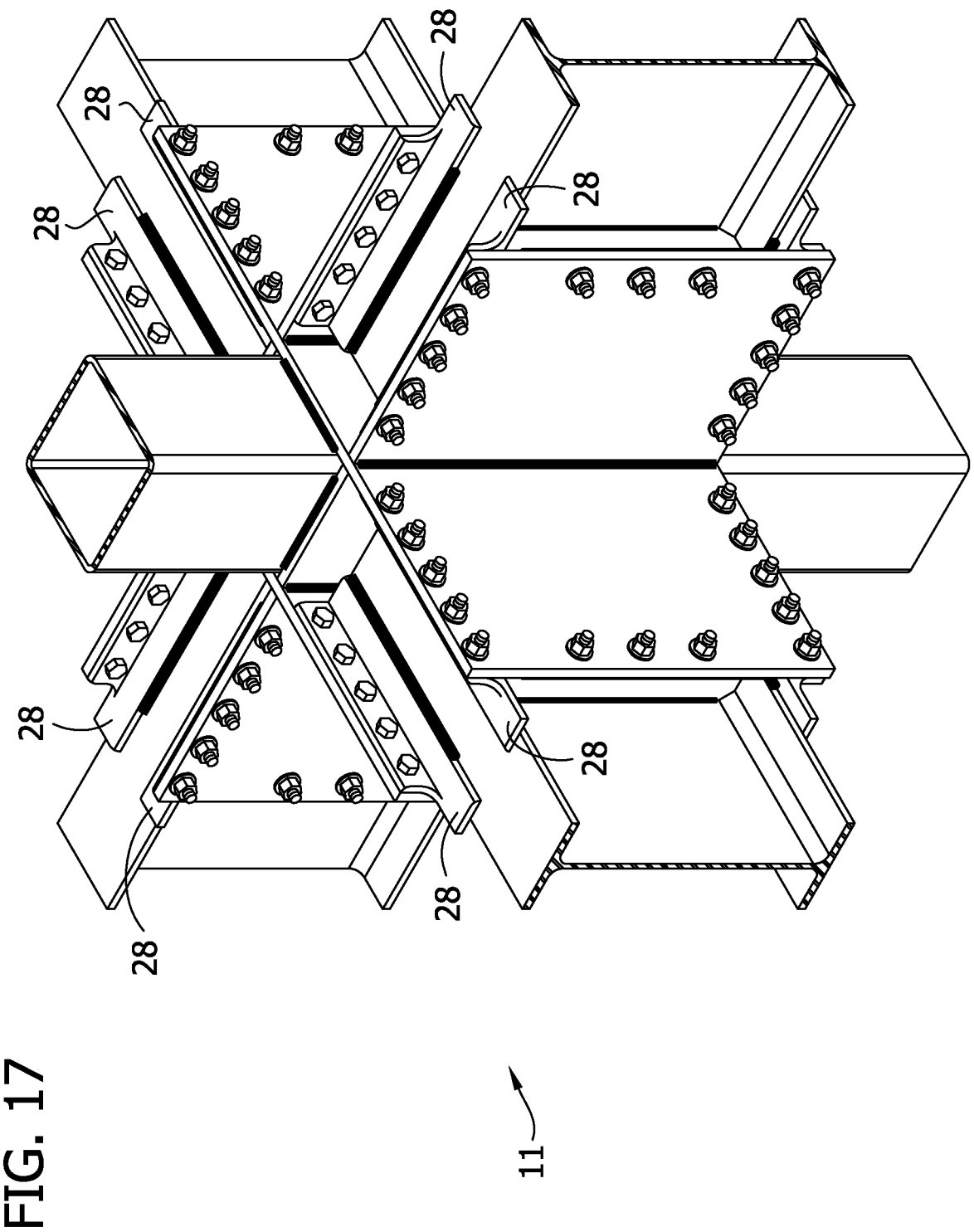
FIG. 17 is the bi-axial beam-to-column joint connection structure of FIG. 1A showing alternative connecting members for attaching a column assembly of the structure to a beam assembly of the structure.

Referring to FIG. 17, the bi-axial beam-to-column moment-resisting joint connection structure 11 is shown with upper angle irons 28 instead of cover plates 27. The angle irons 28 are in the illustrated embodiment welded to the beams 19 prior to being shipped to the construction site.

Figure 18:
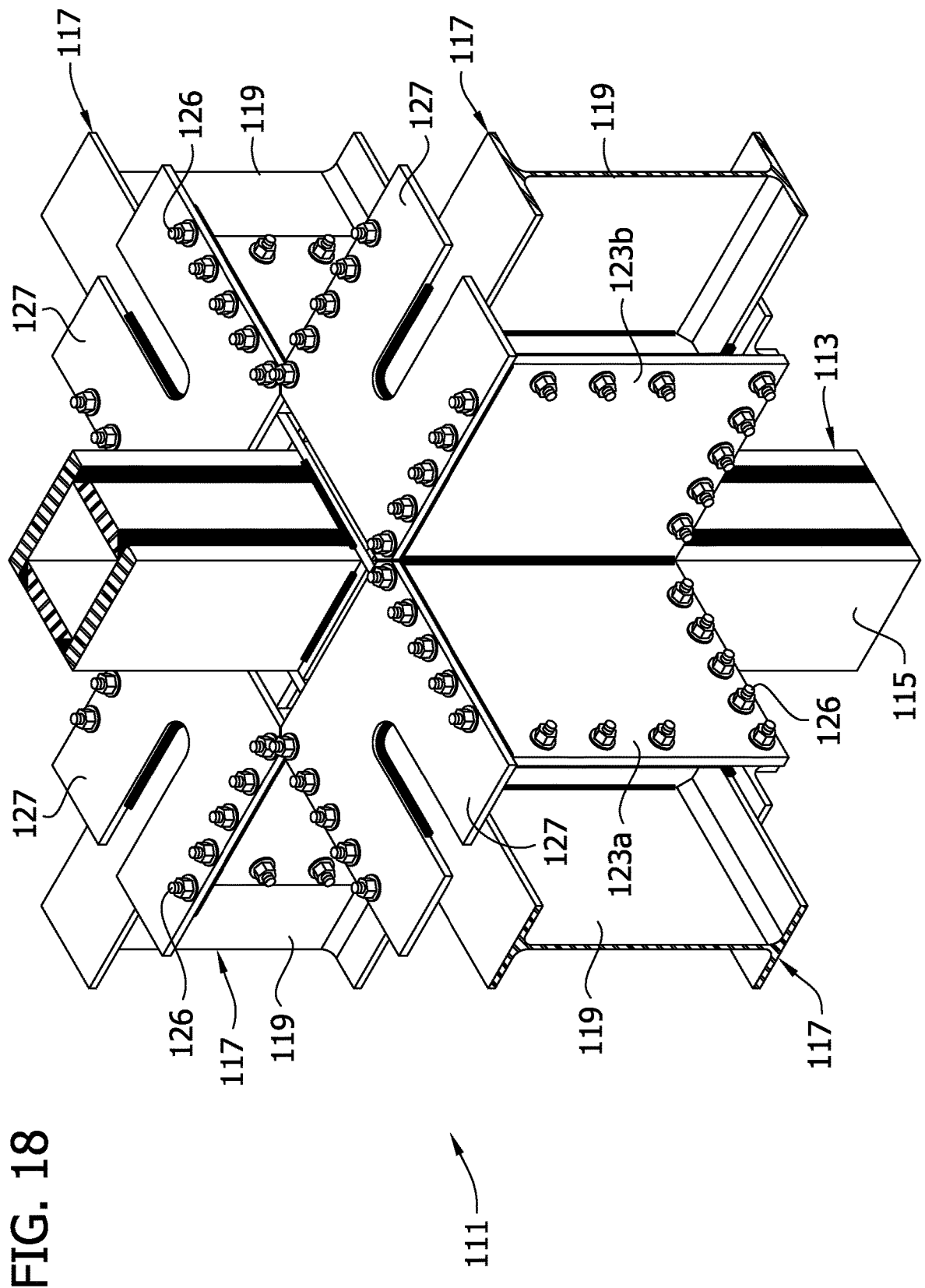
FIG. 18 is a fragmentary perspective of a four-sided bi-axial beam-to-column joint connection structure including a column assembly of a second embodiment.
Figure 19:
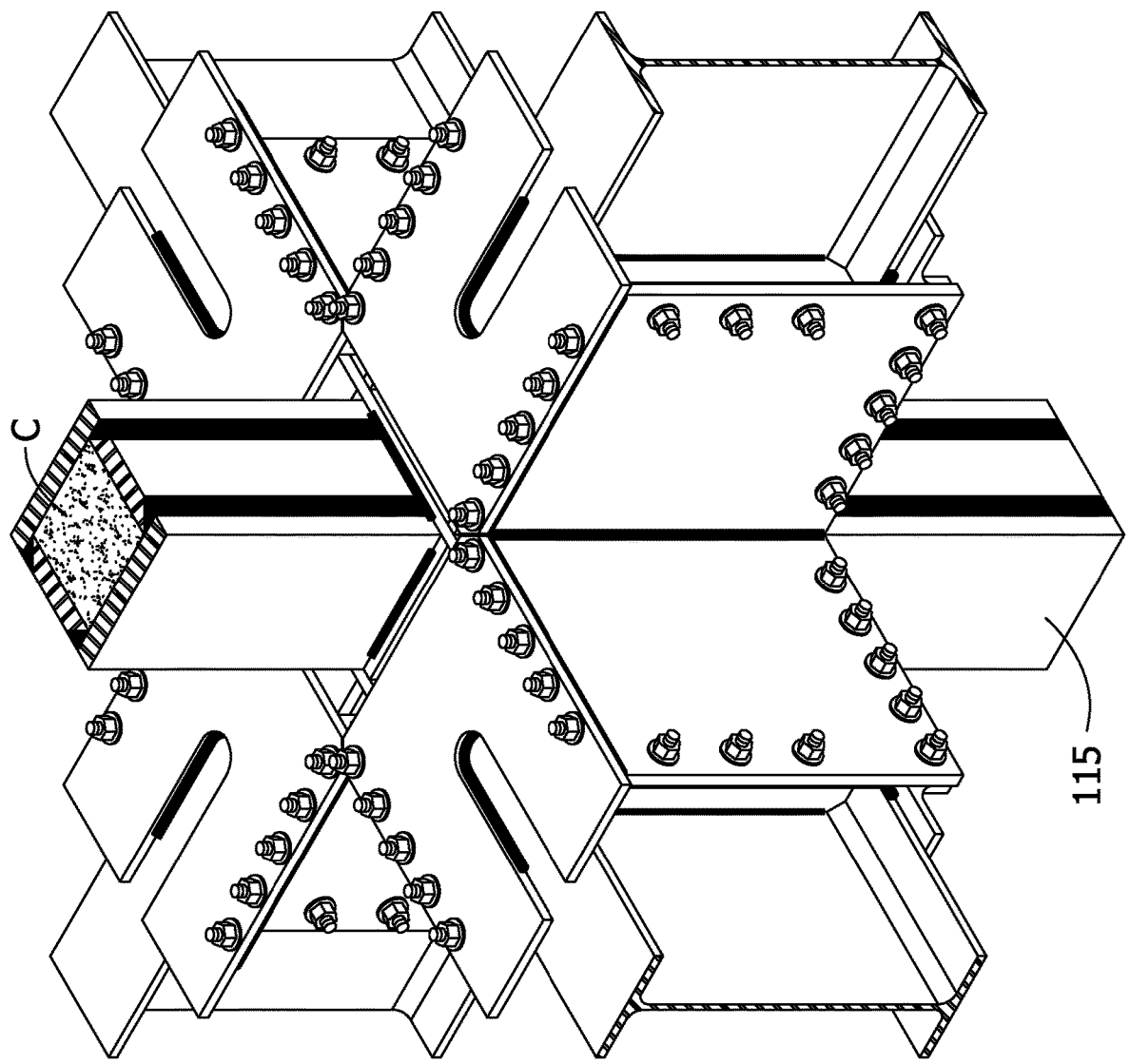
FIG. 19 is the bi-axial beam-to-column joint connection structure of FIG. 18 with cement placed in an interior of a column of the column assembly.
Figure 20:
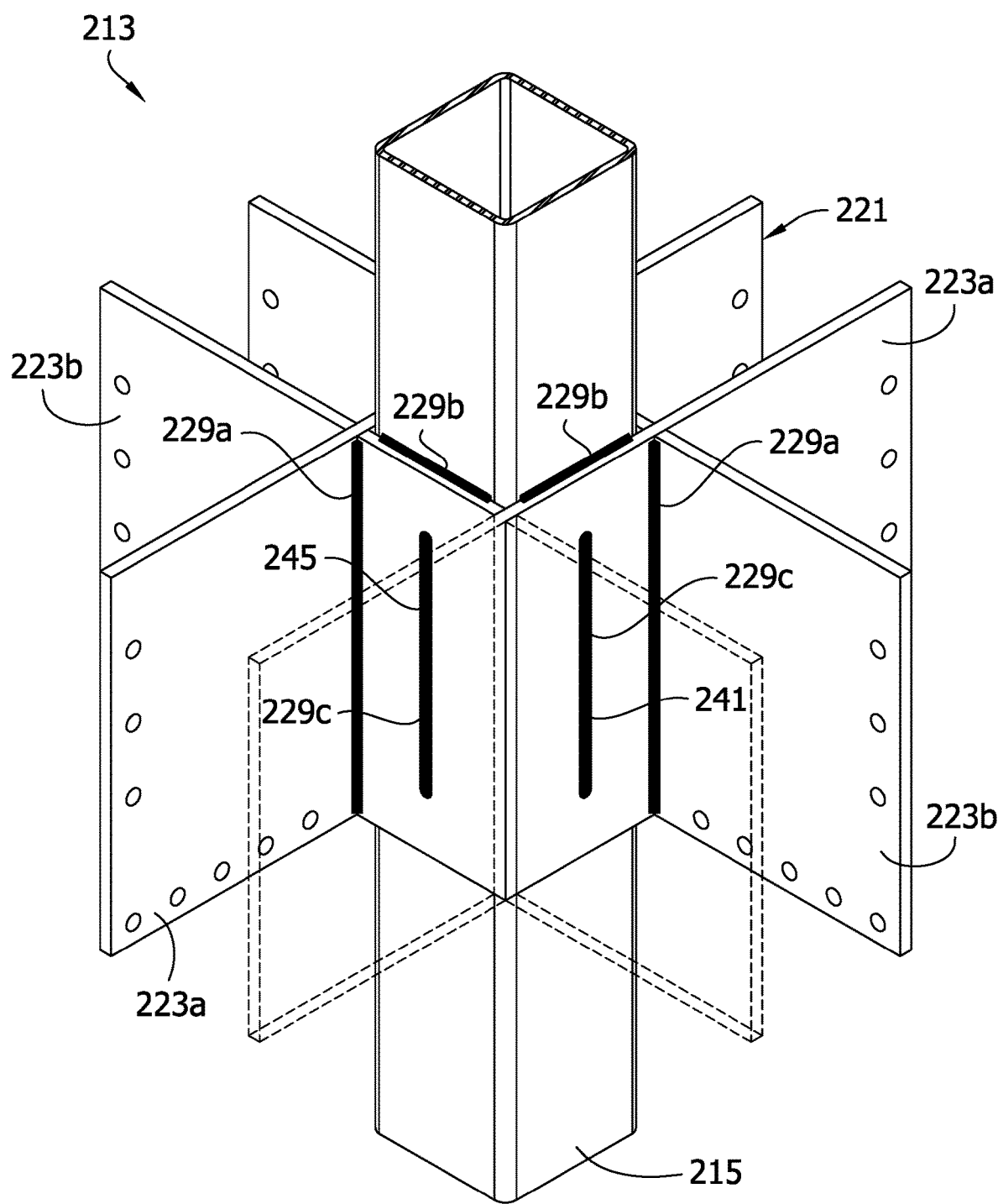
FIG. 20 is a fragmentary perspective of a column assembly of a third embodiment for use in a bi-axial beam-to-column joint connection structure.
Figure 21:
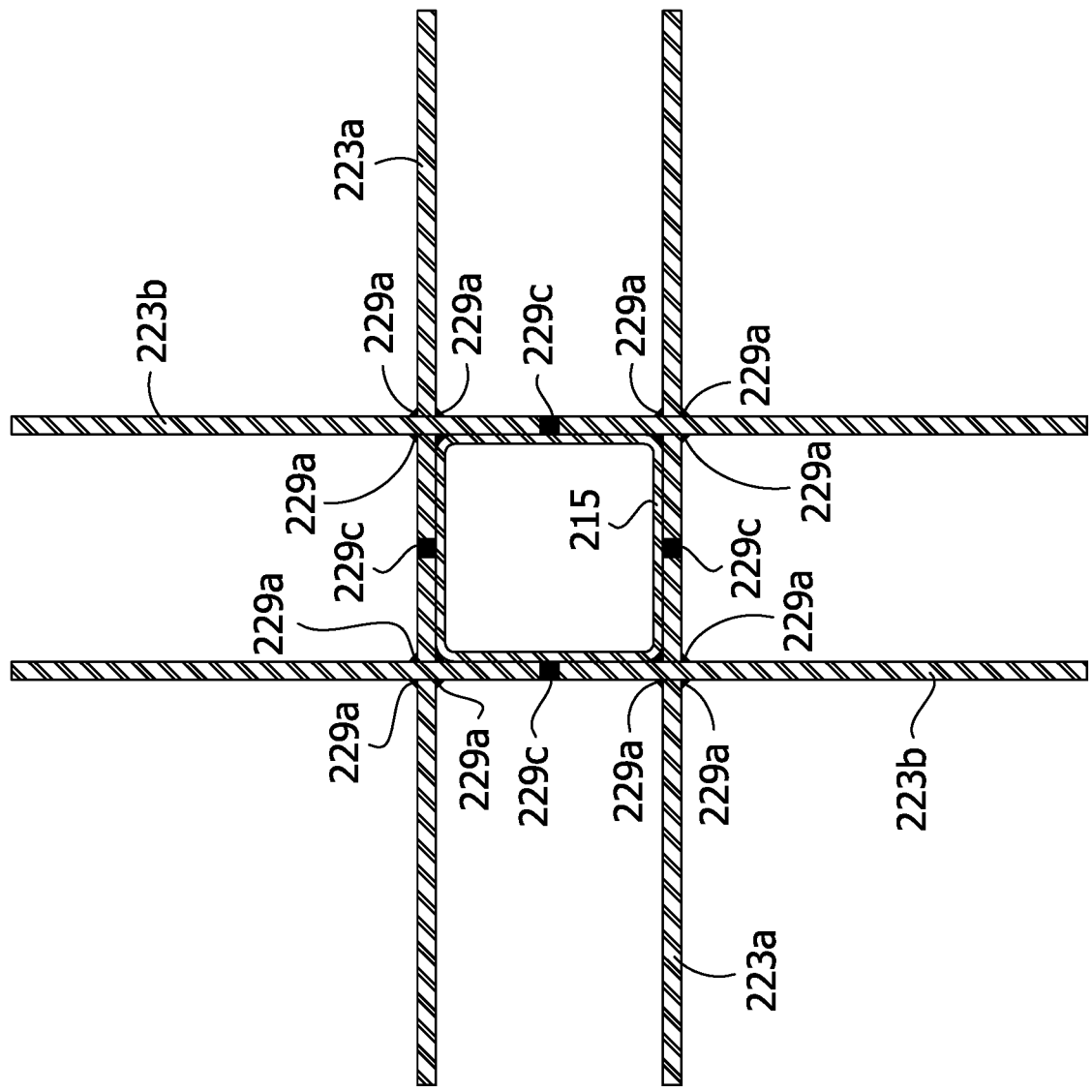
FIG. 21 is a horizontal section of the column assembly of FIG. 20.
Figure 22:
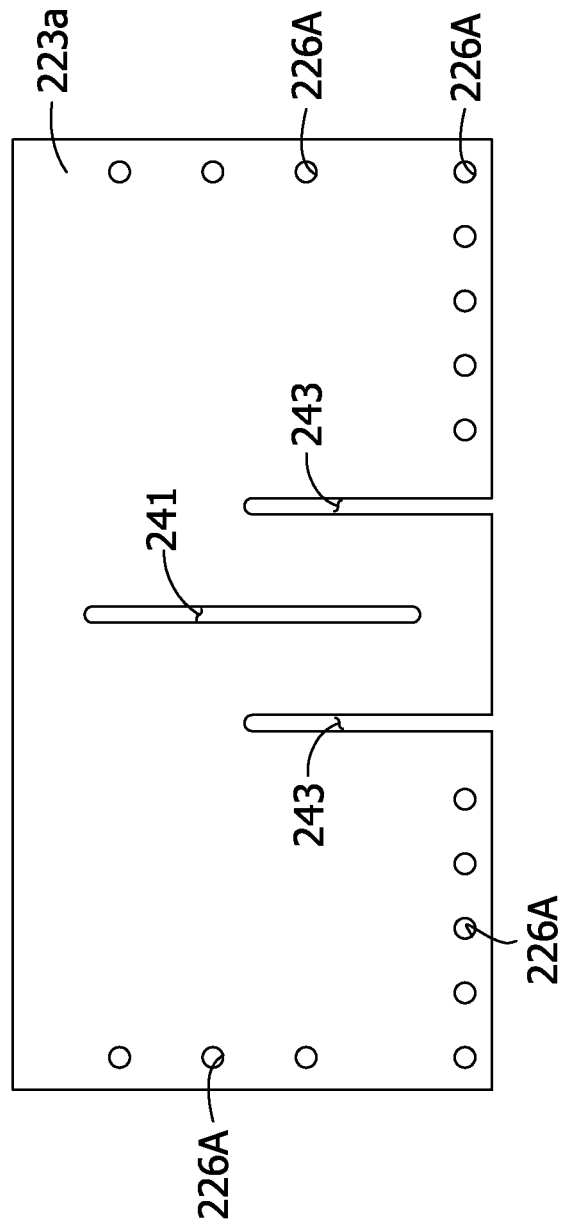
FIG. 22 is a front view of a first gusset plate of a gusset plate assembly of the column assembly of FIG. 20.
Figure 23:
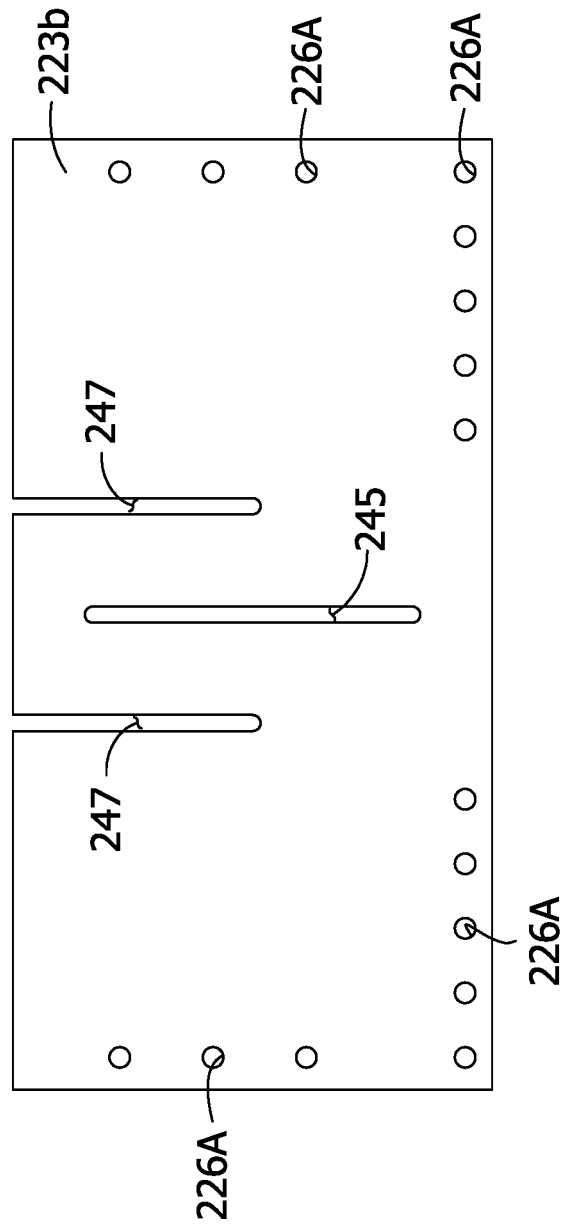
FIG. 23 is a front view of a second gusset plate of the gusset plate assembly of the column assembly of FIG. 20.
Figure 24:
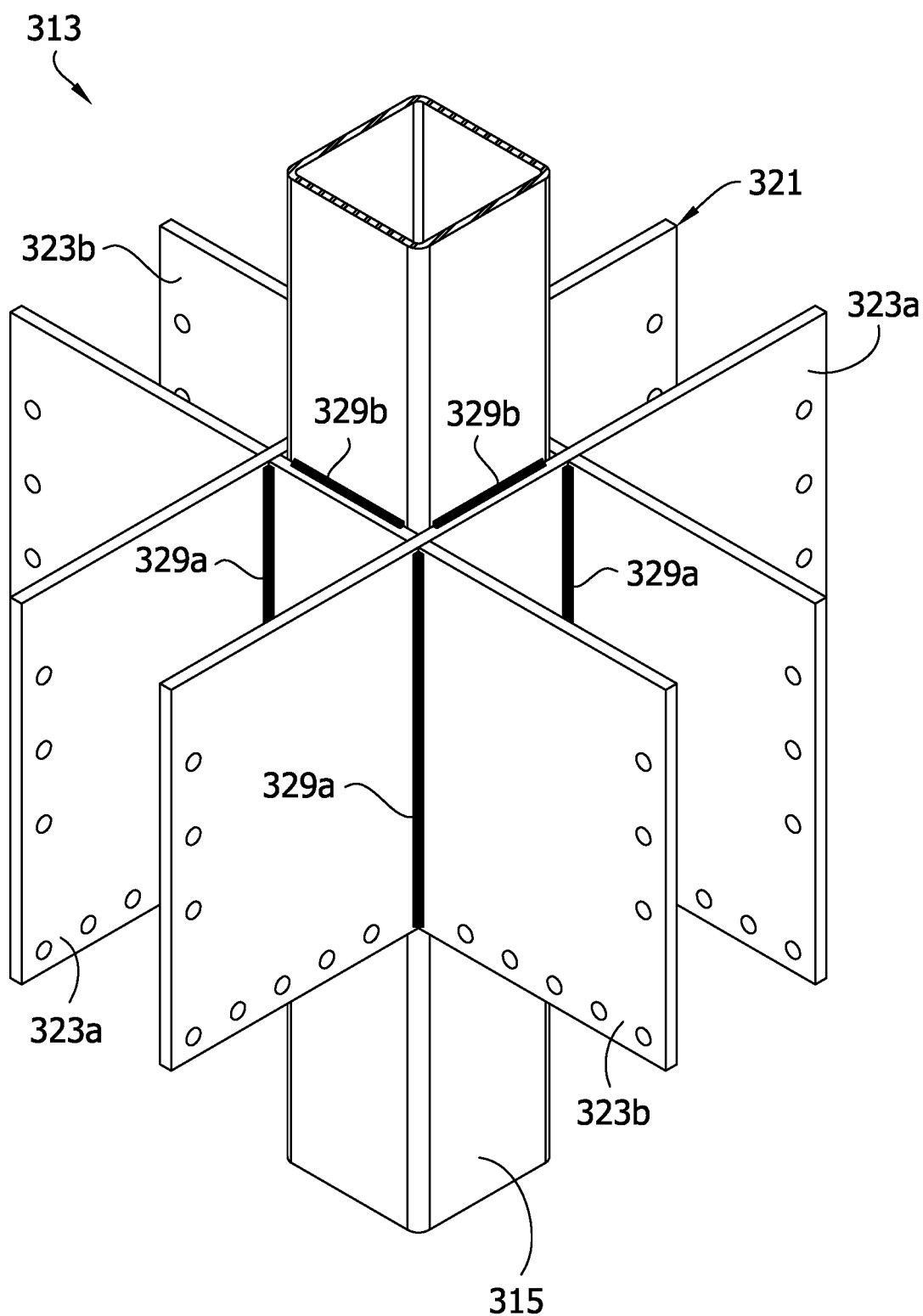
FIG. 24 is a fragmentary perspective of a column assembly of a fourth embodiment for use in a bi-axial beam-to-column joint connection structure.
Figure 25:
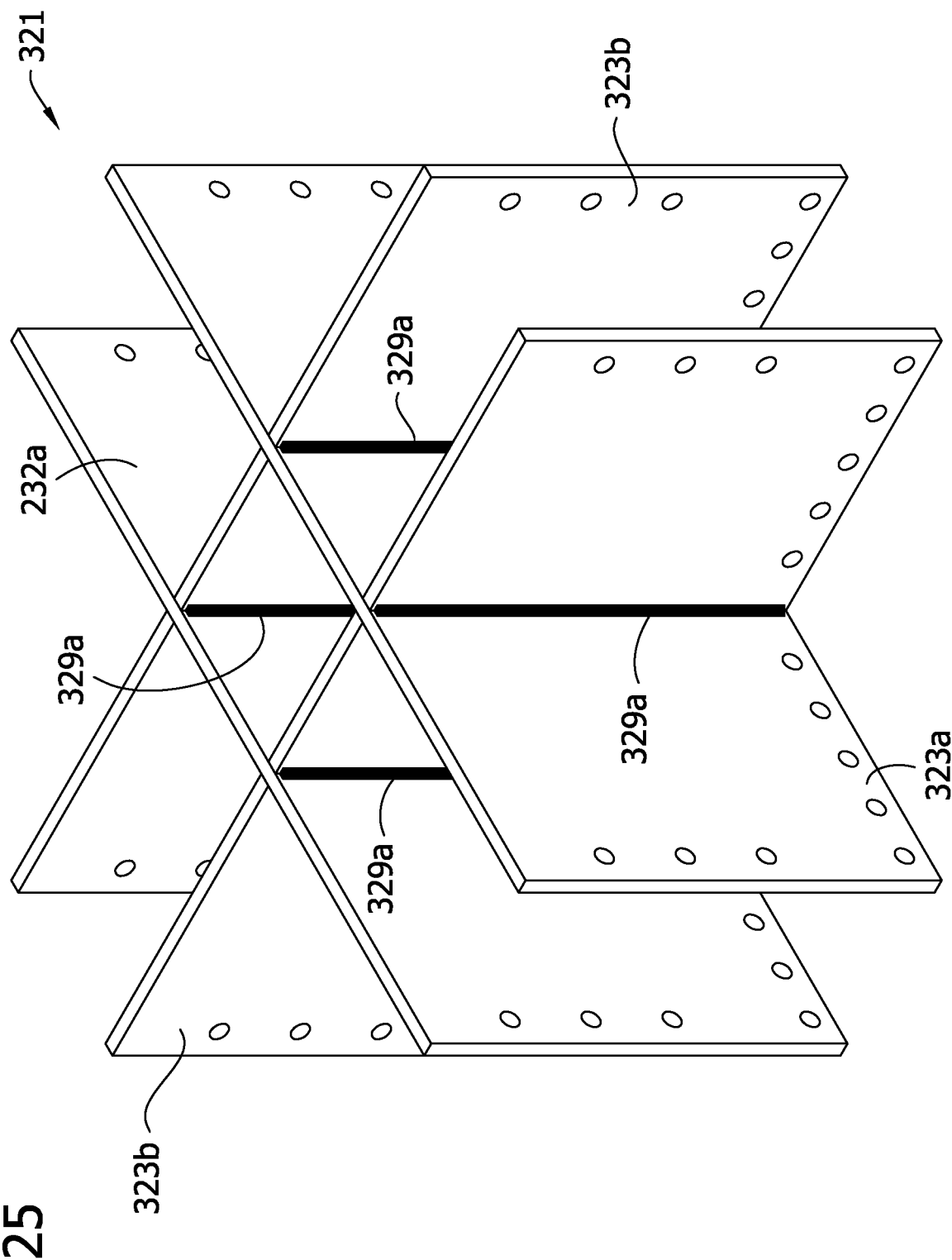
FIG. 25 is a perspective of a gusset plate assembly of the column assembly of FIG. 24.
Figure 26:
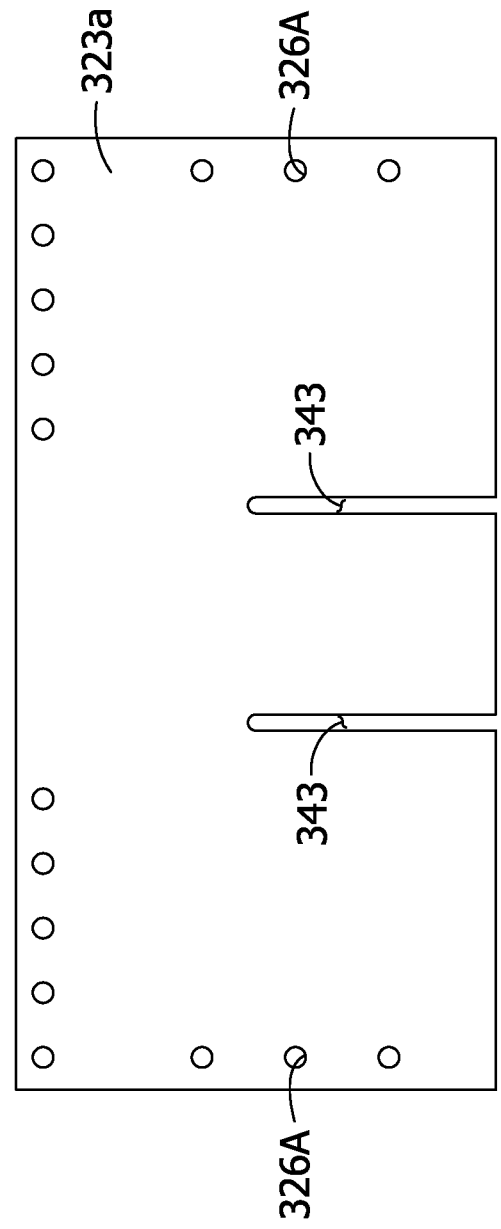
FIG. 26 is a front view of a first gusset plate of the gusset plate assembly of FIG. 25.
Figure 27:
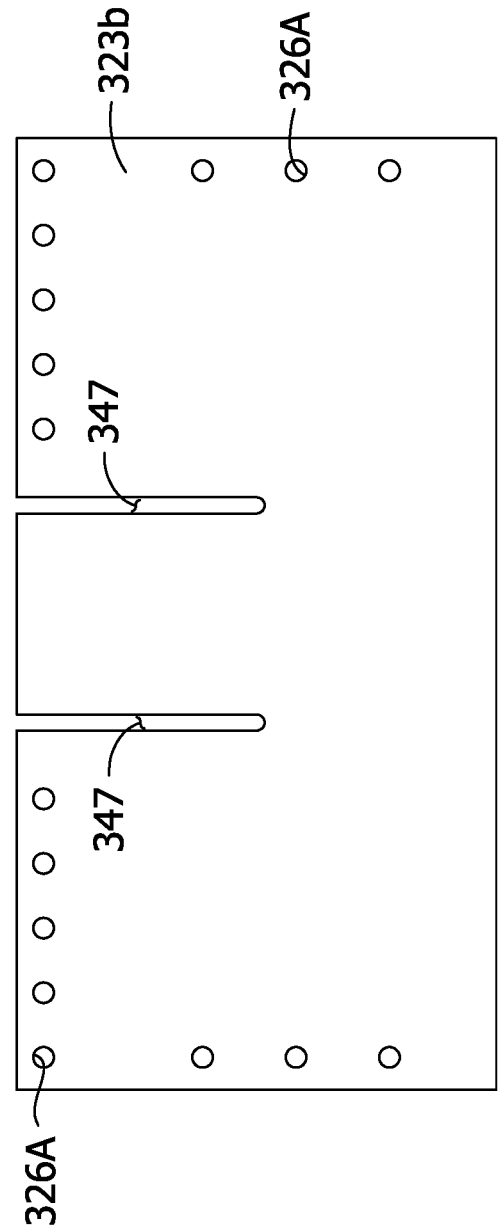
FIG. 27 is a front view of a second gusset plate of the gusset plate assembly of FIG. 25.
Figure 28:
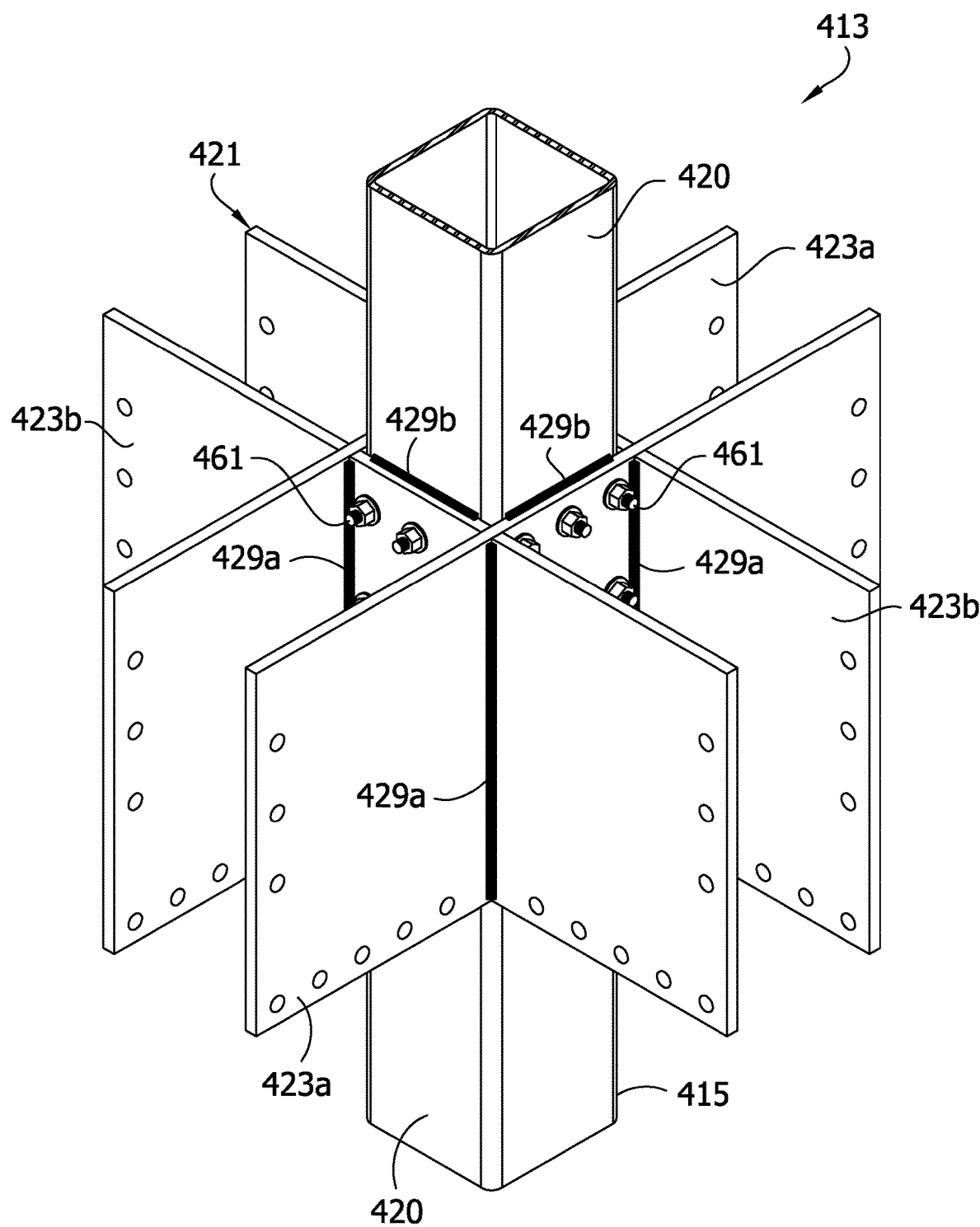
FIG. 28 is a fragmentary perspective of a column assembly of a fifth embodiment for use in a bi-axial beam-to-column joint connection structure.
Figure 29:
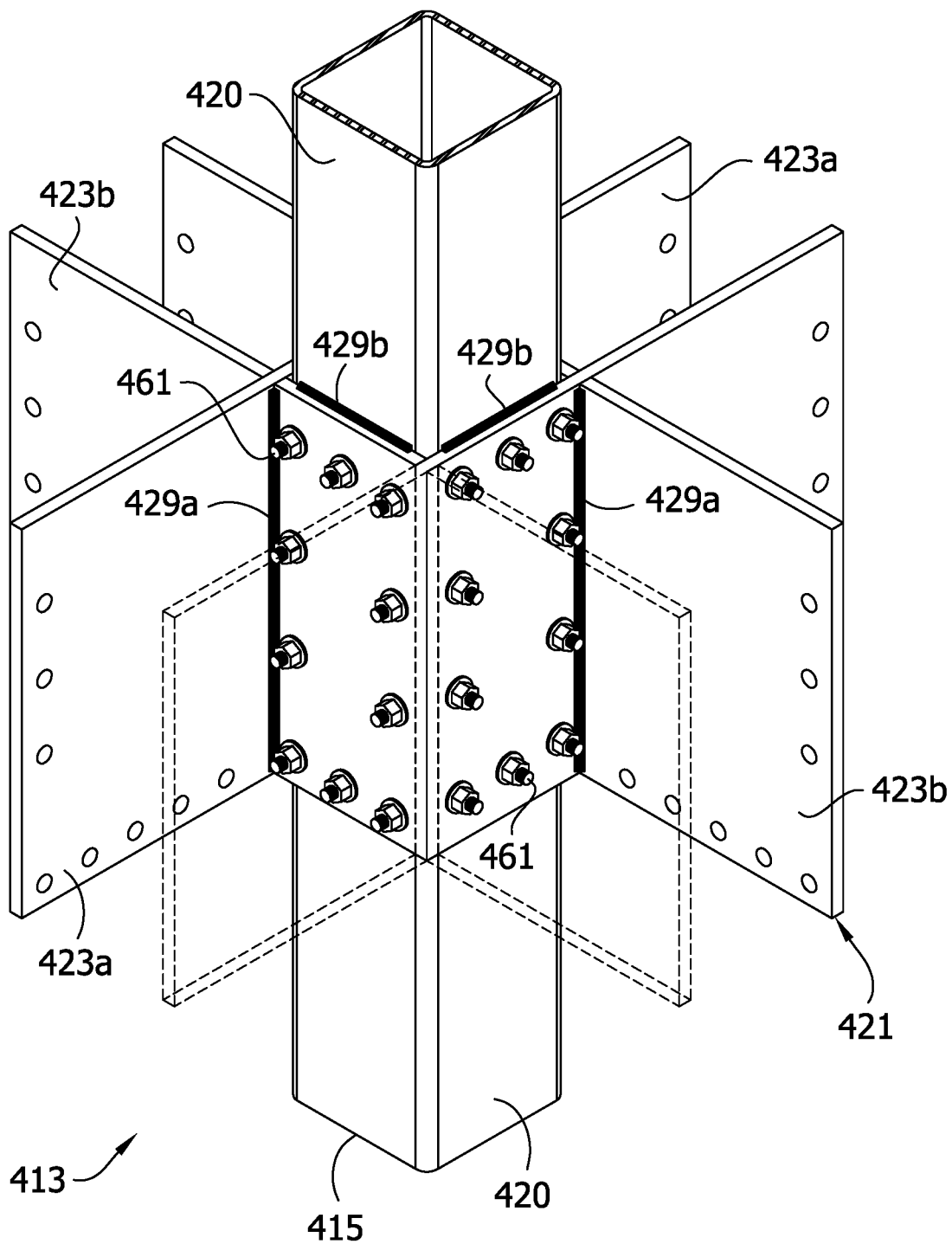
FIG. 29 is the column assembly of FIG. 28 showing portions of gusset plates of the assembly in phantom.
Figure 30:
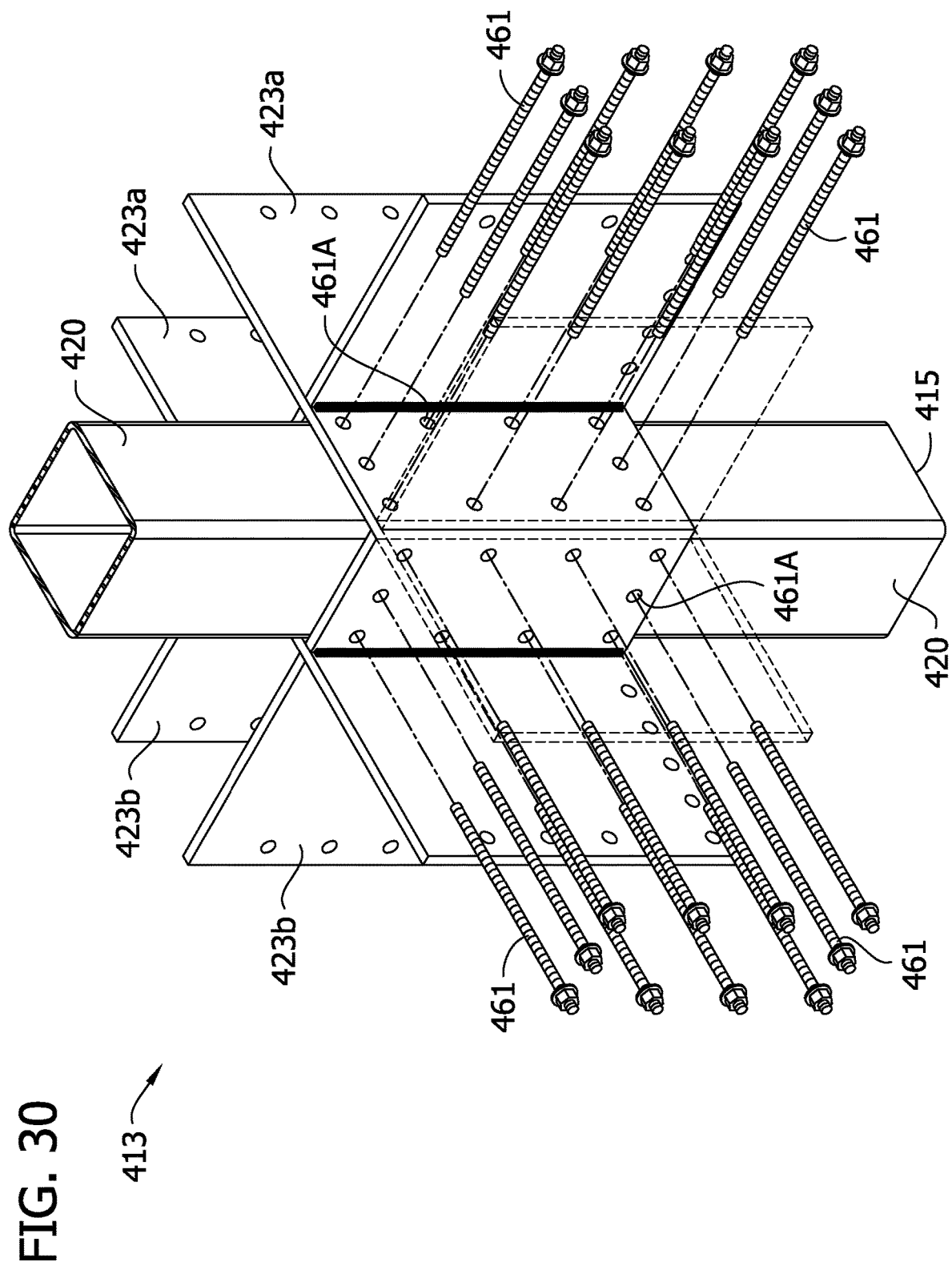
FIG. 30 is an exploded view of the column assembly of FIG. 29.
Figure 31:
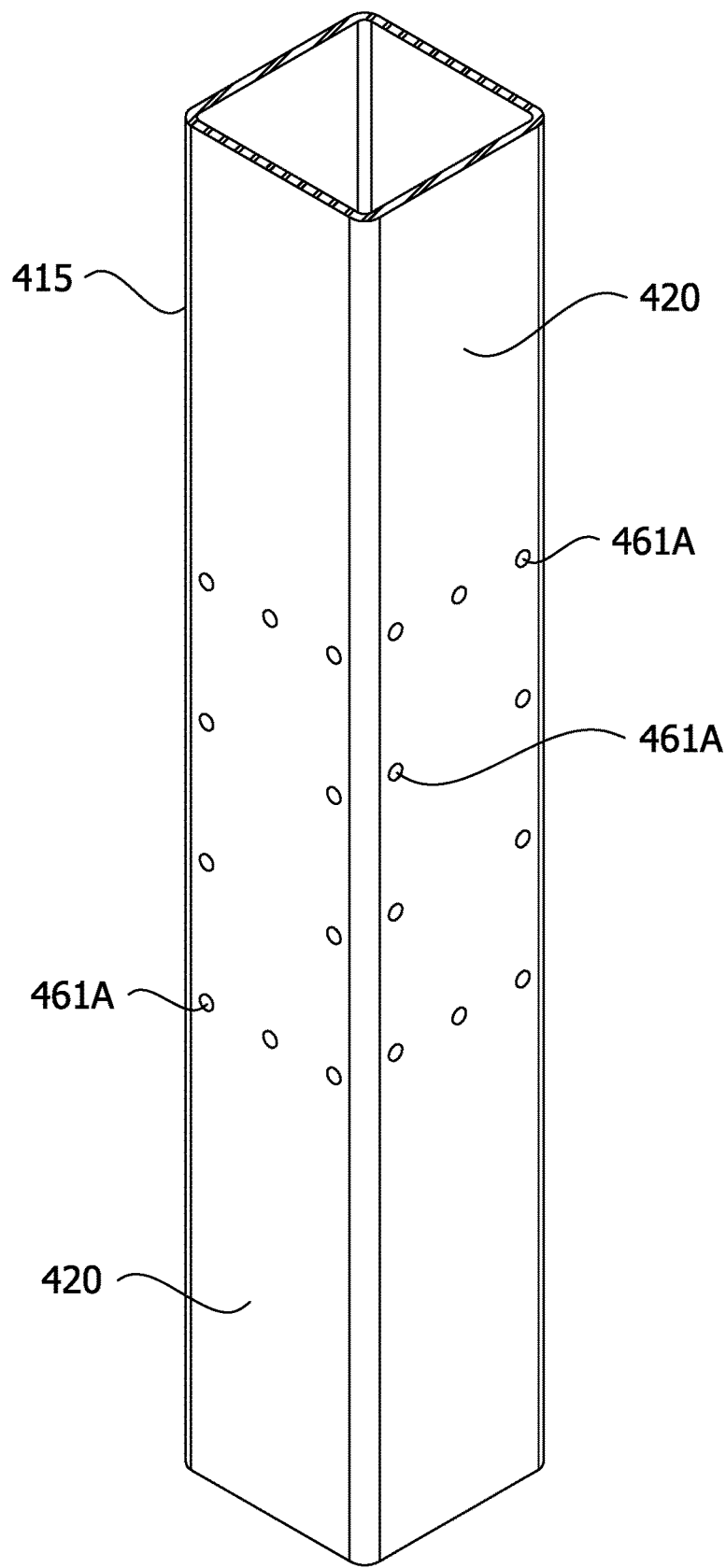
FIG. 31 is a fragmentary perspective of a column of the column assembly of FIG. 28.
Figure 32:
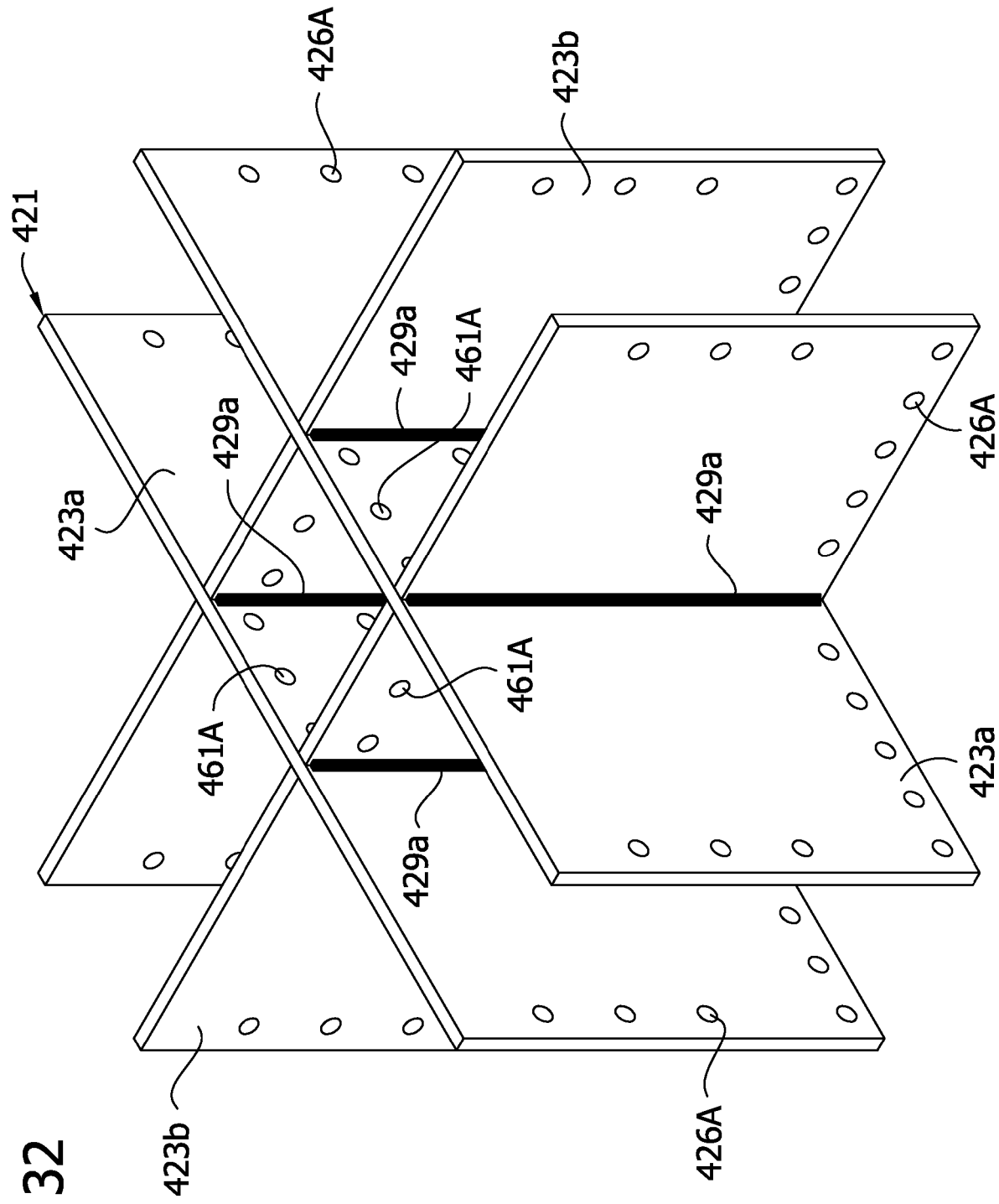
FIG. 32 is a perspective of a gusset plate assembly of the column assembly of FIG. 28.
Figure 33:
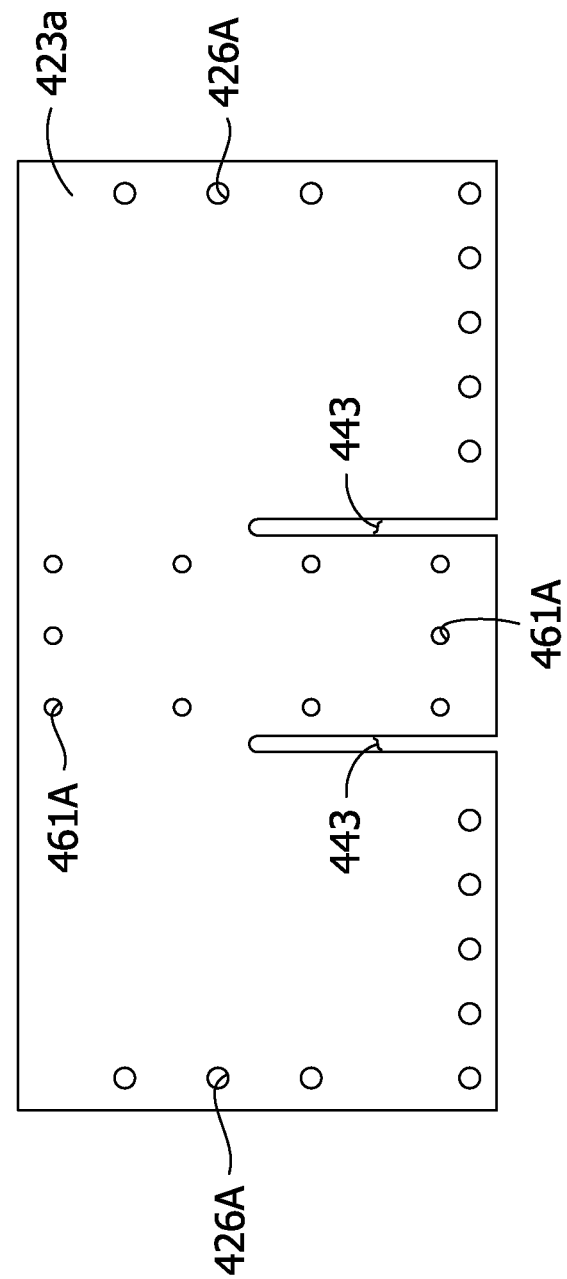
FIG. 33 is a front view of a first gusset plate of the gusset plate assembly of FIG. 32.
Figure 34:
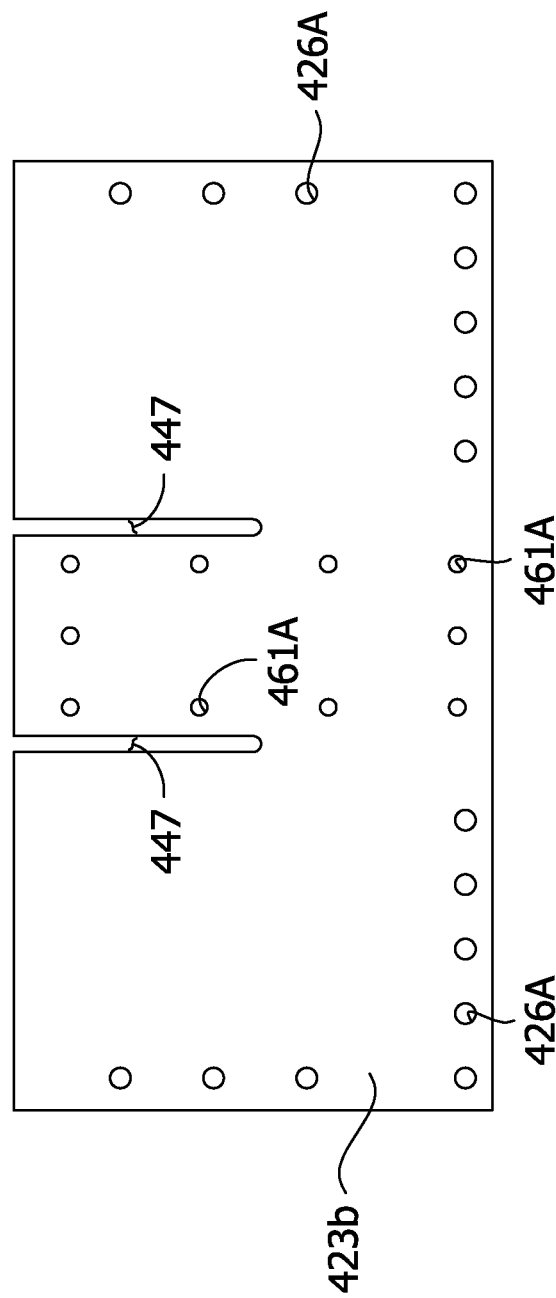
FIG. 34 is a front view of a second gusset plate of the gusset plate assembly of FIG. 32.
Figure 35:
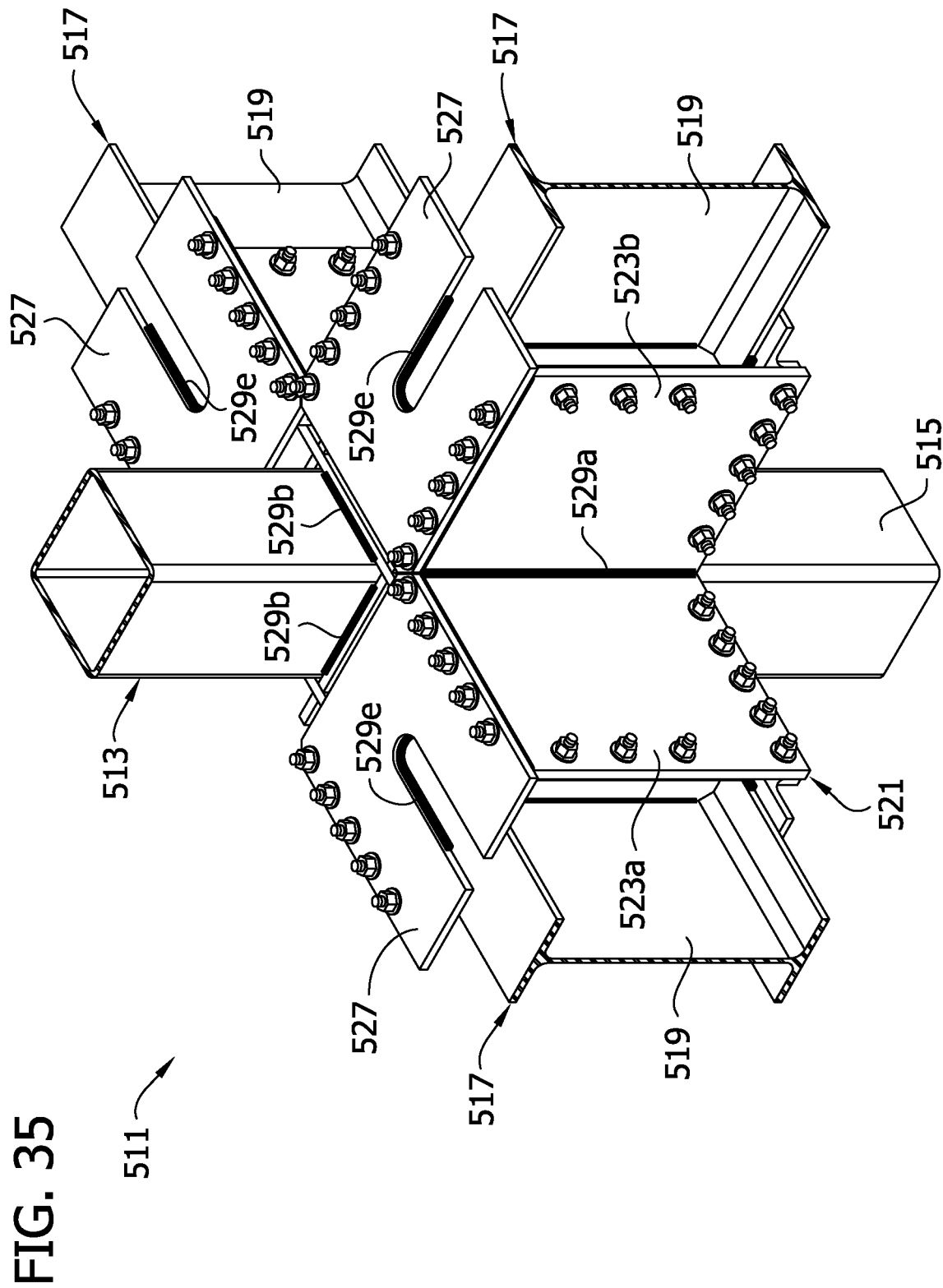
FIG. 35 is a fragmentary perspective of a bi-axial beam-to-column joint connection structure including a column assembly of a sixth embodiment.

Referring to FIG. 18, a bi-axial beam-to-column moment-resisting joint connection structure of a second embodiment is generally indicated at 111. The joint connection structure of the second embodiment is substantially identical to the structure 11 of the first embodiment except HSS column 15 is replaced with a built-up box column 115. Parts of the joint connection structure 111 of the second embodiment corresponding to those of the joint connection structure 11 of the first embodiment are given the same reference numeral plus "100". Hollow steel built-up box section columns are typically used in the design of high rise buildings, specialty structures, and residential towers. Referring to FIG. 19, the bi-axial beam-to-column moment-resisting joint connection structure 111 is shown with built-up box column 115 filled with concrete C.

Referring to FIGS. 20-23, a column assembly of a third embodiment is generally indicated at 213. The column assembly 213 of the third embodiment is substantially identical to the column assembly 13 of the first embodiment. Parts of the column assembly 213 of the third embodiment corresponding to those of the column assembly 13 of the first embodiment will be given the same reference numeral plus "200". This numbering convention is repeated in subsequent embodiments. The only differences between the column assembly 213 of the third embodiment and the column assembly 13 of the first embodiment is the gusset plates 223a, 223b of the gusset plate assembly 221 of the third embodiment each have a narrow closed slots 241, 245 extending vertically along the gusset plates. Further, plug welds 229c fill the narrow closed slots 241, 245. In the illustrated embodiment, the plug welds 229c comprise square groove slot welds that extend along and fill the slots 241, 245 to provide proportionally reduced moment-resisting strength as compared to the fillet welds 29c in the slots 41, 45 in the first embodiment. The method of assembling the gusset plate assembly 221 is identical to the method of assembling the gusset plate assembly 21 of the first embodiment, and the method of constructing the column assembly 213 is otherwise identical to the method of constructing the column assembly 13 of the first embodiment. Further the column assembly 213 can be attached to full-length beam assemblies in the same fashion as column assembly 13 of the first embodiment.

Referring to FIGS. 24-27, a column assembly of a fourth embodiment is generally indicated at 313. The column assembly 313 of the fourth embodiment is substantially identical to the column assembly 13 of the first and third embodiments. The only difference between the two embodiments is the removal of the closed slots 41, 45 in the gusset plates. The method of assembling the gusset plate assembly 321 is identical to the method of assembling the gusset plate assembly 21 of the first embodiment, and the method of constructing the column assembly 313 is otherwise identical to the method of constructing column assembly 13 of the first embodiment. The primary difference being that the gusset plate assembly 313 is not welded to the column 315 within vertical slots in the gusset plates 323. Further, the column assembly 313 can be attached to full-length beam assemblies in the same fashion as column assembly 13 of the first embodiment.

Referring to FIGS. 28-34, a column assembly of a fifth embodiment is generally indicated at 413. The column assembly 413 of the fifth embodiment is similar to the column assembly 313 of the fourth embodiment. The primary difference between the two embodiments is gusset plate assembly 421 is attached to column 415 by a threaded through-rod connection, instead of being welded to the column. In particular, threaded rods 461 extend through aligned rod holes 461A in the gusset plates 423 and the column 415 to secure the gusset plate assembly 421 to the column 415. Each planar face 420 of the column 415 includes rod holes 461A. Each rod hole in a face 420 of the column 415 is axially aligned with a rod hole in an opposing face 420 of the column. The gusset plates 423 have oversized rod holes 461A configured to align with the standard rod holes 461A in the column 415. The threaded rods 461 extend through vertically aligned oversized rod holes 461A in the gusset plates 423 and the rod holes 461 in opposing faces of the column 415. During construction of the column assembly 413, the column 415 can be turned on its side to more easily facilitate insertion of the threaded rods 461. Rod holes 461A in adjacent faces of the column 415, and their corresponding oversized rod holes 461A in the gusset plates 423, are axially offset from each other so that the threaded rods 461 extending through the adjacent sides of the column assembly will not interfere with each other. In the illustrated embodiment, the rod holes 461A are arranged in a rectangular pattern on the faces of the column 415 and the gusset plates 423. However, the rod holes 461A could be arranged in a different pattern without departing from the scope of the disclosure. In the illustrated embodiment, the gusset plate assembly 421 is also attached to the column 415 by top and bottom horizontal welds 429b. However, it will be understood that the welds 429b may be omitted within the scope of the present invention. Still further, expansion bolts (not shown) may be used in place of the threaded rods 461. The expansion bolts would not extend across the column 419, but instead would expand to bear against an inner face of the wall of the column through which the expansion bolt is passed. Thus, different bolts would be used on all four faces 420 of the column 415.

Referring to FIGS. 35-40, a bi-axial beam-to-column moment-resisting joint connection structure including a column assembly 513 of a sixth embodiment is generally indicated at 511. The joint connection structure may be used in the construction of a building framework. In the illustrated embodiment, the joint connection joins column assembly 513 including a column 515 to three full-length beam assemblies 517 including full-length beams 519. The column assembly 513 is similar to the column assembly 313 of the fourth embodiment but includes a modification to the gusset plate assembly 521 to configure the column assembly for attaching three beam assemblies 517.

The gusset plate assembly 521 comprises a plurality of gusset plates 523 connected to the column 515 and extending laterally outward from the column. The gusset plates 523 extend within planes generally parallel to a longitudinal axis of the column 515. A first pair of spaced apart parallel, vertically and horizontally extending gusset plates 523a sandwich the column 515 and co-axially extending beams 519. The first pair of gusset plates 523a extends laterally outward from the column 515 in opposite directions along a first axis and defines spaces on opposite sides of the column for receiving end portions of beams 519 for mounting respective beam assemblies 517 to the column assembly 513 via the gusset plate assembly 521. A second pair of spaced apart parallel, vertically and horizontally extending gusset plates 523b sandwich the column 515 and a beam 519 extending orthogonally to the co-axially extending beams. The second pair of gusset plates 523b extends laterally outward from the column 515 in opposite directions along a second axis extending orthogonally to the first axis. The second pair of gusset plates 23b defines a space for receiving an end portion of beam 519 for mounting a beam assembly 517 to the column assembly 513 via the gusset plate assembly 521.

Figure 37:
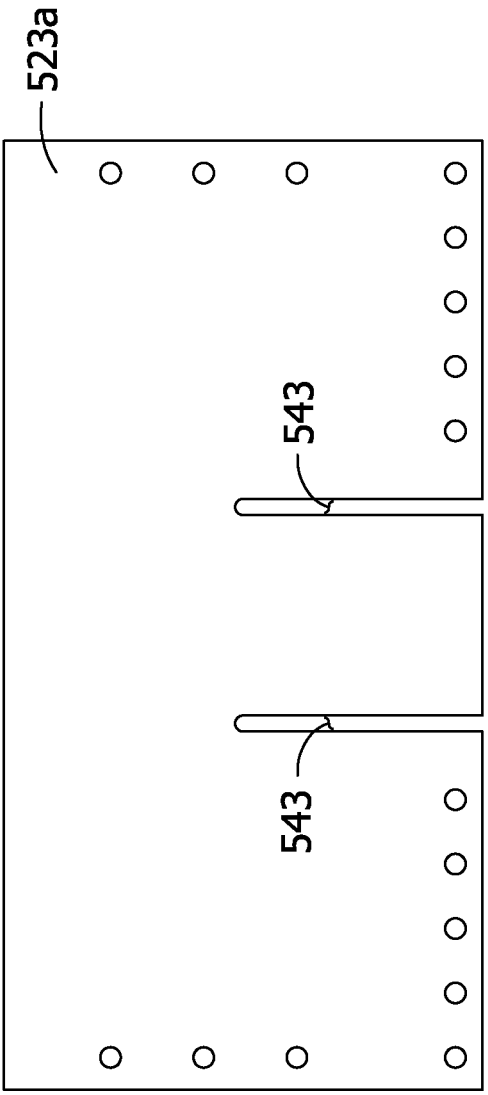
FIG. 37 is a front view of a first gusset plate of the gusset plate assembly of FIG. 36.
Figure 38:
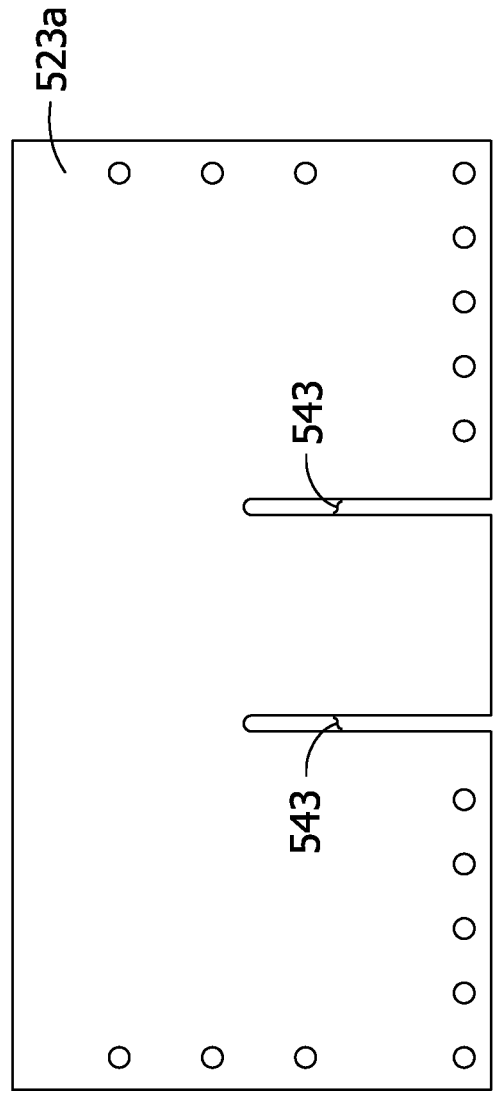
FIG. 38 is a front view of a second gusset plate of the gusset plate assembly of FIG. 36.
Figure 39:
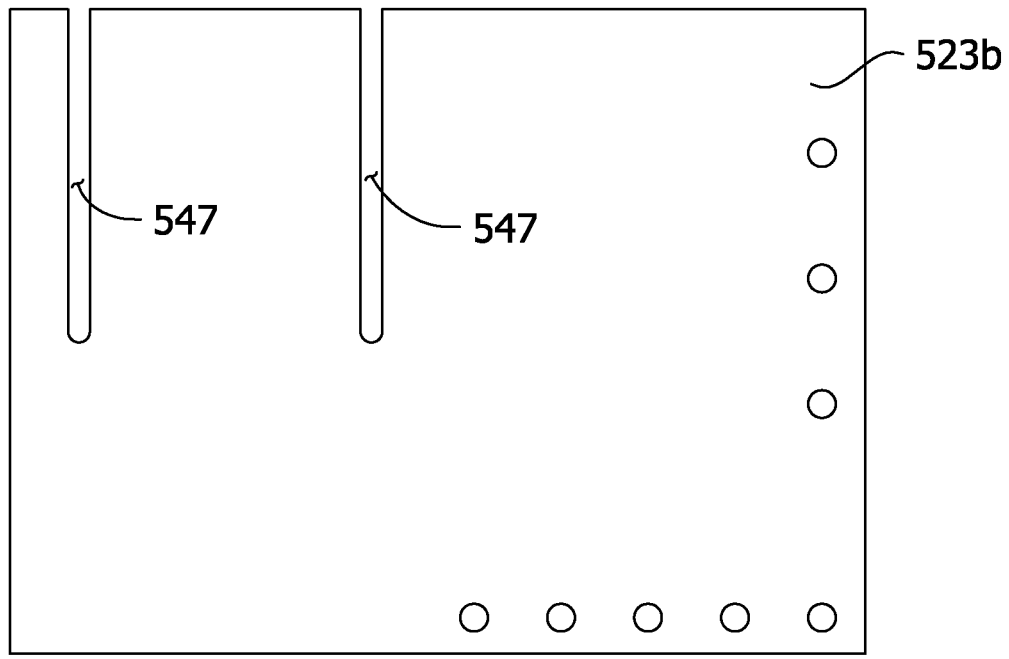
FIG. 39 is a front view of a third gusset plate of the gusset plate assembly of FIG. 36.
Figure 40:
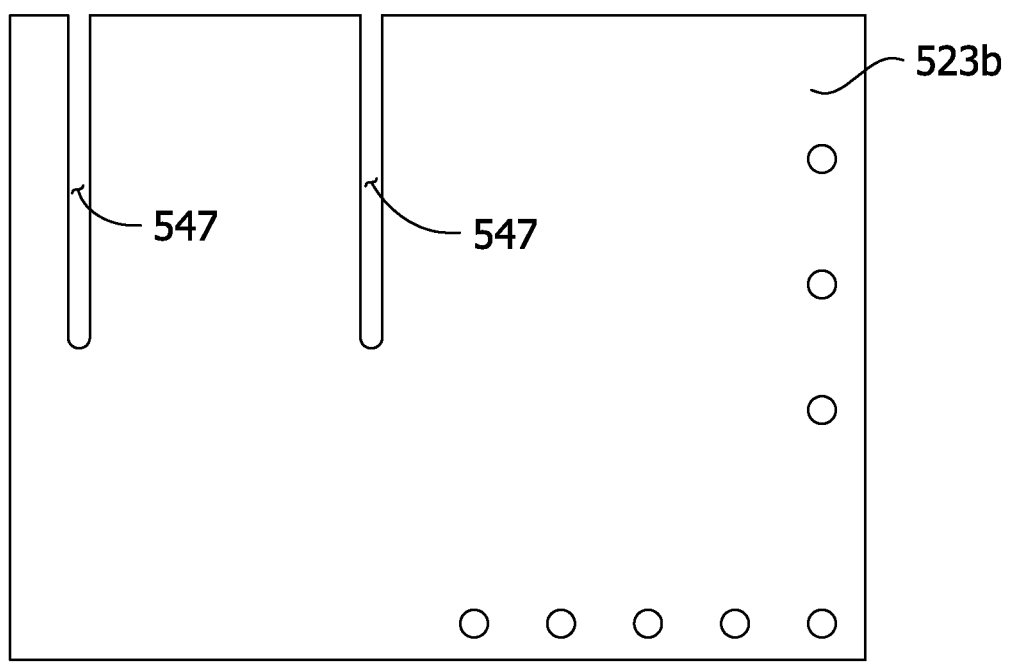
FIG. 40 is a front view of a fourth gusset plate of the gusset plate assembly of FIG. 36.
Figure 41:
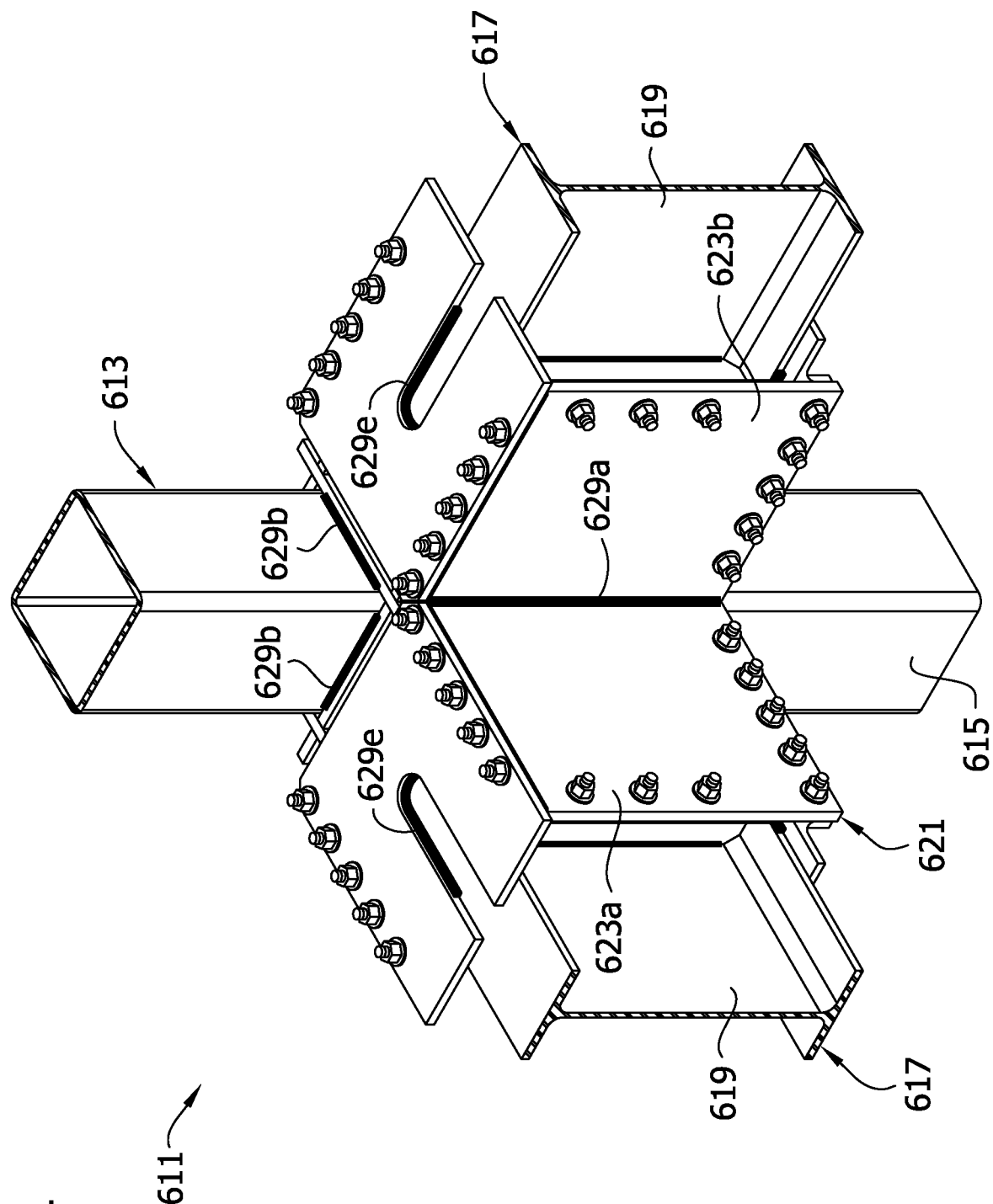
FIG. 41 is a fragmentary perspective of a bi-axial beam-to-column joint connection structure including a column assembly of a seventh embodiment.
Figure 42:
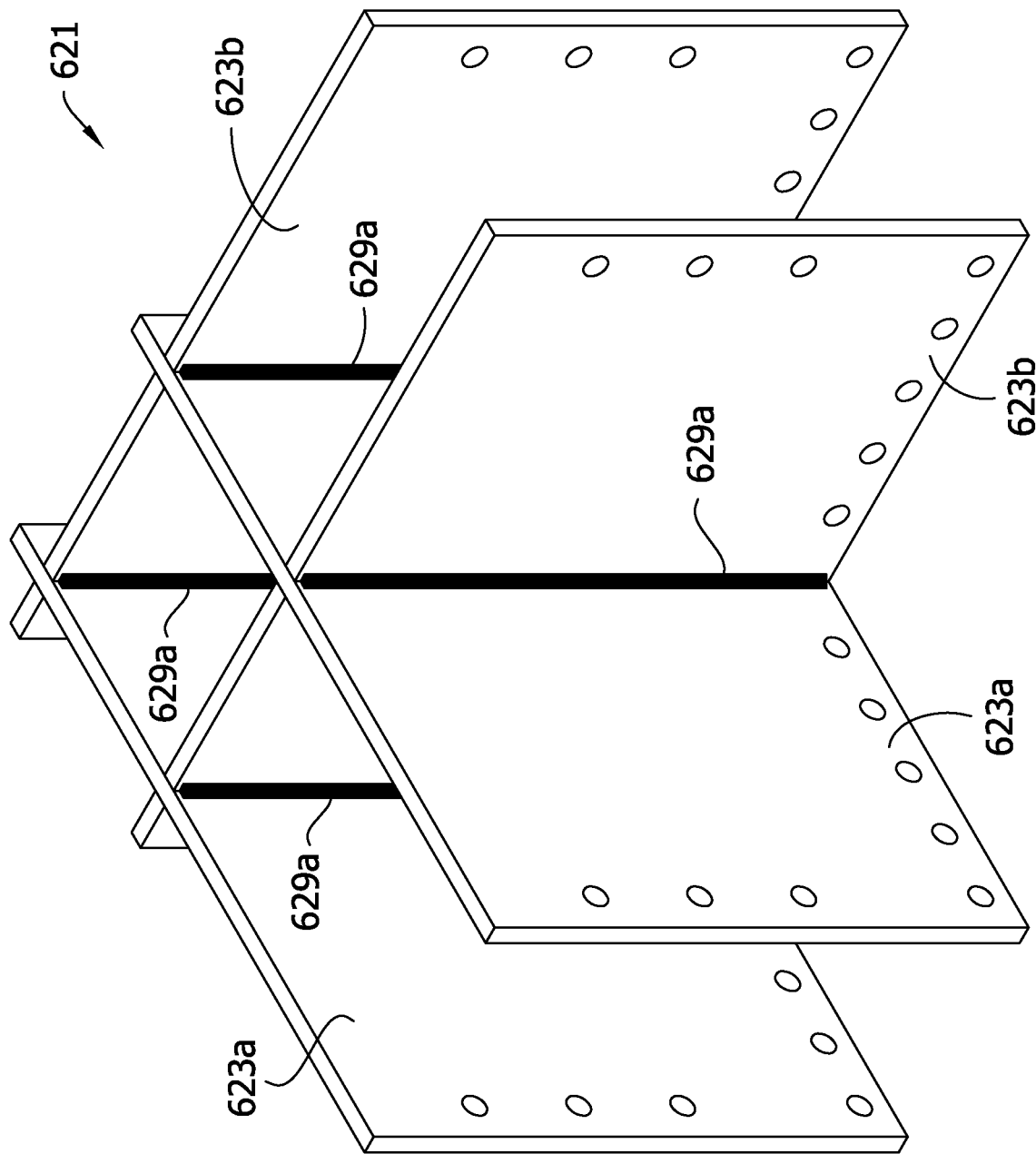
FIG. 42 is a gusset plate assembly of the structure of FIG. 41.

The first pair of gusset plates 523a each includes a pair of open slots 543 extending from an edge of the gusset plates 523a to an interior of the gusset plates (FIGS. 37 and 38). The slots 543 are symmetrically spaced about a vertically extending centerline of the gusset plates 523a. The second pair of gusset plates 523b each includes a pair of open slots 547 extending from an edge of the gusset plates 523b to an interior of the gusset plates (FIGS. 39 and 40). The slots 547 are asymmetrically spaced about a vertically extending centerline of the gusset plates 523b. In particular, for each gusset plate 523b, slots 547 are laterally spaced from a vertically extending centerline of the gusset plate 523b toward one side of the gusset plate. Therefore the gusset plate 523b extends a greater distance from one of the slots 547, away from the other slot, than it extends from the other slot in an opposite direction.

Figure 11:
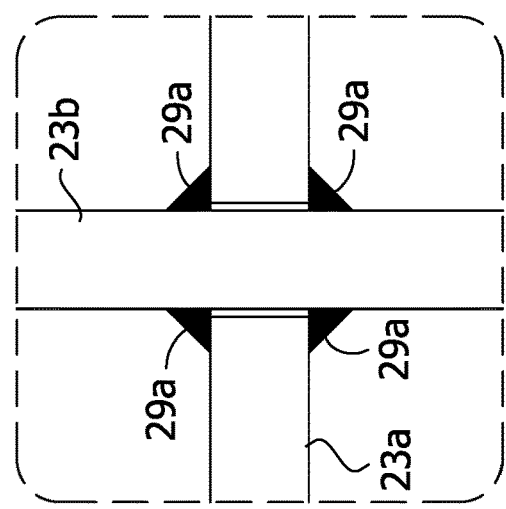
FIG. 11 is an enlarged fragmentary top view of a portion of FIG. 10.
Figure 10:
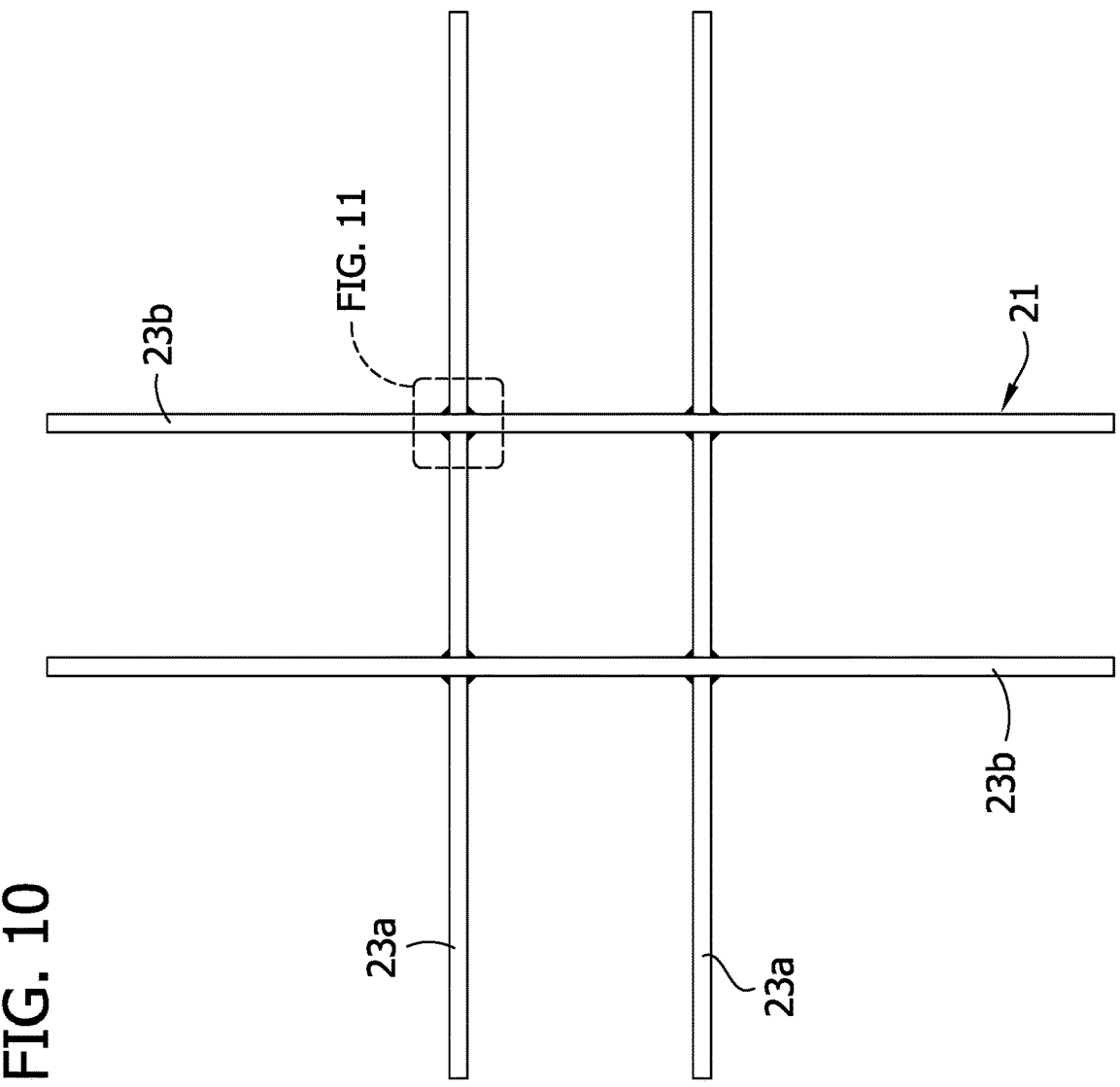
FIG. 10 is a top view of the gusset plate assembly of FIG. 9.
Figure 36:
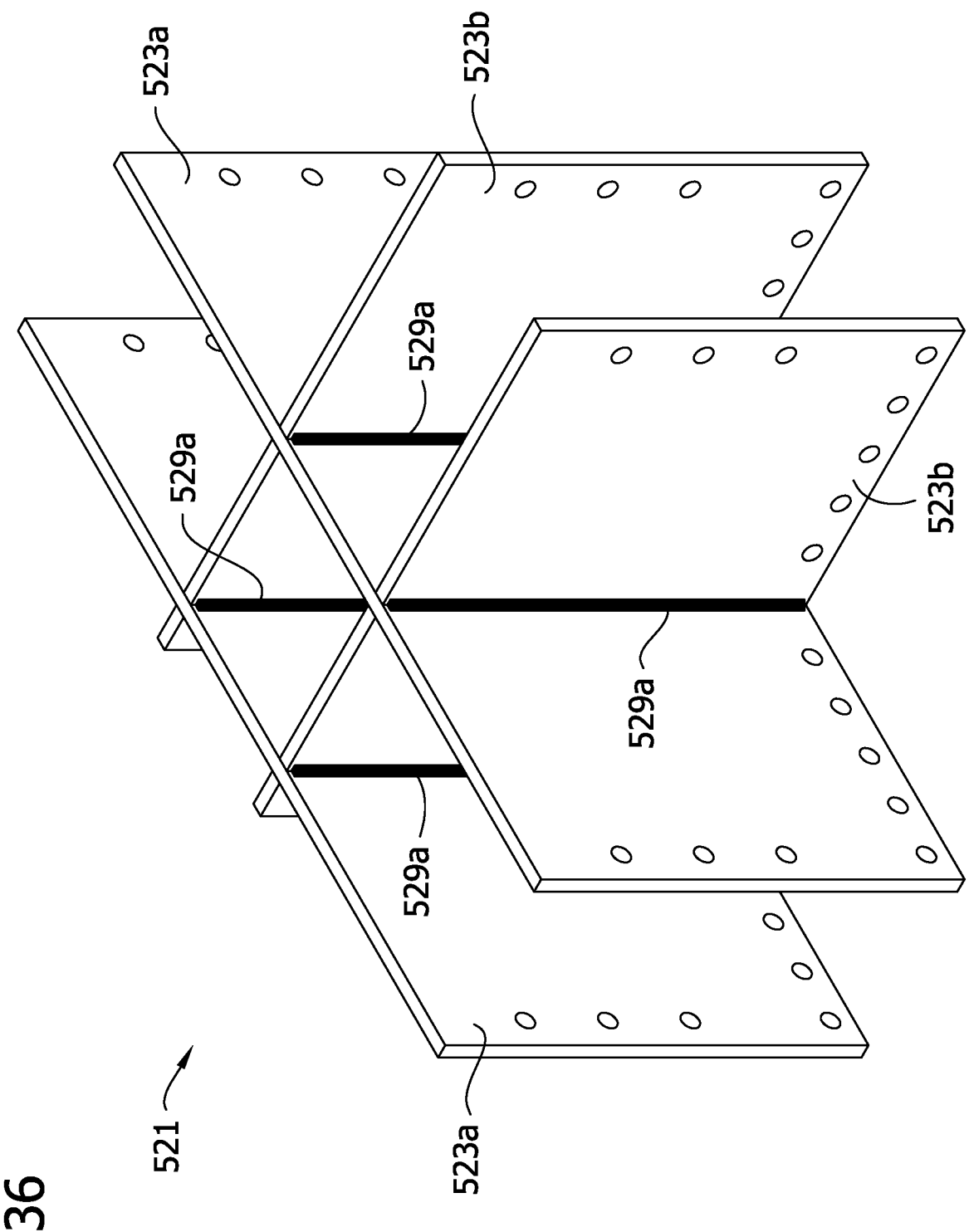
FIG. 36 is a gusset plate assembly of the structure of FIG. 35.

The open slots 543 of the first pair of gusset plates 523a are configured to mate with the open slots 547 of the second pair of gusset plates 523b such that portions of the first pair of gusset plates 523a are received in the open slots of the second pair of gusset plates, and portions of the second pair of gusset plates are received in the open slots of the first pair of gusset plates. The connected gusset plates 523a, 523b form gusset plate assembly 521 (FIG. 36). The gusset plates 523a, 523b are welded together along vertical fillet welds 529a extending along the intersecting corners between the gusset plates, substantially as shown in FIG. 11 for the first embodiment. It is noted that the short extension of gusset plates 523b beyond the intersecting gusset plate 523a provides for slots 547 to mate with interlocking slots 543 to form a controlled rigid intersection of orthogonal gusset plates that can then be welded at four locations (such as shown in FIG. 11). It is understood, however, that a free vertical edge of gusset plate 523b can be made to flush up to the interior face of rearwardmost orthogonal gusset plate 523a of FIG. 36, and be welded to the face of the gusset plate without the need of a slotted interconnected interface. In that case, the slots 547 nearest the edge of the gusset plates 523b in FIG. 40 would be eliminated and the length of the plates would be correspondingly shorter. Horizontal fillet welds 529b at top and bottom edges of the gusset plates 523a, 523b attach the gusset plate assembly 521 to the column 515. In the illustrated embodiment, the first pair of gusset plates 523a are attached to the second pair of gusset plates 523b such that top and bottom edges of the first pair of gusset plates are generally flush with respective top and bottom edges of the second pair of gusset plates 523b. It may be seen that the gusset plate assembly 521 forms only three spaces for receiving end portions of beam assemblies.

The method of assembling the gusset plate assembly 521 is identical to the method of assembling the gusset plate assembly 321 of the fourth embodiment, and the method of constructing the column assembly 513 is otherwise identical to the method of constructing the column assembly 313 of the fourth embodiment. Further the column assembly 513 can be attached to full-length beam assemblies in the same fashion as column assembly 313 of the fourth embodiment.

Referring to FIGS. 41-44, a bi-axial beam-to-column moment-resisting joint connection structure including a column assembly 613 of a seventh embodiment is generally indicated at 611. The joint connection structure may be used in the construction of a building framework. In the illustrated embodiment, the joint connection joins column assembly 613 including a column 615 to two full-length beam assemblies 617 including full-length beams 619. The column assembly 613 is similar to the column assembly 313 of the fourth embodiment but includes a modification to the gusset plate assembly 621 to configure the column assembly for attaching two orthogonal beam assemblies 617.

Figure 43:
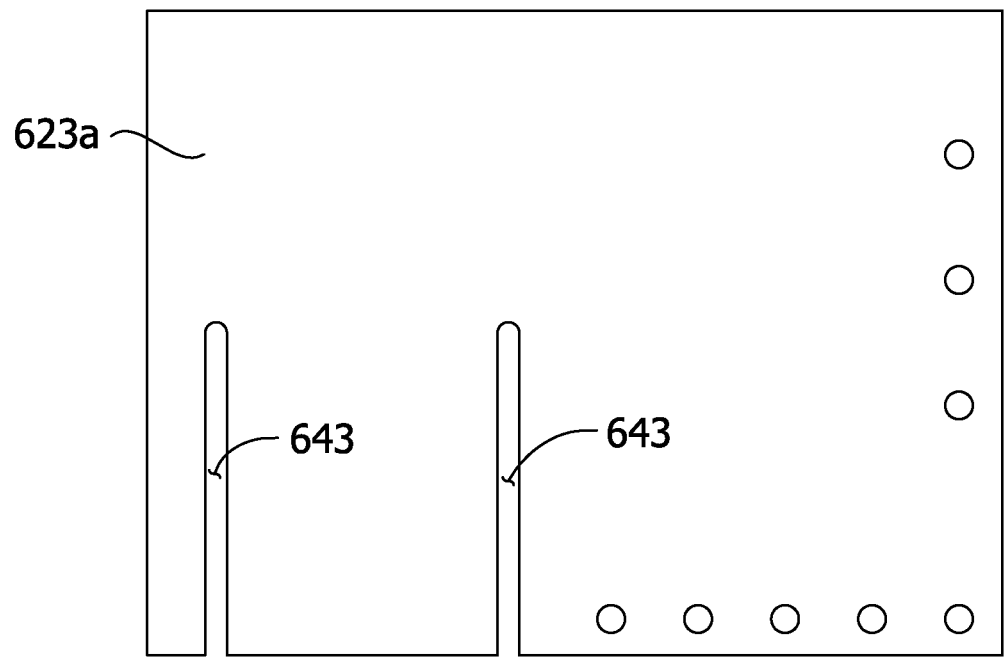
FIG. 43 is a front view of a first gusset plate of the gusset plate assembly of FIG. 42.
Figure 44:
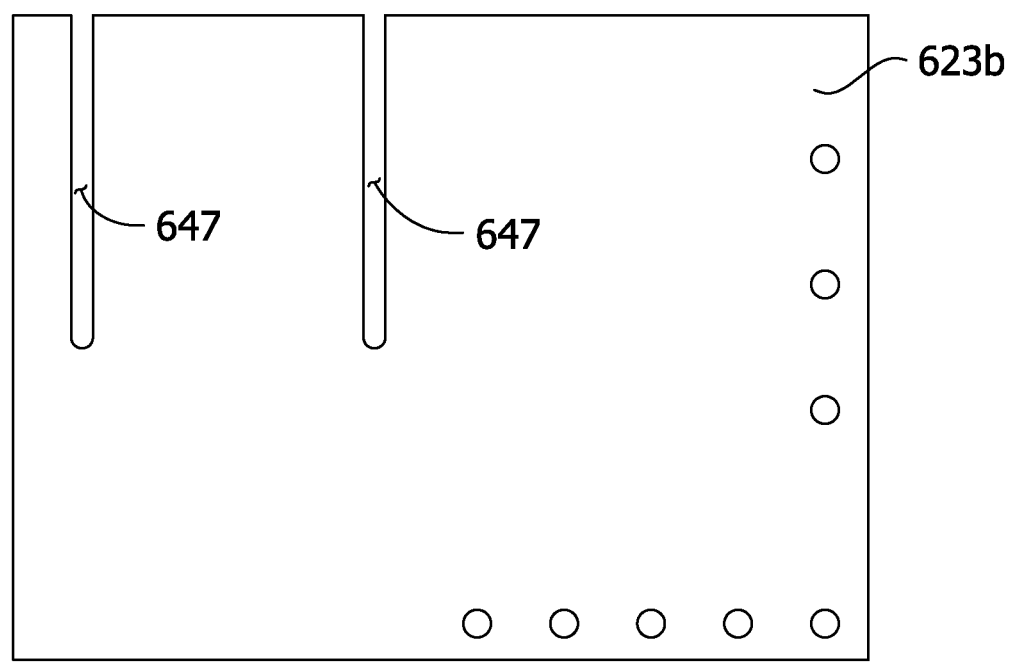
FIG. 44 is a front view of a second gusset plate of the gusset plate assembly of FIG. 42.
Figure 45:
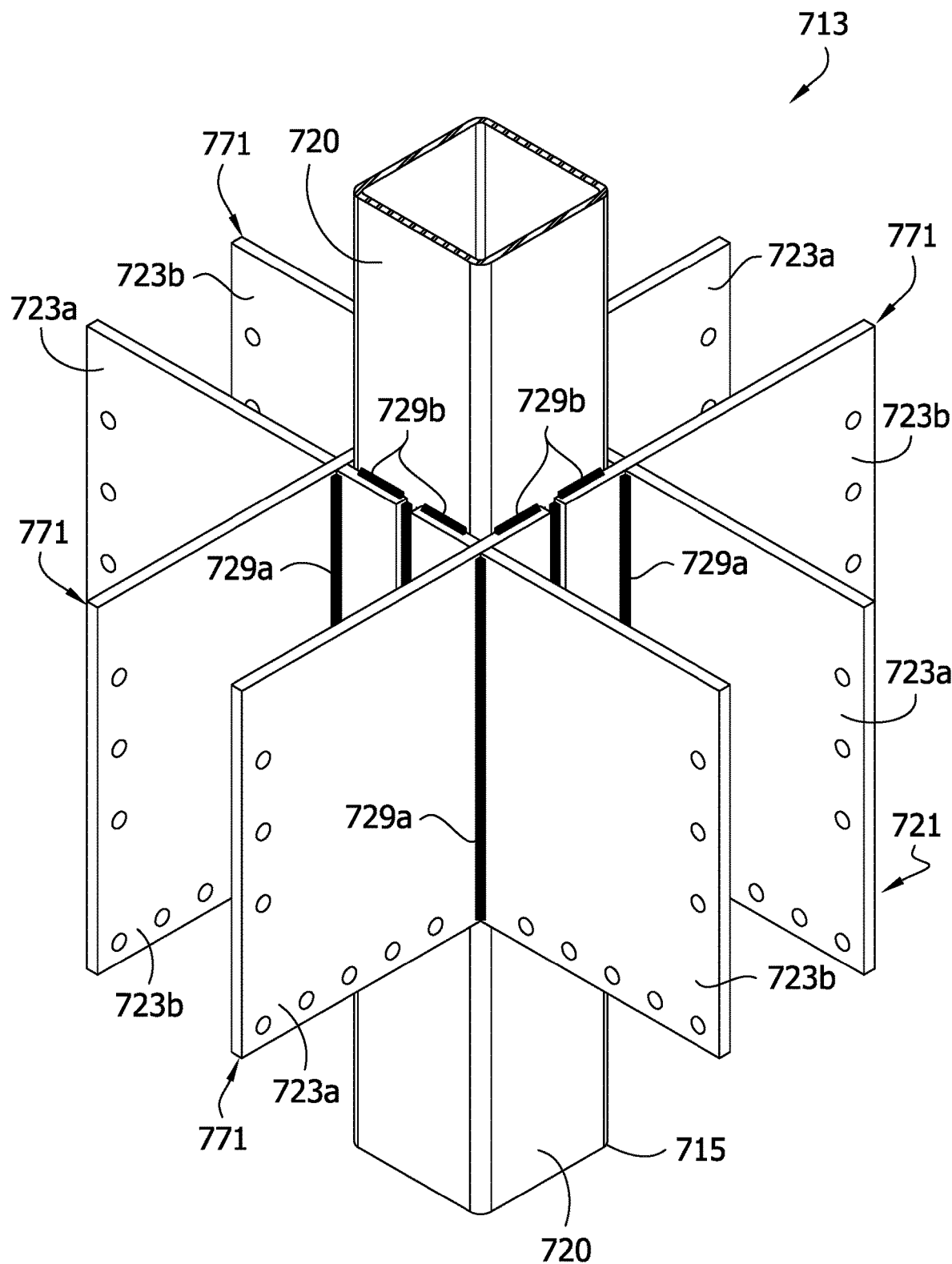
FIG. 45 is a fragmentary perspective of a column assembly of an eighth embodiment for use in a bi-axial beam-to-column joint connection structure.
Figure 46:
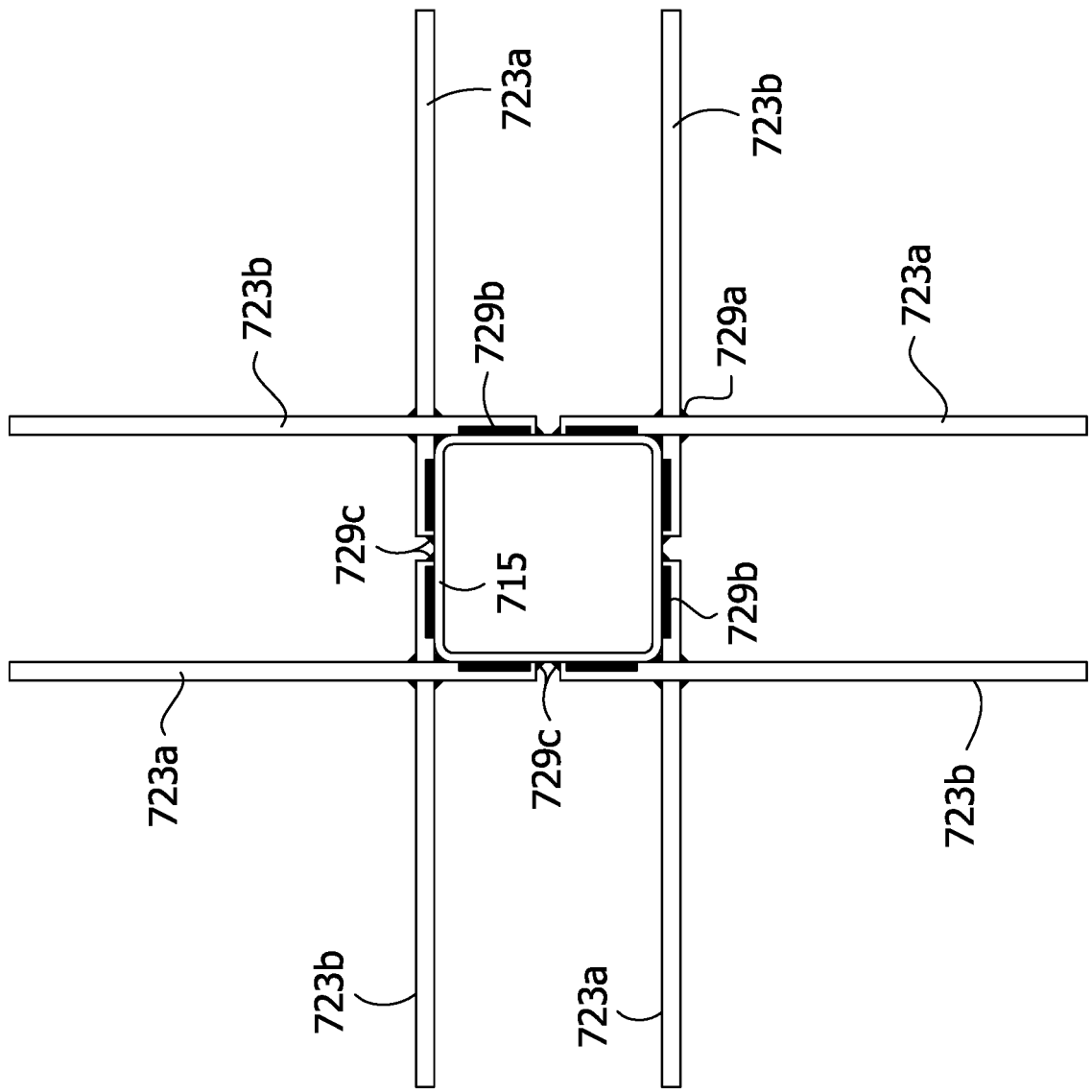
FIG. 46 is a top view of the column assembly of FIG. 45.
Figure 47:
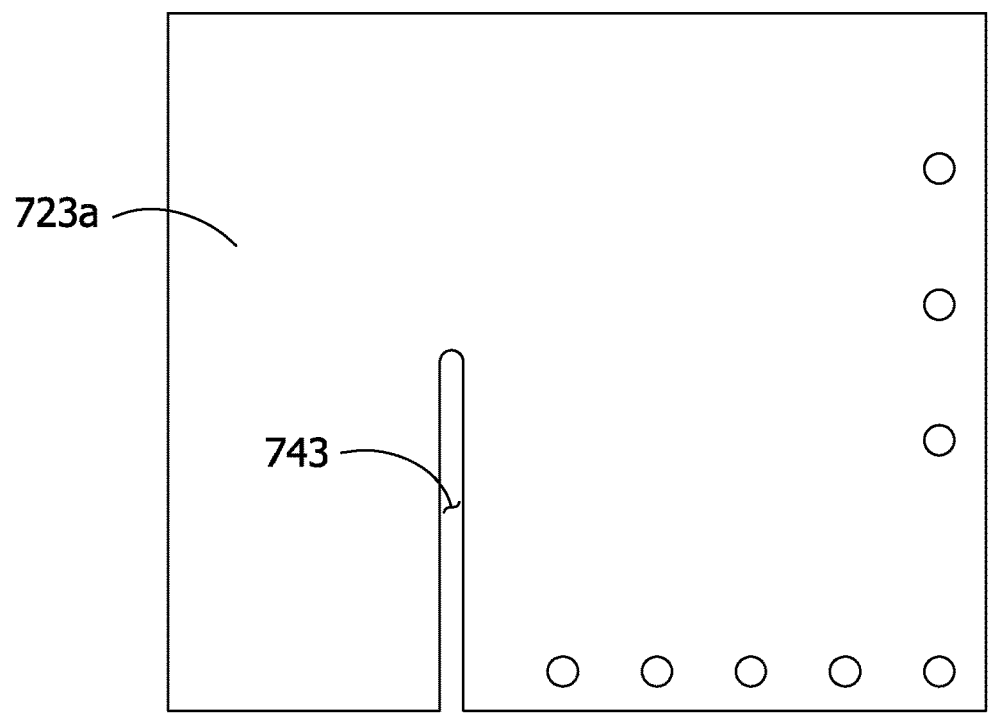
FIG. 47 is a front view of a first gusset plate of the column assembly of FIG. 45.

Each of a first pair of gusset plates 623a includes two open slots 643 extending from an edge of the gusset plates 623a to an interior of the gusset plates (FIG. 43). The slots 643 are asymmetrically spaced about a vertically extending centerline of the gusset plates 623a. In particular, for each gusset plate 623a, slots 643 are laterally spaced from a vertically extending centerline of the gusset plate 623a toward one side of the gusset plate. Each of the second pair of gusset plates 623b includes two open slots 647 extending from an edge of the gusset plates 623b to an interior of the gusset plates (FIG. 44). The slots 647 are also asymmetrically spaced about a vertically extending centerline of the gusset plates 623b in a similar fashion to the slots 643 in the first pair of gusset plates 623a.

The open slots 643 of the first pair of gusset plates 623a are configured to mate with the open slots 647 of the second pair of gusset plates 623b such that portions of the first pair of gusset plates 623a are received in the open slots of the second pair of gusset plates, and portions of the second pair of gusset plates are received in the open slots of the first pair of gusset plates. The connected gusset plates 623a, 623b form gusset plate assembly 621. The gusset plate assembly provides only two spaces for receiving ends of the beam assemblies 617. The gusset plates 623a, 623b are welded together along vertical fillet welds 629a extending along the intersection corners between the gusset plates. It is noted that the short extension of gusset plates 623b beyond the intersecting gusset plate 623a provides for slots 647 to mate with interlocking slots 643 to form a controlled rigid intersection of orthogonal gusset plates that can then be welded at four locations (such as shown in FIG. 11). It is understood, however, that a free vertical edge of gusset plate 623b can be made to flush up to the interior face of rearwardmost orthogonal gusset plate 623a of FIG. 42, and be welded to the face of the gusset plate without the need of a slotted interconnected interface. In that case, the slots 647 nearest the edge of the gusset plates 623b in FIG. 44 would be eliminated and the length of the plates would be correspondingly shorter. Horizontal fillet welds 629b at top and bottom edges of the gusset plates 623a, 623b attach the gusset plate assembly 621 to the column 615. In the illustrated embodiment, the first pair of gusset plates 623a are attached to the second pair of gusset plates 623b such that top and bottom edges of the first pair of gusset plates are generally flush with respective top and bottom edges of the second pair of gusset plates 623b.

The method of assembling the gusset plate assembly 621 is identical to the method of assembling the gusset plate assembly 321 of the fourth embodiment, and the method of constructing the column assembly 613 is otherwise identical to the method of constructing the column assembly 313 of the fourth embodiment. Further the column assembly 613 can be attached to full-length beam assemblies in the same fashion as column assembly 313 of the fourth embodiment.

Referring to FIGS. 45-51, a column assembly of an eighth embodiment is generally indicated at 713. The gusset plate assembly 721 of the eighth embodiment comprises a plurality (four) of gusset plate subassemblies 771 separately welded to column 715. Each subassembly 771 hugs its two adjacent orthogonal faces 720 of the column 715, thereby enclosing the corner of the column, and is welded to the column. The gusset plate subassemblies each include a first gusset plate 723a and a second gusset plate 723b. Facing surfaces of adjacent gusset plates 723a, 723b define the spaces for receiving end portions of a beam for mounting a beam assembly to the column assembly 713 via the gusset plate assembly 721. The column assembly 713 can be attached to full-length beam assemblies in the same fashion as column assembly 13 of the first embodiment.

Figure 48:
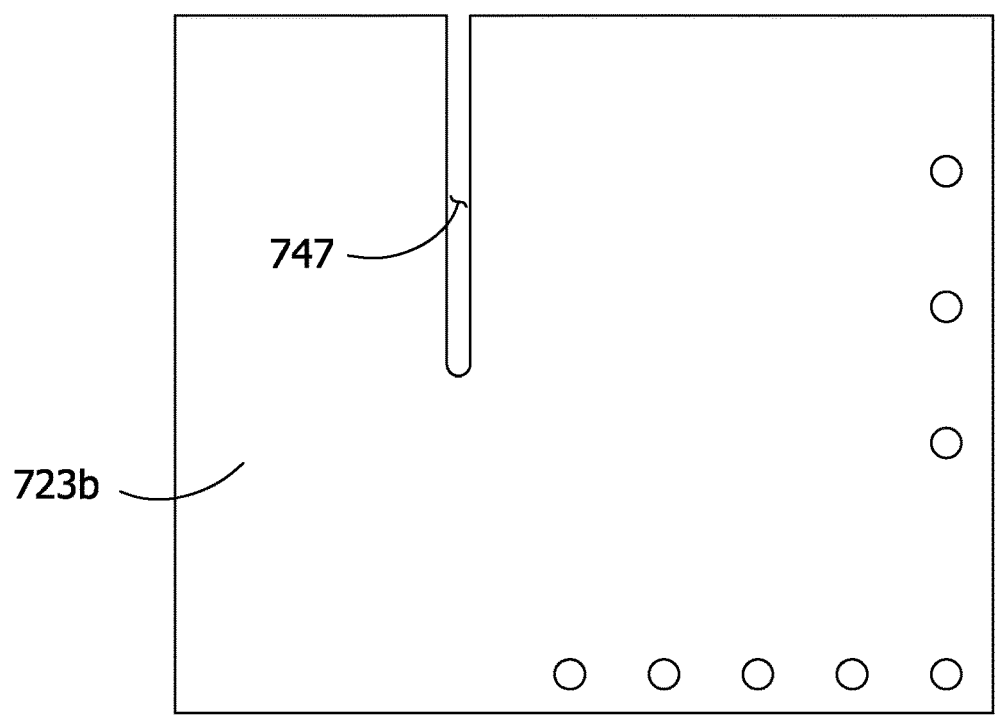
FIG. 48 is a front view of a second gusset plate of the column assembly of FIG. 45.
Figure 51:
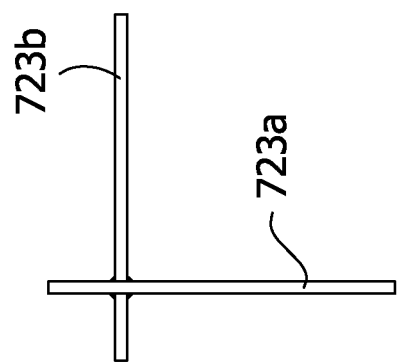
FIG. 51 is a top view of the gusset plate subassembly of FIG. 49.
Figure 50:
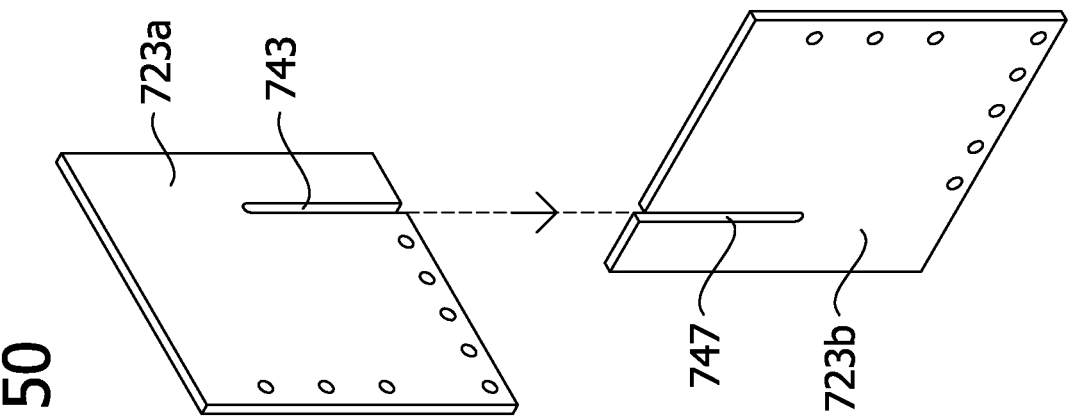
FIG. 50 is an illustration showing how to attach the first gusset plate to the second gusset plate to construct the gusset plate subassembly of FIG. 49.
Figure 49:
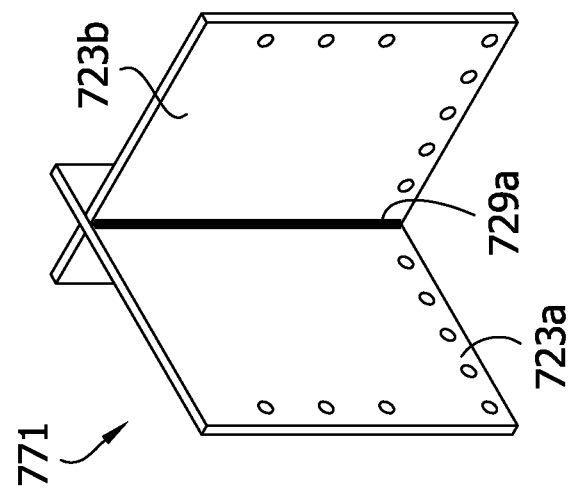
FIG. 49 is a perspective of a gusset plate subassembly of the column assembly of FIG. 45
Figure 52:
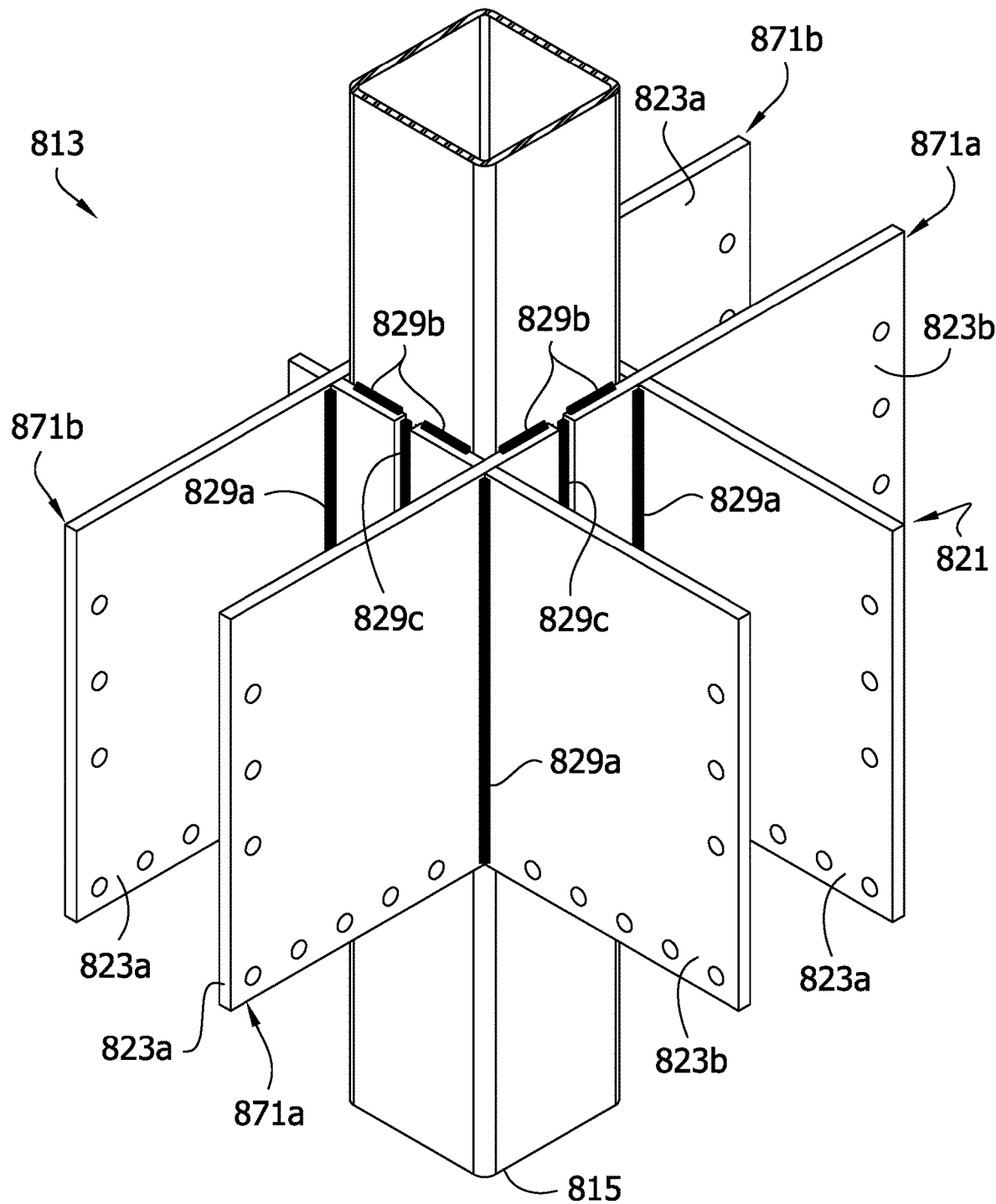
FIG. 52 is a fragmentary front perspective of a column assembly of a ninth embodiment for use in a bi-axial beam-to-column joint connection structure.
Figure 53:
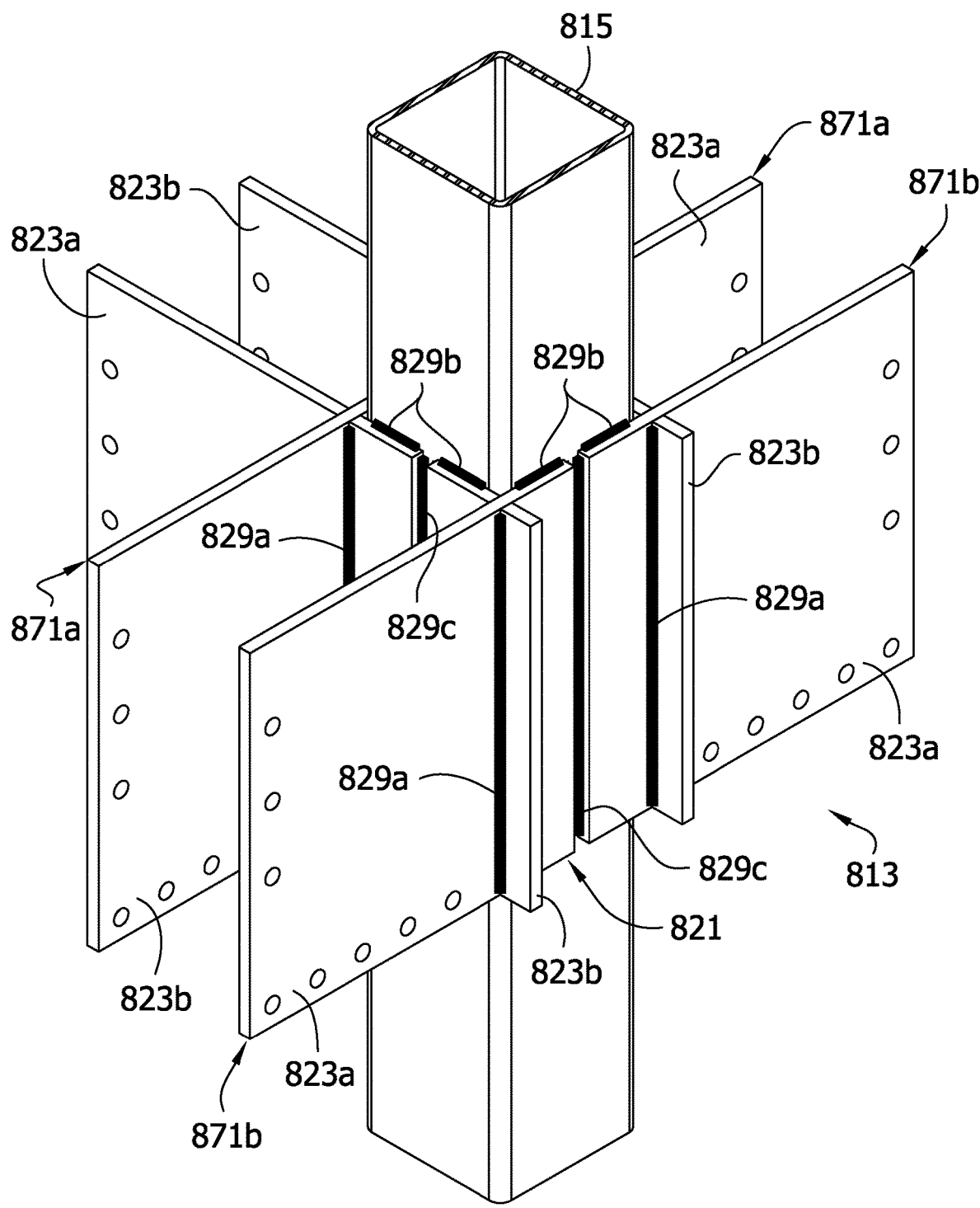
FIG. 53 is a rear perspective of the column assembly of FIG. 52.
Figure 54:
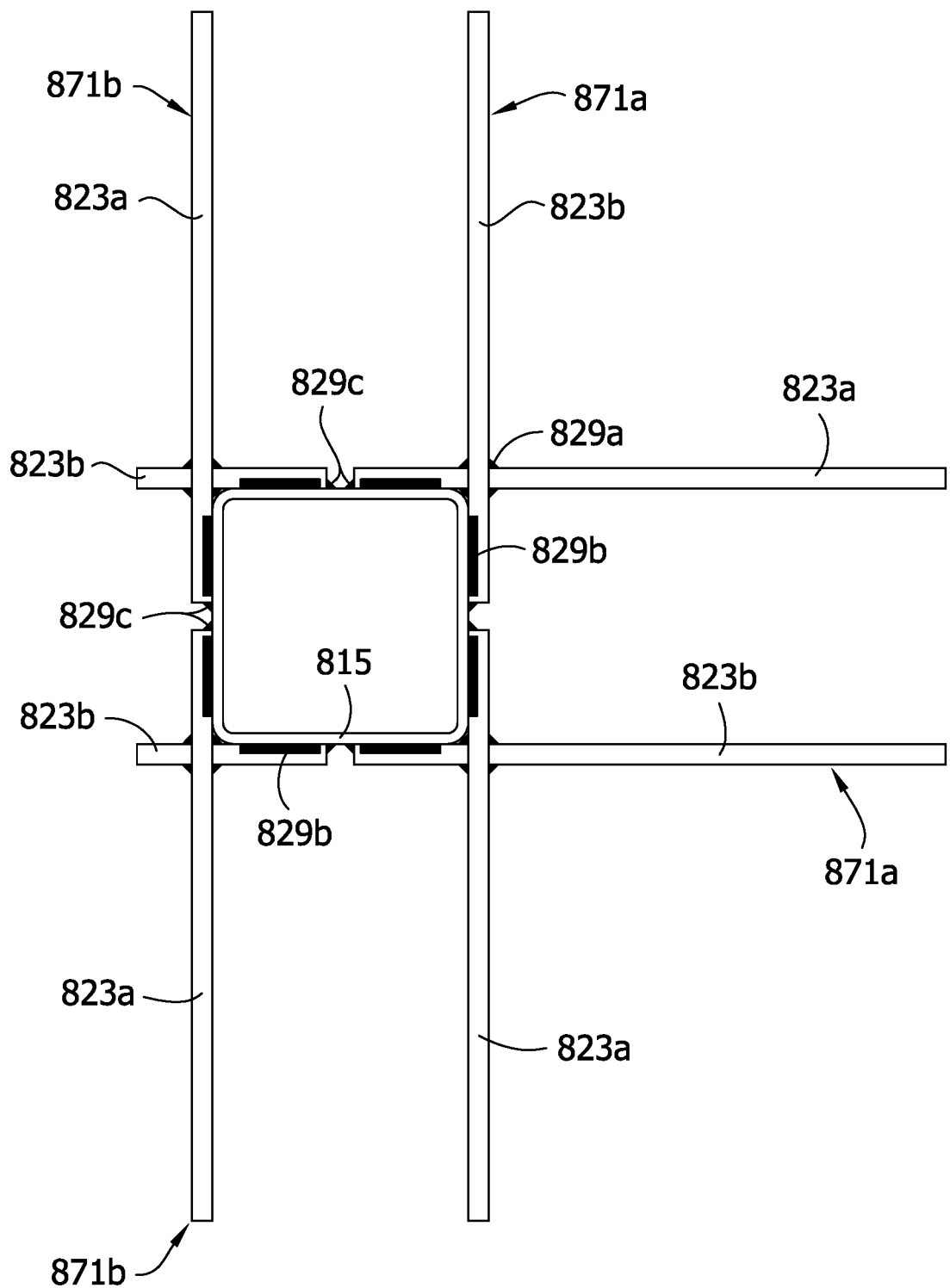
FIG. 54 is a top view of the column assembly of FIG. 52.
Figure 57:
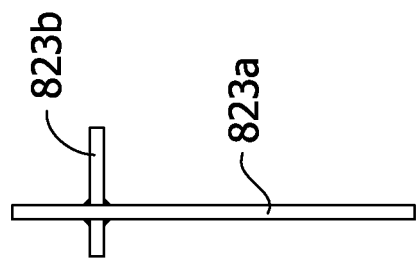
FIG. 57 is a top view of the gusset plate subassembly of FIG. 55.
Figure 56:
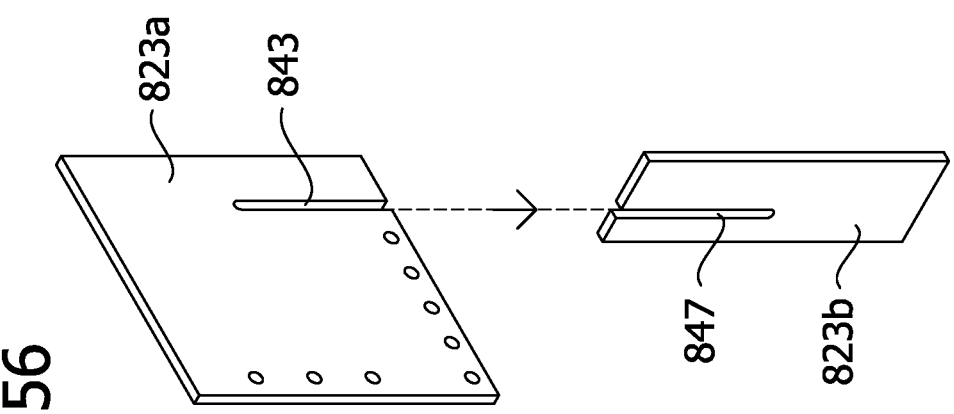
FIG. 56 is an illustration showing how to attach a first gusset plate to a second gusset plate to construct the gusset plate subassembly of FIG. 55.
Figure 55:
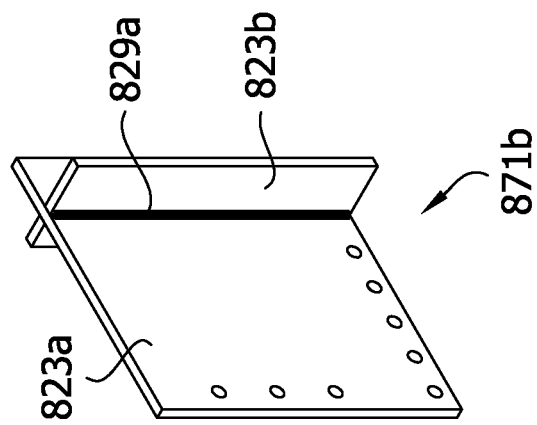
FIG. 55 is a perspective of a gusset plate subassembly.
Figure 58:
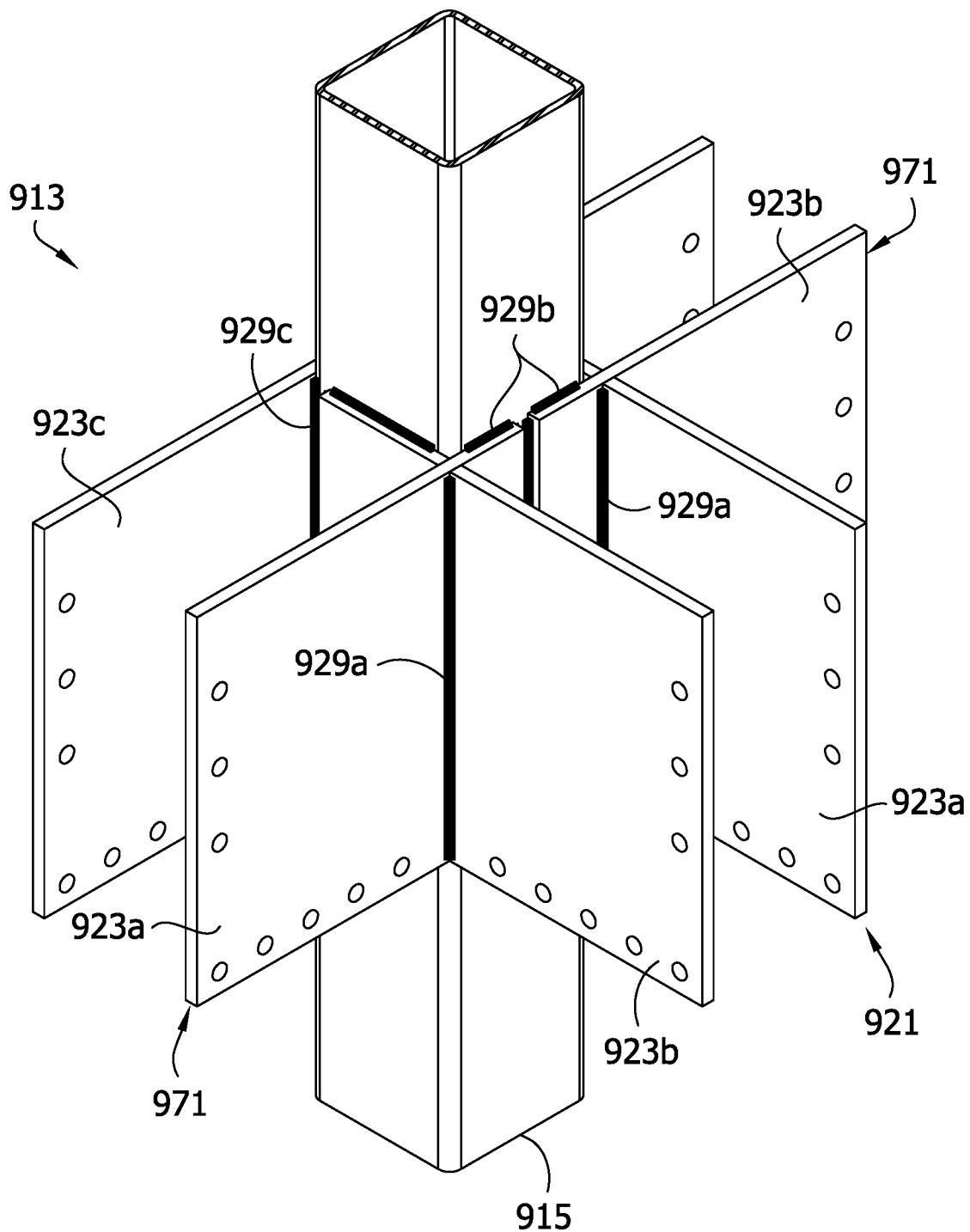
FIG. 58 is a fragmentary front perspective of a column assembly of a tenth embodiment for use in a bi-axial beam-to-column joint connection structure.
Figure 59:
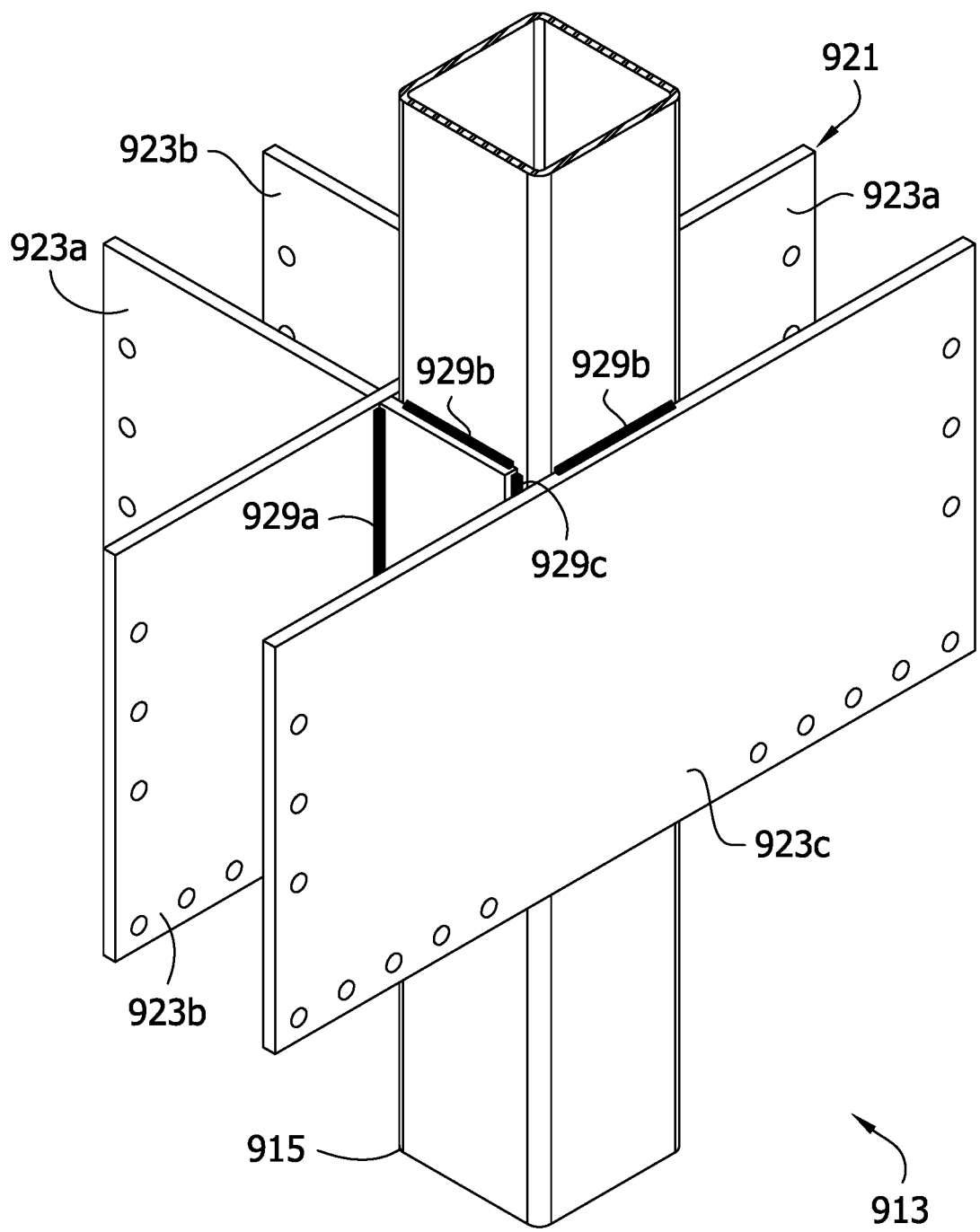
FIG. 59 is a rear perspective of the column assembly of FIG. 58.
Figure 60:
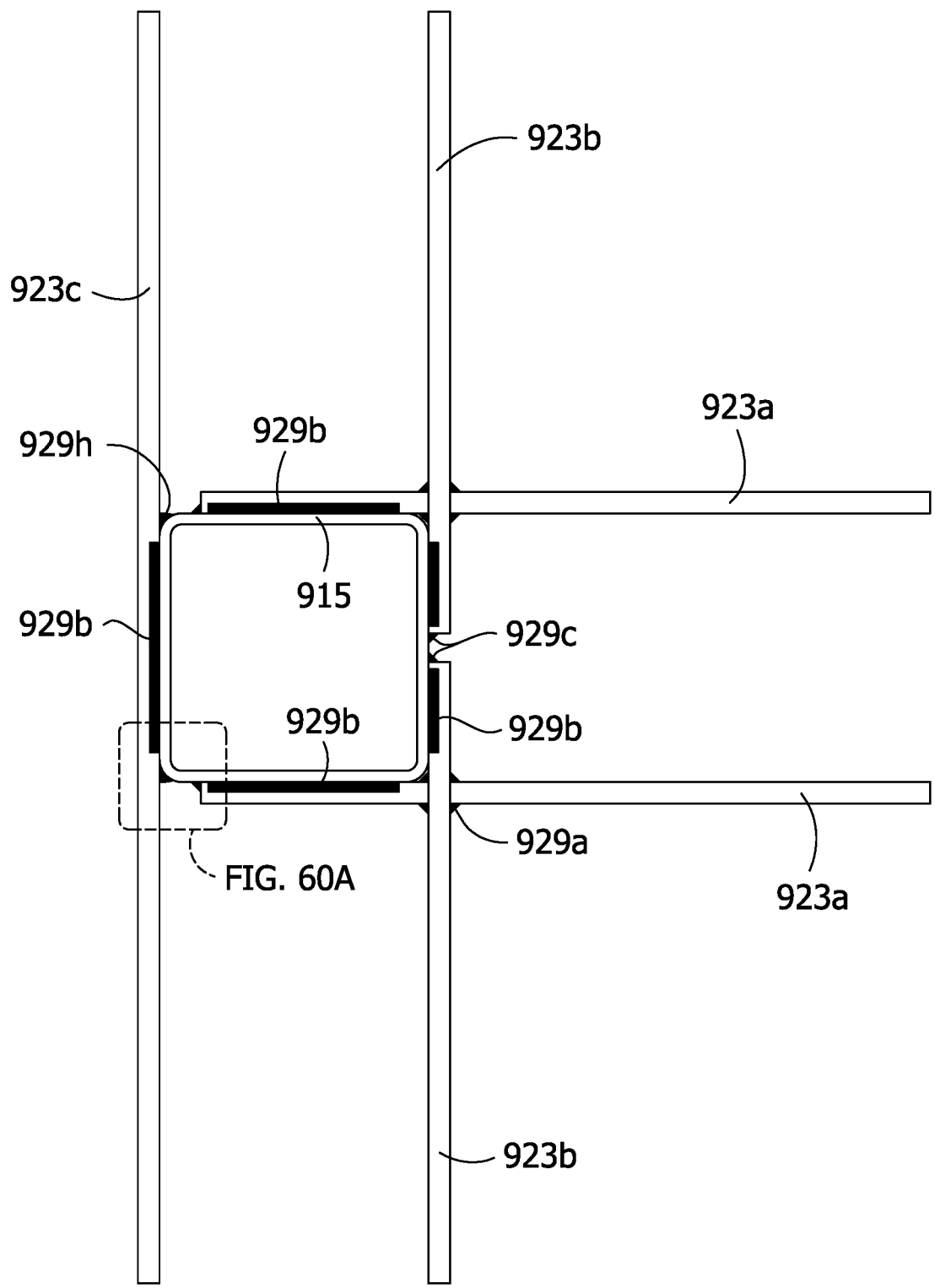
FIG. 60 is a top view of the column assembly of FIG. 58.
Figure 60A:
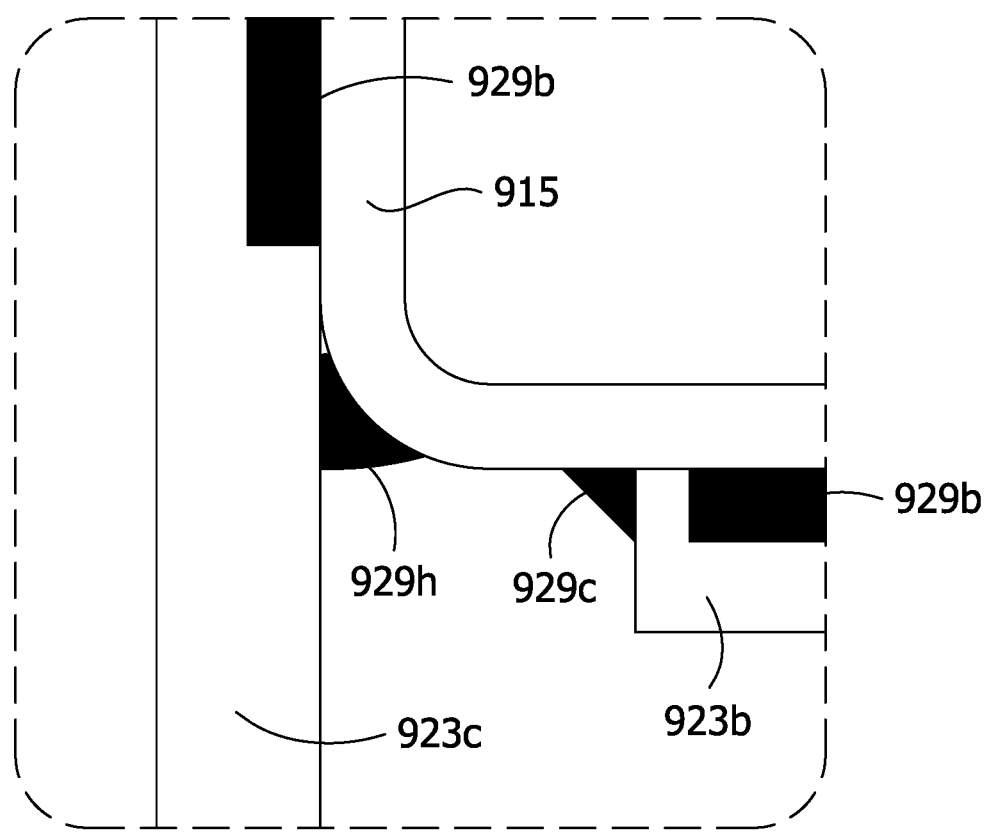
FIG. 60A is an enlarged fragmentary top view of a portion of FIG. 60.

Each subassembly 771 comprises the first gusset plate 723a having an open slot 743 located closer to one side of the first gusset plate (FIG. 47), and the second gusset plate 723b having an open slot 747 located closer to one side of the second gusset plate (FIG. 48). As explained previously herein, the gusset plates 723a, 723b are attached by mating the slots 743, 747 with each other and welding the gusset plates 723a, 723b together at vertical welds 729a extending along the intersection corners between the gusset plates. The assembled gusset plate subassemblies 771 have an unsymmetrical, crossed configuration (see, FIGS. 49 and 51). The portions of the gusset plates 723a, 723b that define a smaller section are welded to the four corners of the column 715, and the portions of the gusset plates that define a larger section extend laterally outward from the column.

The subassemblies 771 are welded to each face 720 of the column 715 along top and bottom horizontal welds 729b and vertical welds 729c. It will be understood that other forms of connection of the subassemblies 771 to the column 715 may be employed. In one example, the gusset plates 723a, 723b and column 715 may have bolt holes and receive suitable fasteners such as expansion bolts to mount the subassemblies on the column.

The gusset plate assembly 721 beneficially distributes the resistance to moments applied by the beams (not shown) to the column 715 to all four faces 720 of the column, making it also well-suited to resist bi-axial loads applied by the beams to the column. This is made possible by the use of welded interlocked orthogonal gusset plates 723a, 723b forming the rigid gusset plate subassemblies 771 that hug the sidewalls and can be configured to enclose all four corners of the column 715 to resist bi-axial applied moment. It will be understood that a moment applied by any one or any combination of the four beams will be transmitted by pairs of gusset plate subassemblies 771 to locations all around the column 715. The subassemblies 771 are welded to the faces 720 of the column 715 along top and bottom horizontal welds 729b and vertical welds 729c.

The subassemblies 771 cooperate to distribute load to the faces 720 of the column 715. For example when a moment is applied to one of the subassemblies 771 (FIG. 49), by a beam (not shown) connected to gusset plates 723b, it is resisted by top and bottom horizontal welds 729b and vertical weld 729c which comprise a channel-shaped weld group configuration capable of transferring in-plane moment to an adjacent face 720 of column 715 parallel to the axis of the beam. This in-plane moment transfer to the face 720 of the column 715 is similar to the in-plane moment transfer described in U.S. Pat. Nos. 6,138,427, 7,178,296, 8,146,322 and 9,091,065. The difference is that the weld group in the patents is rectangular (top and bottom horizontal welds and left and right vertical welds) rather than channel-shaped. In addition, top and bottom welds 729b and vertical welds 729c of the subassembly 771 having a gusset plate 723a extending transverse to the longitudinal axis of the beam and connected to the near face 720 also resist the moment, forming a tension/compression force couple to transfer moment out-of-plane to the face of the column. These welds 729b and 729c (comprising a channel-shaped weld group configuration) connect the gusset plate 723a to the near face 720 of column 715 and are capable of resisting applied out-of-plane moment via tension/compression force couple acting perpendicular to the near face of the column. In the case of a bi-axially applied moment, where the resolved moment vector would lie between two orthogonal beams and tend to tilt the gusset plate subassembly 771 on the column 715 along a diagonal between the longitudinal axes of the beams, additional moment resisting capacity is provided. The vertical welds 729c connecting the vertical edges of the gusset plates 723b, 723a to adjacent orthogonal faces 720 of the column 715 act together orthogonally as a vertical weld group to provide a force couple to resist the applied bi-axial moment. It will be appreciated that all of the subassemblies 771 may act in this manner to resist bi-axially applied moment, enclosing as many as all four corners of column 715 to act in concert with the aforementioned moment resistance force couples to make the column assembly 713 and a joint connection structure formed using the column assembly remarkably robust.

Referring to FIGS. 52-57, a column assembly of a ninth embodiment is generally indicated at 813. The column assembly 813 of the ninth embodiment is similar to the column assembly 713 of the eighth embodiment but includes a modification to the gusset plate assembly 821 to configure the column assembly 813 for attaching three beam assemblies. As with the eighth embodiment, each subassembly 871 hugs its two adjacent orthogonal faces 820 of the column 815, thereby enclosing the corner of the column, and is welded to the column. The primary difference between the two embodiments is gusset plate assembly 821 of the ninth embodiment comprises two gusset plate subassemblies 871a and 871b of different construction. As before, all gusset plate subassemblies 871a, 871b are separately welded to column 815. First subassemblies 871a are identical to the subassemblies 771 in the eighth embodiment. Second subassembly 871b comprises a first gusset plate 823a having an open slot 843 located closer to one side of the first gusset plate, and a second gusset plate 823b having an open slot 847 located closer to one side of the second gusset plate. The second gusset plate 823b of the second subassembly 871b is smaller than the first gusset plate 823a and has no holes for bolts or threaded rods. As explained in an earlier embodiment, the gusset plates 823a, 823b are attached by mating the slots 843, 847 with each other and welding the gusset plates 823a, 823b together at vertical welds 829a extending along the intersection corners between the gusset plates. The assembled second gusset plate subassemblies 871b have an unsymmetrical cross configuration. Portions of the gusset plates 823a, 823b that define a top section of the cross are welded to two adjacent corners of the column 815, and portions of the gusset plates that define a bottom section of the cross extend laterally outward from the column. Facing surfaces of adjacent gusset plates 823a, 823b define the spaces for receiving end portions of a beam for mounting a beam assembly to the column assembly 813 via the gusset plate assembly 821. The column assembly 813 can be attached to full-length beam assemblies in the same fashion as column assembly 13 of the first embodiment.

Referring to FIGS. 58-60A, a column assembly of a tenth embodiment is generally indicated at 913. The column assembly 913 of the tenth embodiment is similar to the column assembly 713 of the eighth embodiment but includes a modification to the gusset plate assembly 921 to configure the column assembly for attaching three beam assemblies. The primary difference between the two embodiments is gusset plate assembly 921 of the tenth embodiment, in addition to the pair of gusset plate subassemblies 971, includes a separate gusset plate 923c (also forming part of the gusset plate assembly 921) that is not mated with another gusset plate. Subassemblies 971 are similar to the subassemblies 771 in the eighth embodiment. As with the eighth embodiment, each subassembly 971 hugs its two adjacent orthogonal faces 920 of the column 915, thereby enclosing the corner of the column, and is welded to the column. However, in each subassembly 971 the portion of the gusset plate 923a overlying the face 920 of the column 915 is longer than the portions of the gusset plates 923b (see, FIG. 60). The subassemblies 971 are welded to adjacent corners of the column 915. The separate gusset plate 923c is welded to an opposite face of the column 915 by top and bottom horizontal welds 929b, vertical welds 929c, as well as by an internal, vertical corner flare bevel weld 929h (see, FIG. 60A). Facing surfaces of adjacent gusset plates 923a, 923a of the subassemblies 971 define a space for receiving an end portion of a beam for mounting a beam assembly to the column assembly 913 via the gusset plate assembly 921. Further, facing surfaces of gusset plates 923b and 923c define spaces for receiving end portions of beams for mounting beam assemblies to the column assembly 913. The column assembly 913 can be attached to full-length beam assemblies in the same fashion as column assembly 13 of the first embodiment.

Figure 61:
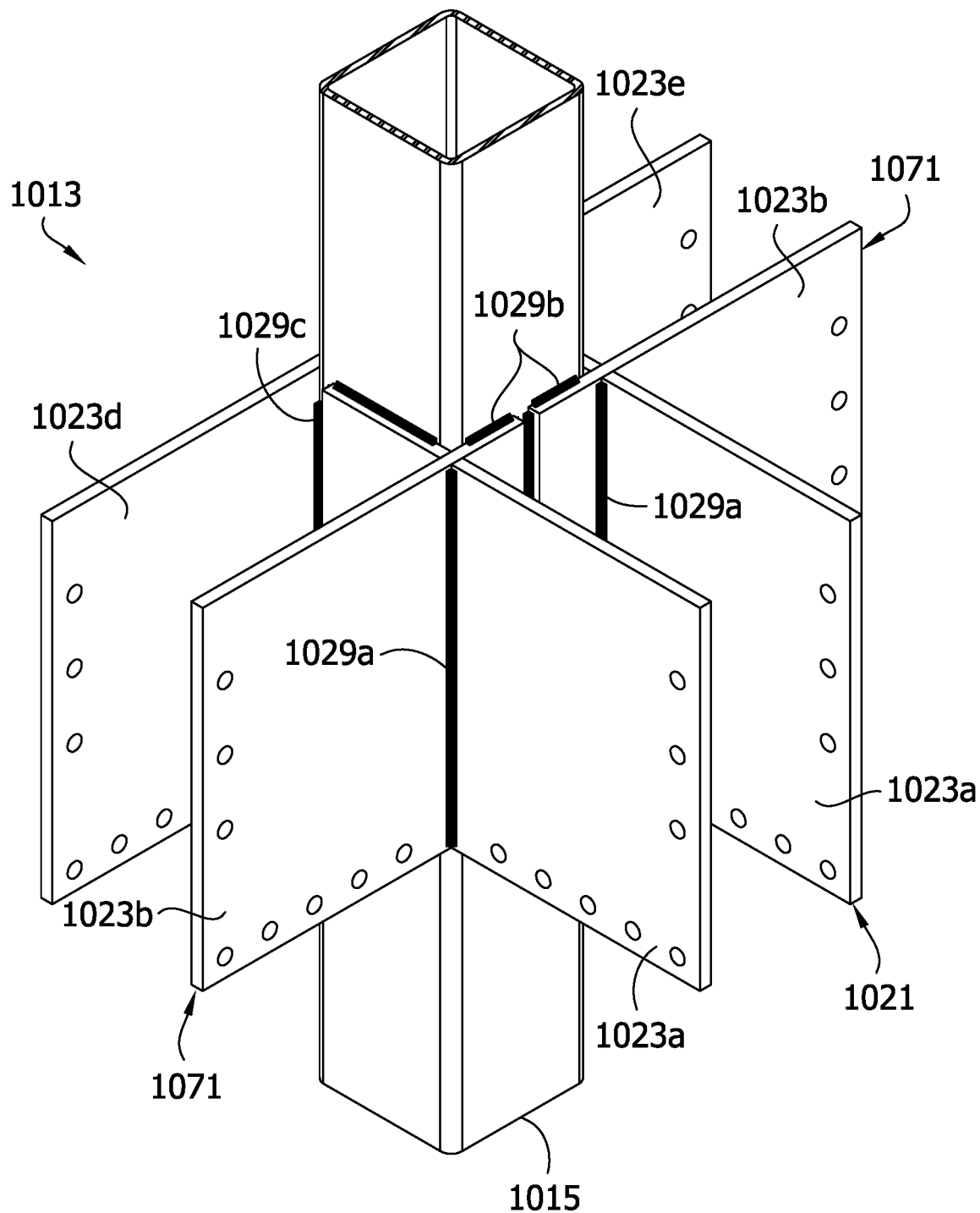
FIG. 61 is a fragmentary front perspective of a column assembly of an eleventh embodiment for use in a bi-axial beam-to-column joint connection structure.
Figure 62:
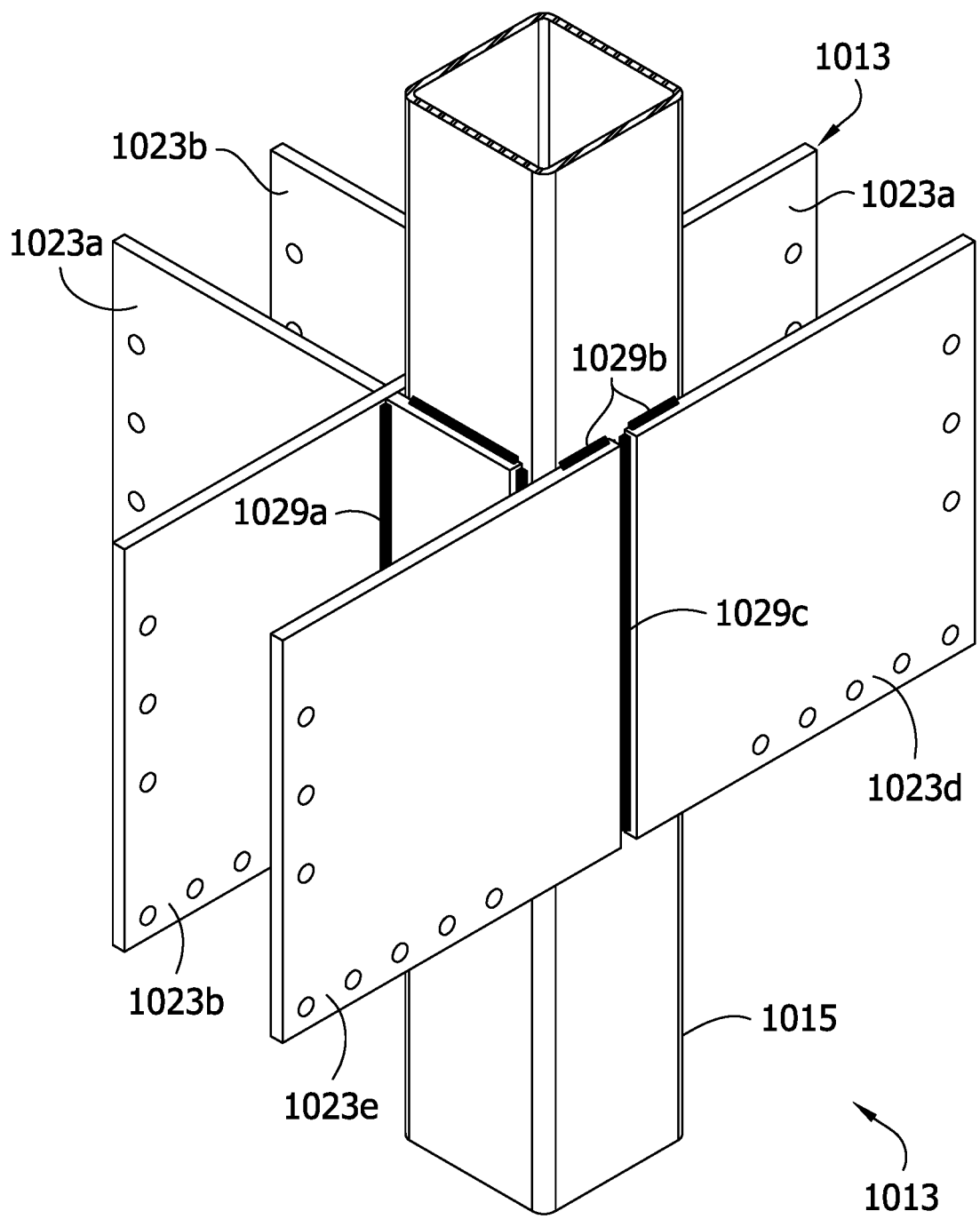
FIG. 62 is a rear perspective of the column assembly of FIG. 61.
Figure 63:
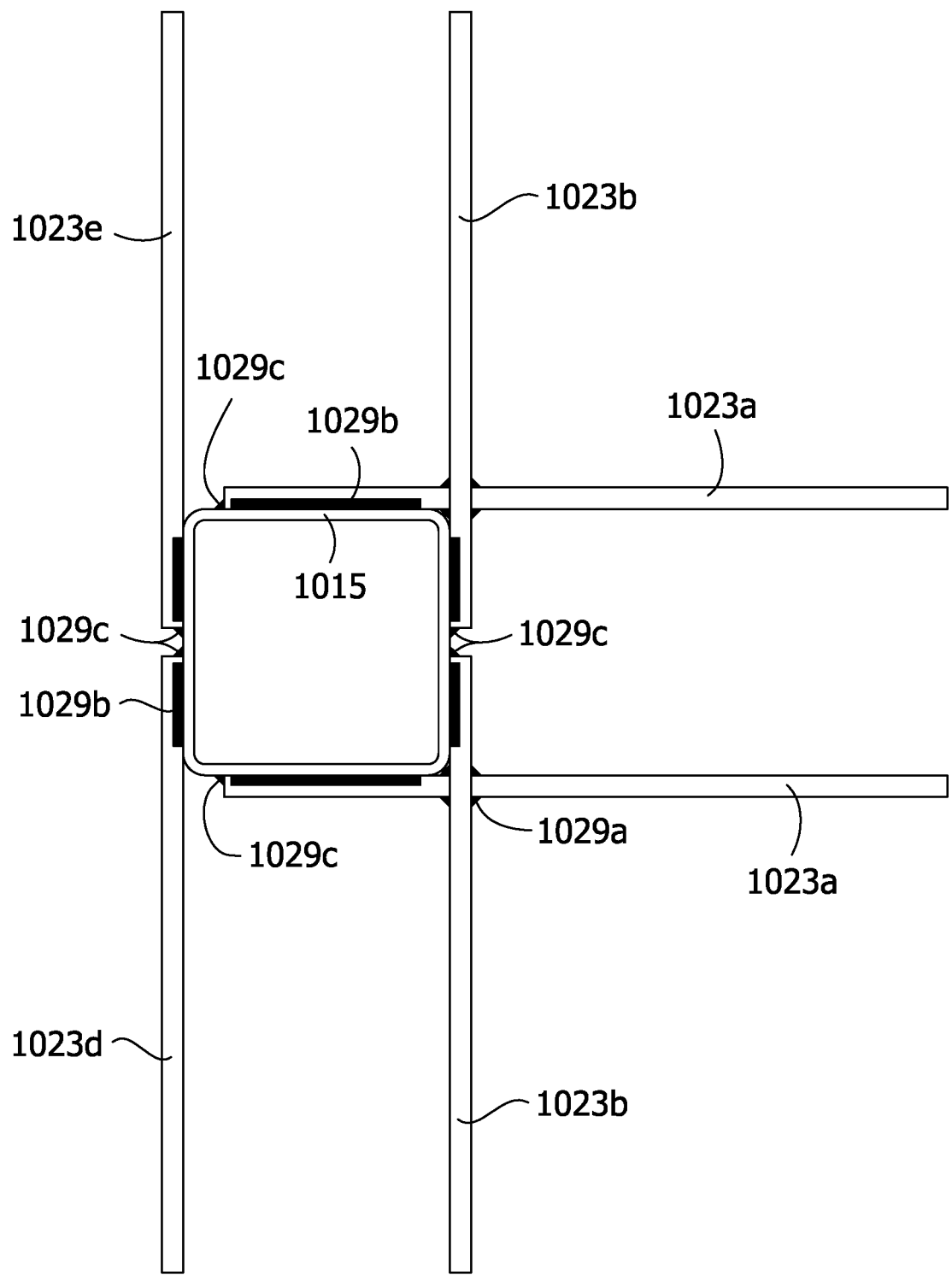
FIG. 63 is a top view of the column assembly of FIG. 61.

Referring to FIGS. 61-63, a column assembly of an eleventh embodiment is generally indicated at 1013. The column assembly 1013 of the eleventh embodiment is similar to the column assembly 913 of the tenth embodiment but instead of a single gusset plate 923c, column assembly 1013 includes two separate gusset plates 1023d and 1023e. Subassemblies 1071 are identical to the subassemblies 971 in the tenth embodiment. Each of the subassemblies 1071 are welded to adjacent corners of the column 1015, and hugs its two adjacent orthogonal faces 1020 of the column, thereby enclosing the corner of the column. The separate gusset plates 1023d, 1023e are welded to the column using vertical welds 1029c. The corner welds 929e used in the tenth embodiment, are not used in the eleventh embodiment. Facing surfaces of adjacent gusset plates 1023a, 1023a of the subassemblies 1071 define a space for receiving an end portion of a beam for mounting a beam assembly to the column assembly 1013 via the gusset plate assembly 1021. Further, facing surfaces of gusset plates 1023b and 1023d, and facing surfaces of 1023b and 1023e defines spaces for receiving end portions of beams for mounting beam assemblies to the column assembly 1013. The column assembly 1013 can be attached to full-length beam assemblies in the same fashion as column assembly 13 of the first embodiment.

Figure 64:
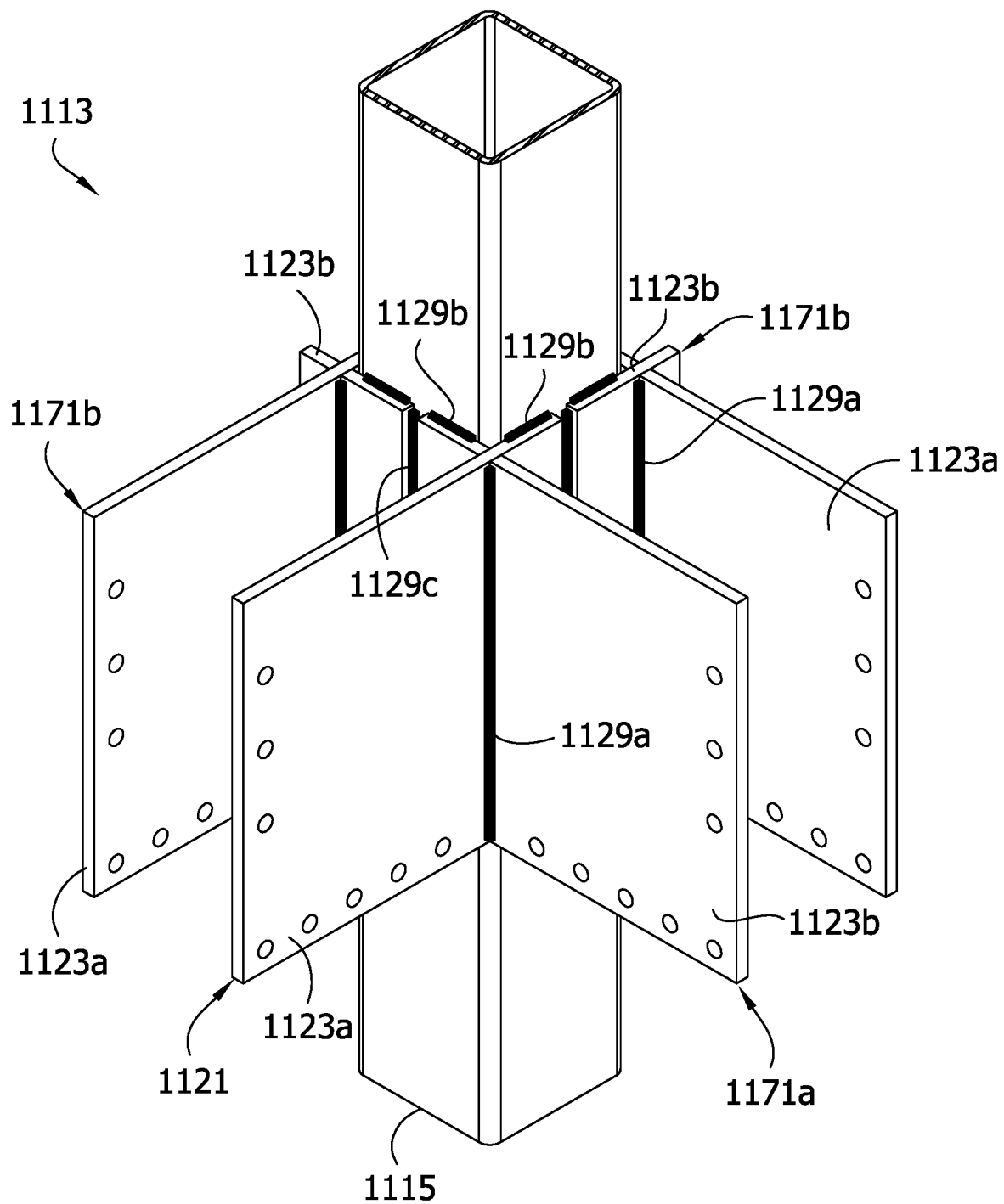
FIG. 64 is a fragmentary front perspective of a column assembly of a twelfth embodiment for use in a bi-axial beam-to-column joint connection structure.
Figure 65:
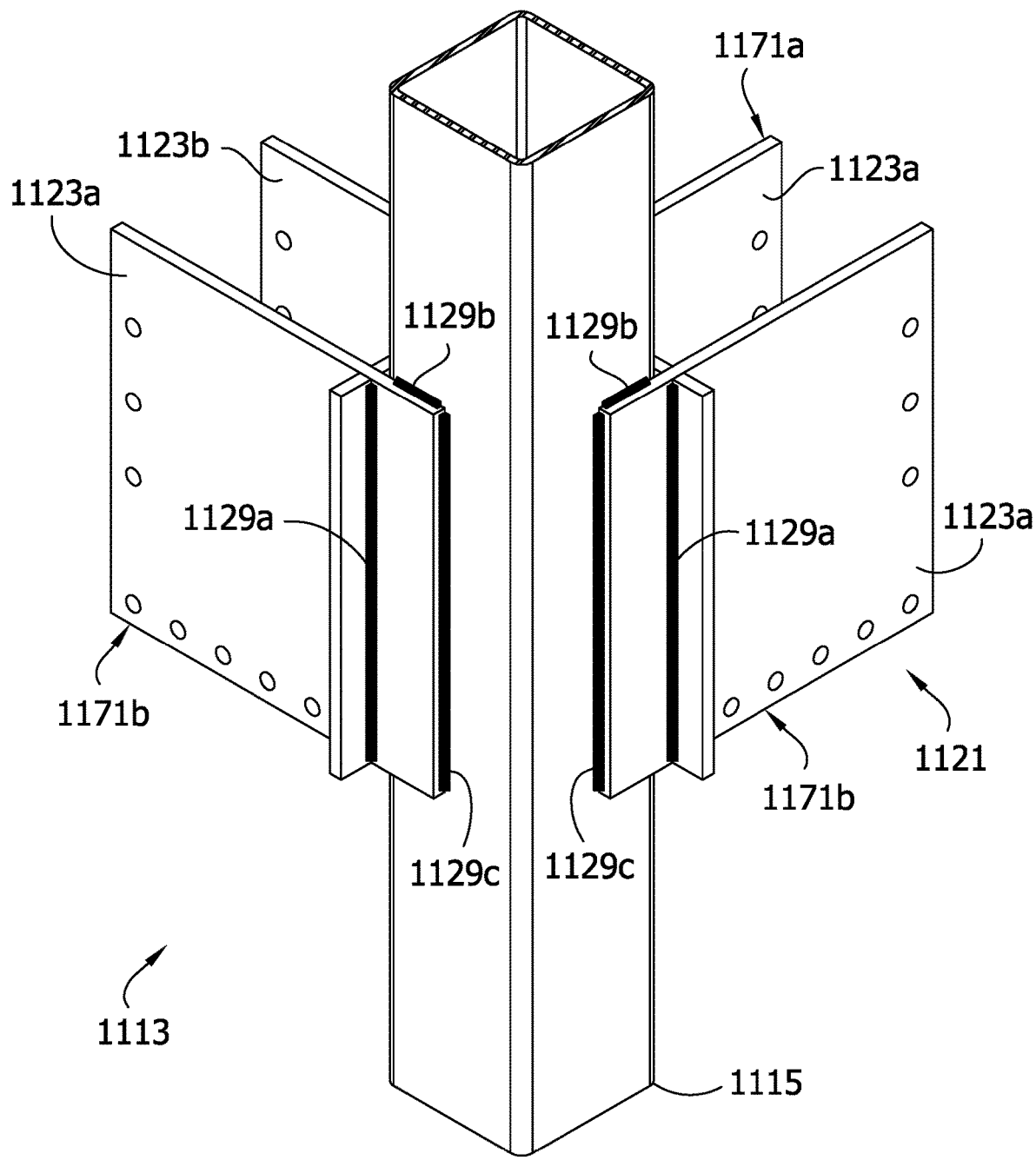
FIG. 65 is a rear perspective of the column assembly of FIG. 64.
Figure 66:
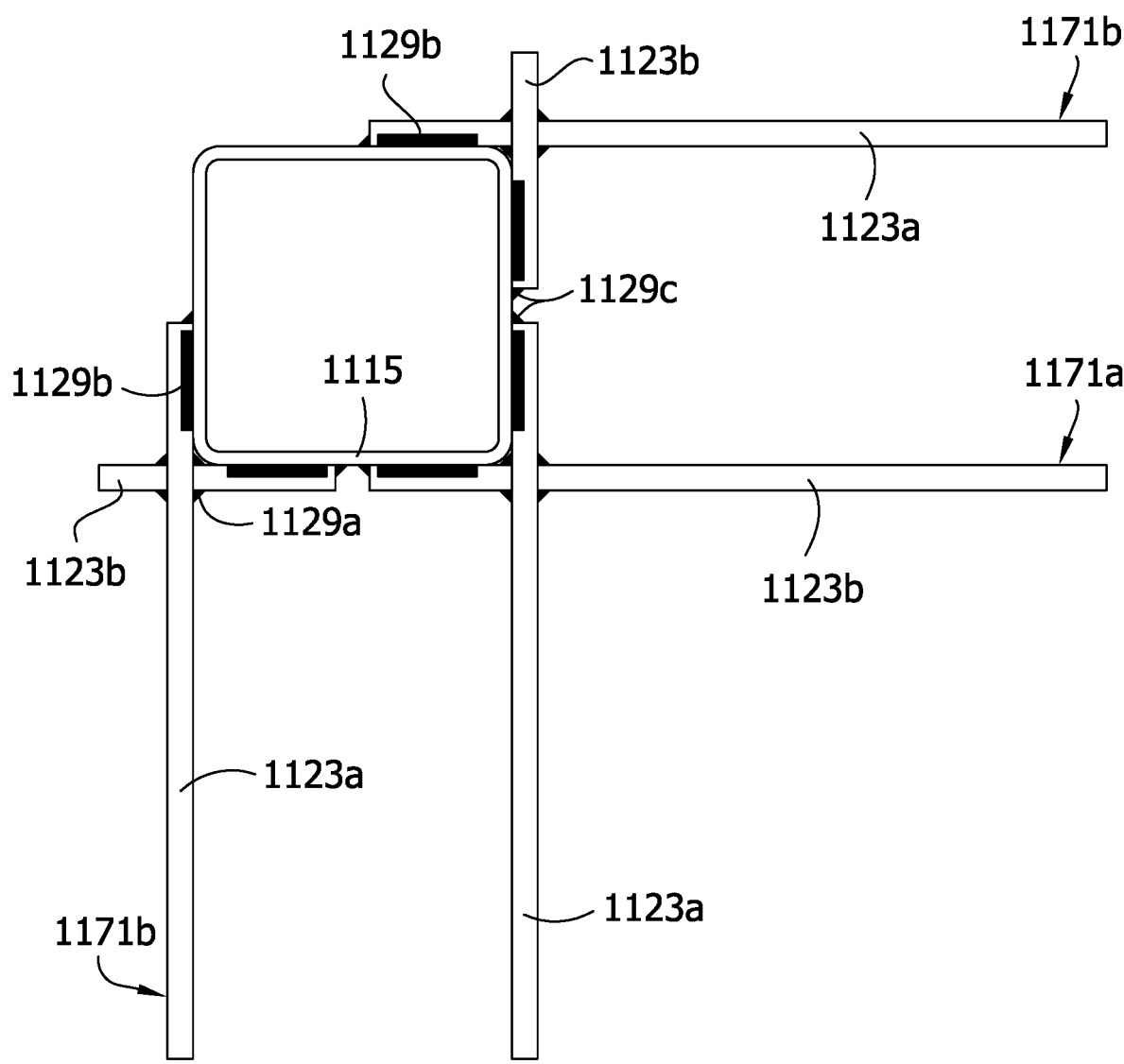
FIG. 66 is a top view of the column assembly of FIG. 64.
Figure 67:
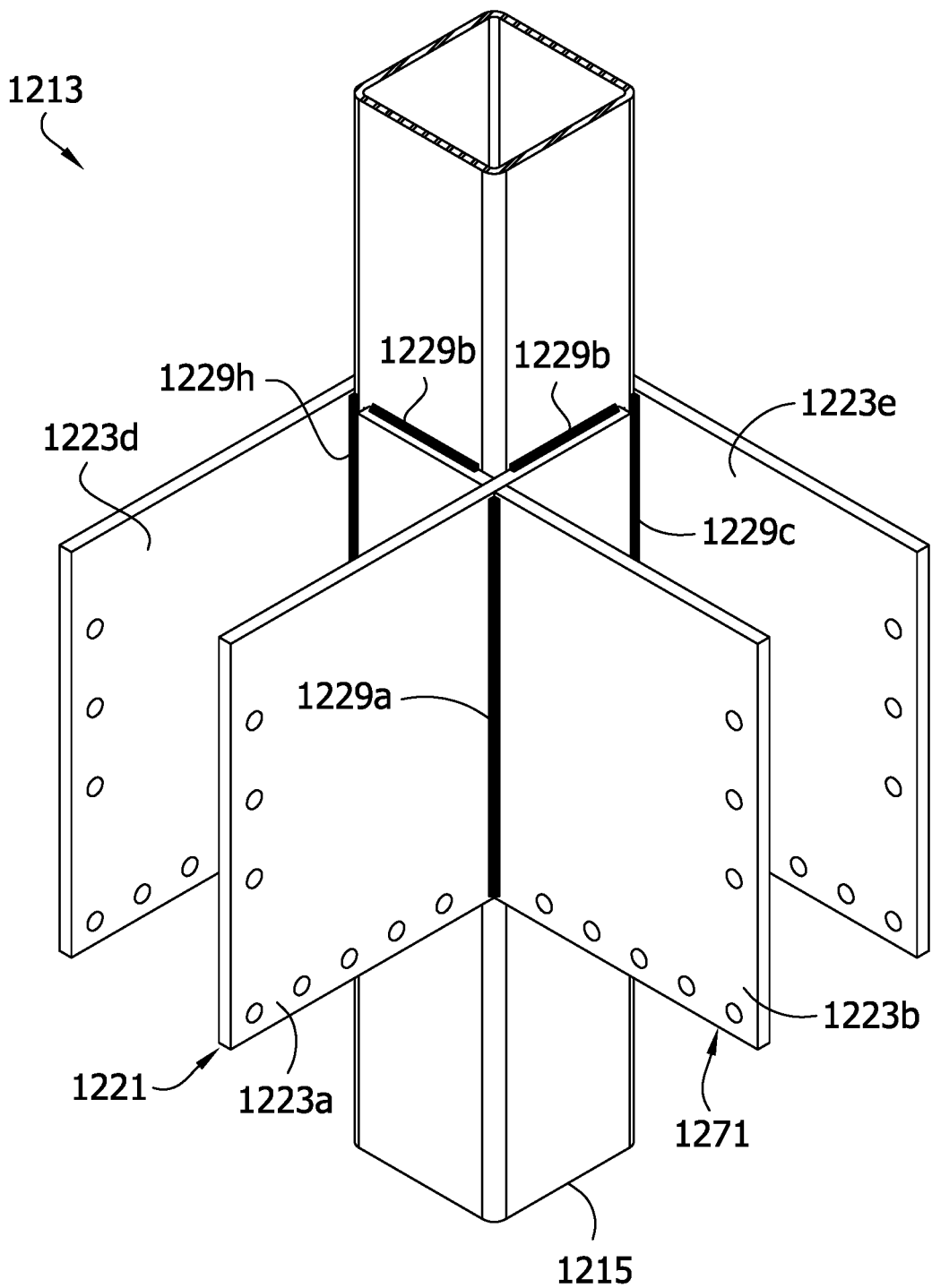
FIG. 67 is a fragmentary front perspective of a column assembly of a thirteenth embodiment for use in a bi-axial beam-to-column joint connection structure.
Figure 68:
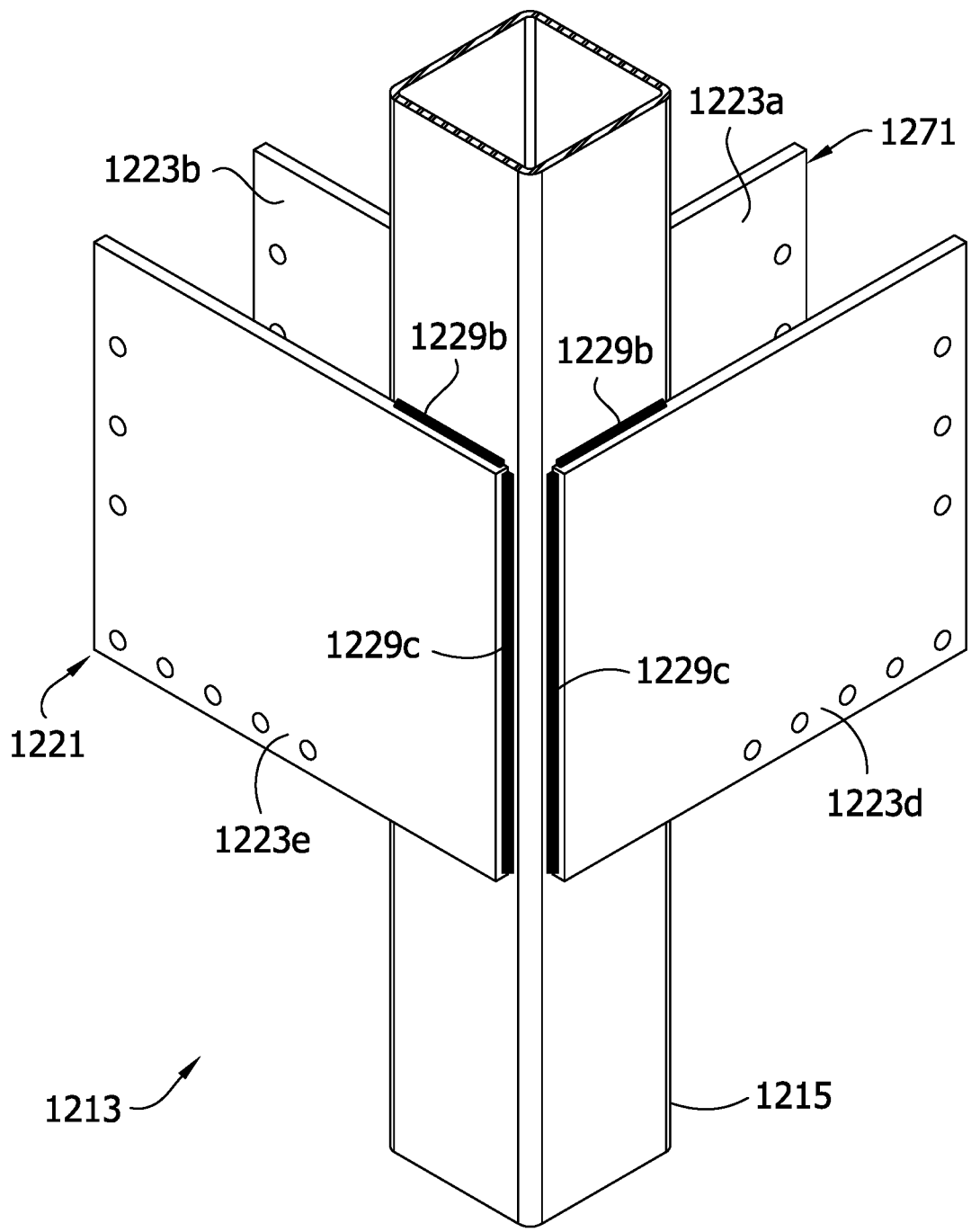
FIG. 68 is a rear perspective of the column assembly of FIG. 67.
Figure 69:
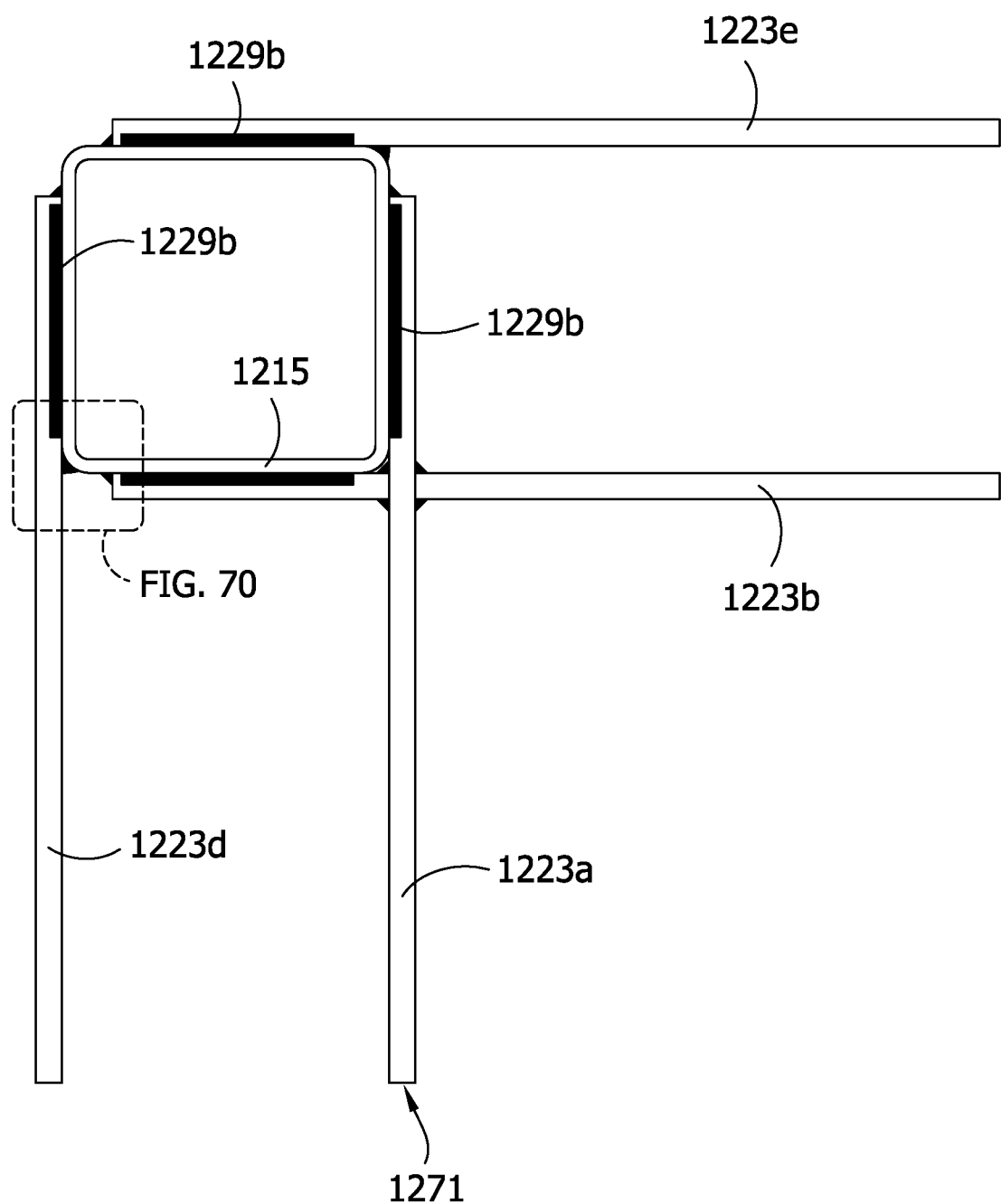
FIG. 69 is a top view of the column assembly of FIG. 67.
Figure 70:
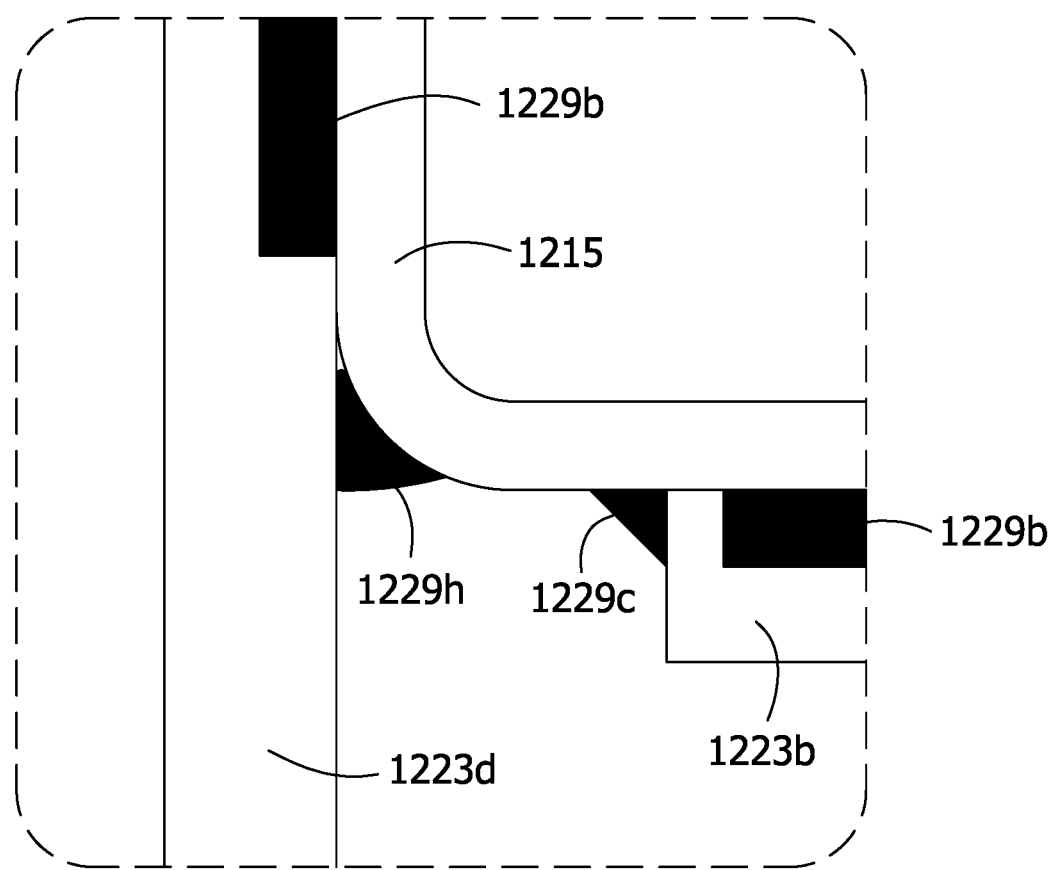
FIG. 70 is an enlarged fragmentary elevation of a portion of FIG. 69.

Referring to FIGS. 64-66, a column assembly of a twelfth embodiment is generally indicated at 1113. The column assembly 1113 of the twelfth embodiment is similar to the column assembly 813 of the ninth embodiment but includes a modification to the gusset plate assembly 821 to configure the column assembly for attaching two beam assemblies. A first subassembly 1171a is identical to the subassemblies 771 in the eighth embodiment. Second subassemblies 1171b are identical to the second subassemblies 871b of the ninth embodiment. Facing surfaces of adjacent gusset plates 1123a, 1123b, and adjacent gusset plates 1123a, 1123a, define spaces for receiving end portions of beams for mounting beam assemblies to the column assembly 1113 via the gusset plate assembly 1121. The column assembly 1113 can be attached to full-length beam assemblies in the same fashion as column assembly 13 of the first embodiment.

Referring to FIGS. 67-70, a column assembly of a thirteenth embodiment is generally indicated at 1213. The column assembly 1213 of the thirteenth embodiment is similar to the column assembly 1113 of the twelfth embodiment but instead of having the two second subassemblies 1171b, column assembly 1213 includes two single gusset plates 1223d and 1223e. Subassembly 1271 is similar to the subassemblies 771 in the eighth embodiment, but the portions of the gusset plates 1223a, 1223b adjacent the faces 1220 of the column 1215 extending over more than half the widths of the faces. The single gusset plates 1223d, 1223e are attached to the column 1215 using vertical and horizontal welds 1229b, 1229c and corner flare bevel welds 1229h. Facing surfaces of adjacent gusset plates 1223a and 1123d, and facing surfaces of gusset plates 1223b and 1223e define the spaces for receiving end portions of beams for mounting beam assemblies to the column assembly 1213 via the gusset plate assembly 1221. The column assembly 1213 can be attached to full-length beam assemblies in the same fashion as column assembly 13 of the first embodiment.

It will be understood that the specific connections described in each of the embodiments are interchangeable.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

Bi-axial, moment resisting beam-to-column joint connection structures and column assemblies that are constructed according to the principles of the present invention provide numerous unique features, benefits and advantages. Reference is made to the figures illustrating some of the embodiments to which the advantages and benefits apply.

What is claimed is:

1. A prefabricated column assembly comprising:
a hollow tubular column having a longitudinal axis and at least one face; and
a gusset plate assembly comprising a plurality of gusset plate subassemblies connected to the column and including gusset plates extending laterally outward from the column in planes generally parallel to the longitudinal axis of the column, said plurality of gusset plate subassemblies including a first gusset plate subassembly and a second gusset plate subassembly, a column portion of the first gusset plate subassembly extending across the face of the column and being connected to the column and a column portion of the second gusset plate subassembly extending across the face of the column and being connected to the column, the column portion of the first gusset plate subassembly being separated from the column portion of the second gusset plate subassembly by a gap extending lengthwise of the column over a full height of the column portions of the first and second gusset plate subassemblies, the first and second gusset plate subassemblies each including a beam portion extending directly from the face of the column in a direction parallel to the face of the column, the beam portions being configured to connect to a beam at locations spaced apart from each other in a direction parallel to the longitudinal axis of the column, wherein each beam portion is a single piece configured for separate connections to a top flange and a bottom flange of the beam.

2. The column assembly of claim 1 wherein the gap between the column portion of the first gusset plate subassembly and the column portion of the second gusset plate subassembly has a substantially constant width.

3. The column assembly of claim 1 wherein the at least one face of the column comprises a first face, the column further comprising a second face and a third face, the first gusset plate subassembly including another column portion extending across the second face of the column, and the second gusset plate subassembly including another column portion extending across the third face of the column.

4. The column assembly of claim 1 wherein the beam portions each have a dimension in a direction perpendicular to a longitudinal axis of the column that is greater than a dimension of each of the column portions in a direction perpendicular to the longitudinal axis of the column.

5. The column assembly of claim 1 wherein each gusset plate subassembly includes first and second gusset plates, wherein the first gusset plate extends through the second gusset plate, and wherein each of the first and second gusset plates includes at least one slot for mating with the slot of the other of the first and second gusset plates for interconnecting the first and second gusset plates.

6. The column assembly of claim 5 wherein each slot includes a closed end and an open end, the open end receiving a portion of the other of the first and second gusset plates for interconnecting the first and second gusset plates to form the gusset plate subassembly.

7. The column assembly of claim 5 further comprising welds connecting the first and second gusset plates to each other, the welds extending along the slots interconnecting the first and second gusset plates.

8. The column assembly of claim 1 wherein each gusset plate includes a plurality of holes.

9. The column assembly of claim 1 wherein the gusset plate assembly is welded to the column.

10. The column assembly of claim 9 further comprising a first and second gusset plate-to-column weld connecting a first gusset plate of the first gusset plate subassembly to the column, the first gusset plate-to-column weld extending transverse to the longitudinal axis of the column, and the second gusset-plate-column weld extending along the longitudinal axis of the column.

11. The column assembly of claim 10 further comprising a third and fourth gusset plate-to-column weld connecting a second gusset plate of the first gusset plate subassembly to the column, the third gusset plate-to-column weld extending transverse to the longitudinal axis of the column, and the fourth gusset plate-to-column weld extending along the longitudinal axis of the column.

12. The column assembly of claim 1 wherein the face of the column constitutes a first face, the column further comprising a second face, and wherein said plurality of gusset plate subassemblies includes a third gusset plate subassembly and a fourth gusset plate subassembly, a column portion of the third gusset plate subassembly extending across the second face of the column and being connected to the column and a column portion of the fourth gusset plate subassembly extending across the second face of the column and being connected to the column, the column portion of the third gusset plate subassembly being separated from the column portion of the fourth gusset plate subassembly by a gap extending lengthwise of the column over a full height of the column portions of the third and fourth gusset plate subassemblies.

13. The column assembly of claim 12 wherein the column further comprising a third face and wherein another column portion of the first gusset plate subassembly extends across the third face of the column and is connected to the column and another column portion of the third gusset plate subassembly extends across the third face of the column and is connected to the column, said another column portion of the first gusset plate subassembly being separated from said another column portion of the third gusset plate subassembly by a gap extending lengthwise of the column over a full height of said another column portions of the first and third gusset plate subassemblies.

14. The column assembly of claim 13 wherein the column further comprising a fourth face and wherein another column portion of the second gusset plate subassembly extends across the fourth face of the column and is connected to the column and another column portion of the fourth gusset plate subassembly extends across the fourth face of the column and is connected to the column, said another column portion of the second gusset plate subassembly being separated from said another column portion of the fourth gusset plate subassembly by a gap extending lengthwise of the column over a full height of said another column portions of the second and fourth gusset plate subassemblies.

15. A gusset plate assembly for connection to a column to attach a beam of a building to the column, the gusset plate assembly comprising a plurality of gusset plate subassemblies sized for transferring a weight of the beam and reaction forces and bending moments of the beam to the column, said plurality of gusset plate subassemblies including a first gusset plate subassembly and a second gusset plate subassembly, a column portion of the first gusset plate subassembly being configured to extend across the face of the column and connect to the column and a column portion of the second gusset plate subassembly being configured to extend across the face of the column and connect to the column, the gusset plate assembly being configured such that when the first and second gusset plate subassemblies are connected to the column, the column portion of the first gusset plate subassembly being separated from the column portion of the second gusset plate subassembly by a gap extending lengthwise of the column over a full height of the column portions of the first and second gusset plate subassemblies, the first and second gusset plate subassemblies each including a beam portion configured to extend directly from the face of the column in a direction that is the same direction that the column portion extends across the face of the column when the gusset plate subassembly is connected to the column, the beam portions being configured to connect to the beam at locations spaced apart from each other in a direction parallel to a longitudinal axis of the column, wherein each beam portion is a single piece configured for separate connections to a top flange and a bottom flange of the beam.

16. A joint connection structure of a building framework comprising:
a column assembly including a hollow tubular column having four faces and a longitudinal axis, and a plurality of gusset plates located on outer surfaces of the column and extending laterally outward from the column in planes generally parallel to the longitudinal axis of the column, a first pair of the gusset plates extending laterally outward from the column along a first axis and defining a space sized to receive a beam assembly, a second pair of the gusset plates extending laterally outward from the column along a second axis that is nonparallel and non-coincident with the first axis, the second pair of gusset plates defining a space sized to receive a beam assembly to provide a bi-axial joint connection, wherein at least a portion of one of the first pair of gusset plates extends through at least one of the second pair of gusset plates; and
a first full-length beam assembly including a first full-length beam having an end portion connected to the first pair of gusset plates and opposing one of the four faces of the column to mount the first full-length beam to the first pair of gusset plates whereby a gap is maintained between the end portion of the first full-length beam and the column and between the end portion of the first full-length beam and the gusset plate located on said one of the four faces of the column;
a second full-length beam assembly including a second full-length beam having an end portion connected to the second pair of gusset plates and opposing another of the four faces of the column to mount the second full-length beam to the second pair of gusset plates and the column whereby a gap is maintained between the end portion of the second full-length beam and the column and between the end portion of the second full-length beam and the gusset plate located on said another of the four faces of the column.

17. The joint connection structure of claim 16 wherein the first and second full-length beams lie substantially in the same horizontal plane.

18. The joint connection structure of claim 17 wherein the first and second full-length beams are substantially perpendicular to each other.

19. The joint connection structure of claim 16 wherein at least one of the gusset plates comprises a planar rectangular member, the column assembly further comprising a weld directly connecting the planar rectangular member to the column, the weld comprising one of a horizontal weld and a vertical weld.

20. The joint connection structure of claim 19 wherein the column assembly comprises another weld comprising the other of a horizontal weld and a vertical weld.

21. The column assembly of claim 1, wherein the column portion and beam portion of each gusset plate subassembly are coplanar.

22. The column assembly of claim 1, wherein each beam portion has a dimension in a direction parallel to the longitudinal axis of the column that is greater than a dimension of the beam portion in a direction perpendicular to the longitudinal axis of the column.

* * * * *